(12) United States Patent
Hubner et al.

(10) Patent No.: US 12,408,578 B2
(45) Date of Patent: Sep. 9, 2025

(54) APPARATUSES, SYSTEMS, AND METHODS FOR SEED DOUBLE ELIMINATION IN AGRICULTURAL OPERATIONS

(71) Applicant: DEERE & COMPANY, Moline, IL (US)

(72) Inventors: Cary S. Hubner, Geneseo, IL (US); Lee E. Zumdome, Bettendorf, IA (US); Kamalakannan Natarajan, Pune (IN)

(73) Assignee: Deere & Company, Moline, IL (US)

( * ) Notice: Subject to any disclaimer, the term of this patent is extended or adjusted under 35 U.S.C. 154(b) by 696 days.

(21) Appl. No.: 17/805,728

(22) Filed: Jun. 7, 2022

(65) Prior Publication Data

US 2023/0389465 A1    Dec. 7, 2023

(51) Int. Cl.
*A01C 7/04*    (2006.01)
*A01C 7/20*    (2006.01)

(52) U.S. Cl.
CPC .............. *A01C 7/046* (2013.01); *A01C 7/205* (2013.01)

(58) Field of Classification Search
CPC ......... A01C 7/046; A01C 7/044; A01C 7/042; A01C 7/04; A01C 7/00; A01C 7/205; A01C 7/201; A01C 7/20
See application file for complete search history.

(56) References Cited

U.S. PATENT DOCUMENTS

| 9,313,943 B2 | 4/2016 | Zumdome et al. |
| 9,345,189 B2 | 5/2016 | Harmelink et al. |
| 2016/0157416 A1 | 6/2016 | Zumdome |

FOREIGN PATENT DOCUMENTS

| EP | 0046709 A1 | 3/1982 |
| EP | 2225928 A2 | 9/2010 |
| EP | 2901833 A1 | 8/2015 |
| WO | WO 2011037525 A1 | 3/2011 |

OTHER PUBLICATIONS

Extended European Search Report and Written Opinion issued in European Patent Application No. 23176909.2, dated Nov. 7, 2023, in 05 pages.

*Primary Examiner* — Christopher J. Novosad

(57) ABSTRACT

An example seed double eliminator includes at least one tine that is disposed adjacent to an inner surface of a seed disc. The at least one tine is pivotably movable about an axis of rotation to engage seed doubles located at one or more locations along the inner surface of the seed disc and eliminate excess seeds such that a single seed is retained at the location. The at least one tine is pivotably movable in response to operation of a position selector to cause an angular orientation of the tine to become altered.

23 Claims, 33 Drawing Sheets

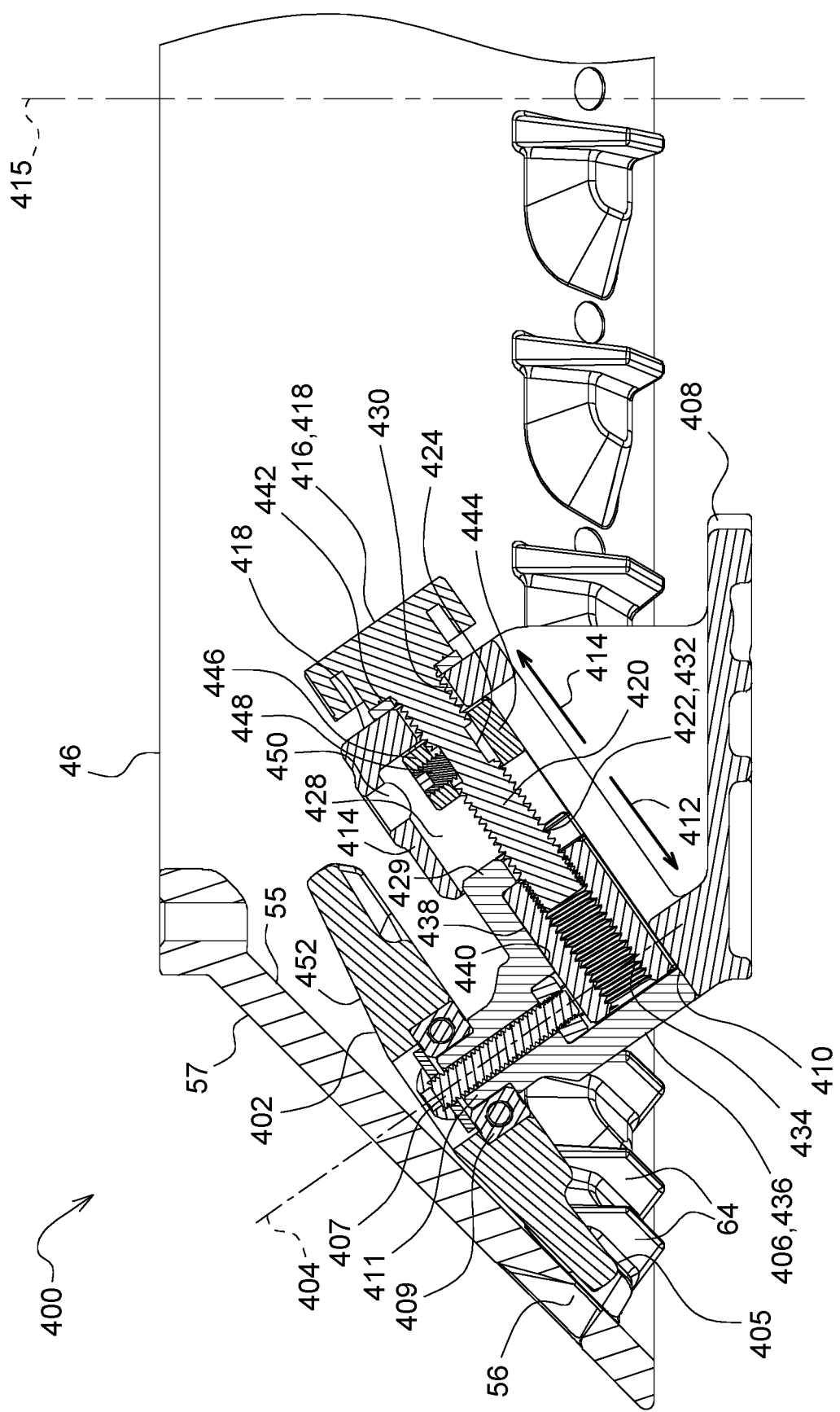

ics, SYSTEMS, AND METHODS
FOR SEED DOUBLE ELIMINATION IN
AGRICULTURAL OPERATIONS

FIELD OF THE DISCLOSURE

The present disclosure relates generally to eliminating excess seed during an agricultural planting operation.

BACKGROUND OF THE DISCLOSURE

Agricultural planting operations involve depositing seed into the ground. Generally, planting operations involve the use of seed meters that utilize a pressure differential (such as a vacuum or positive pressure) to adhere seed to an aperture formed in a seed meter. The seed meter operates to select individual seeds that are subsequently carried from the seed meter to the ground and deposited into the soil, such as in a furrow formed in the soil.

SUMMARY OF THE DISCLOSURE

A first aspect of the present disclosure is directed to a seed double eliminator for a seeding machine having a seed disc. The seed double eliminator may include a housing that includes a cavity and a shaft formed in the cavity, the shaft defining a pivot axis. The seed double eliminator may also include a tine mounted on the shaft and pivotable about the pivot axis and a selector operably engaged with the tine. The selector may be movable to alter an angular orientation of the tine about the pivot axis.

A second aspect of the present disclosure is directed to an agricultural planter. The agricultural planter may include a seeding machine configured to singulate seeds prior to depositing the seeds into the ground. The seeding machine may include a rotatable seed disc and a seed double eliminator disposed adjacent to an inner surface of the seed disc. The seed double eliminator may include a housing disposed along a perimeter of the seed meter. The housing may include a cavity and a shaft extending into the cavity and defining a pivot axis. The seed double eliminator may also include a tine mounted on the shaft and pivotable about the pivot axis and a selector operably engaged with the tine. The selector may be movable to alter an angular orientation of the tine about the pivot axis.

Another aspect of the present disclosure is directed to a method for altering a rotational orientation of a seed double eliminator. The method may include operating a selector of a seed double eliminator. The seed double eliminator may include the selector, a frame operably engaged with the selector and a tine pivotably movable about a first axis of rotation. The frame may be operably engaged with the tine to cause the pivotable movement of the tine. The method may also include moving the frame in response to operation of the selector and imparting a moment to the tine by the frame to pivot the tine about the first axis of rotation.

The various aspects of the present disclosure may include one or more of the following features. The selector may be movable to cause movement of the tine about the pivot axis in discrete amounts. The selector may be movable to cause movement of the tine over a predetermined range. The range of movement may be approximately 30° of rotation. A frame may extend between the tine and the selector, and the frame may be movable in response to movement of the selector to cause movement of the tine about the pivot axis. The tine may include an elongated portion, a body portion, and a protrusion extending from the body portion. The body portion may define an aperture that receives the shaft, and the frame may include an opening. The protrusion may be received into the opening of the frame. The tine may be movable about the pivot axis in response to a moment imparted to the protrusion by the frame. The opening may define an edge of the frame, and the edge of the frame may impart the moment to the protrusion to alter the angular orientation of the tine about the pivot axis. The selector may be rotatable, and rotation of the selector may cause movement of the frame along a path. The selector may include a first gear; the frame may include a second gear intermeshed with the first gear; and rotation of the selector may cause the first gear to rotate the second gear which, in turn, may cause movement of the frame along the path. The selector may include a powered actuator, and actuation of the actuator may cause movement of the frame along a path. The frame may be disposed in a channel, and movement of the selector may cause the frame to move along a curved path within the channel.

Additionally, the various aspects may include one or more of the following features. The seed double eliminator may include a frame extending between the tine and the selector. The frame may be movable in response to movement of the selector to cause movement of the tine about the pivot axis. The frame may be disposed in a channel, and movement of the selector may cause the frame to move along a curved path within the channel. The tine may include an elongated portion and a body portion that includes a protrusion and defines an apertured that receives the shaft. The frame may include an opening, and the protrusion may be received into the opening of the frame. The tine may be movable about the pivot axis in response to a moment imparted to the protrusion by the frame. The selector may be rotatable, and rotation of the selector may cause movement of the frame along a path. The selector may include a powered actuator, and actuation of the actuator may cause movement of the frame along a path. Moving the frame in response to operation of the selector may include moving the frame along a path in response to operation of the selector. The selector may include a powered actuator operably engaged with the frame. Operating the selector may include actuating the actuator, and moving the frame in response to operation of the selector may include displacing the frame in response to actuation of the actuator. The frame may include an aperture, and a protrusion of the tine may be received into the aperture. Imparting a moment to the tine by the frame to pivot the tine about the second axis of rotation may include imparting a force to the protrusion by surface of the frame defining the aperture.

Further, the various aspects of the present disclosure may include one or more of the following features. Operating a selector may include rotating the selector about a second axis of rotation.

Other features and aspects will become apparent by consideration of the detailed description and accompanying drawings.

BRIEF DESCRIPTION OF THE DRAWINGS

The detailed description of the drawings refers to the accompanying figures in which:

FIG. 35 is a cross-sectional view of another example seed double eliminator, according to some implementations of the present disclosure.

DETAILED DESCRIPTION

Figure 1:
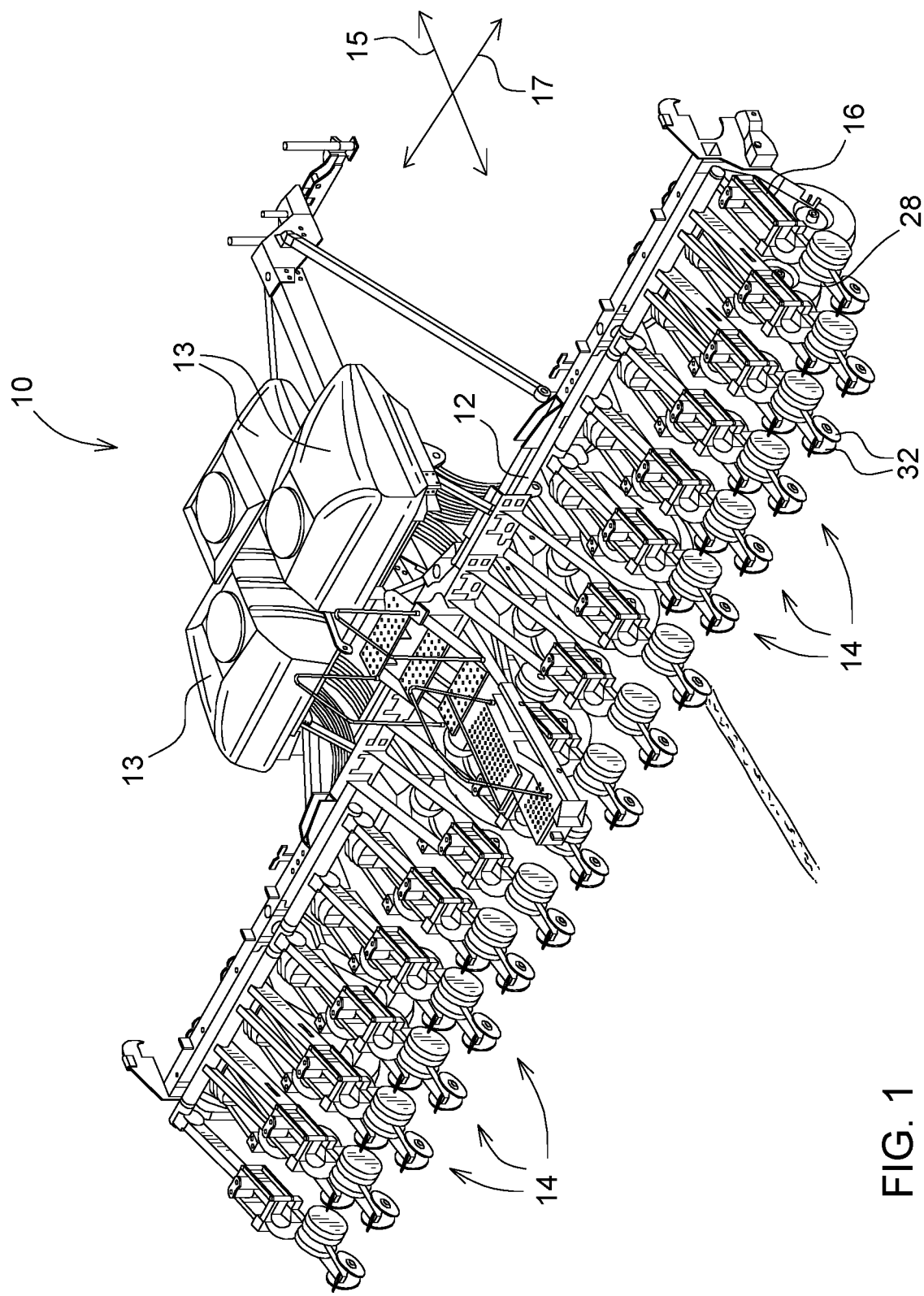
FIG. 1 is a perspective view of an agricultural planter, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

Words of orientation, such as "up," "down," "top," "bottom," "above," "below," "leading," "trailing," "front," "back," "forward," and "rearward" that are used in the context of the illustrated examples are used as would be understood by one skilled in the art and are not intended to be limiting to the disclosure. For example, for a particular type of vehicle or implement in a conventional configuration and orientation, one skilled in the art would understand these terms as the terms apply to the particular vehicle or implement. Additionally, although terms such as "upper" and "lower" may be used to describe features as depicted in the various figures, these are not intended to limit the disclosure to the particular orientation depicted. For example, in some cases, at a particular orientation, a feature described herein as "upper" may be located vertically relative to, but to the right (or left) of a feature described herein as "lower."

For example, as used herein, with respect to a work vehicle, unless otherwise defined or limited, the term "forward" (and the like) corresponds to a forward direction of travel of the work vehicle over the ground during normal operation of the work vehicle. Likewise, the term "rearward" (and the like) corresponds to a direction opposite the forward direction of travel of the work vehicle.

Also as used herein, with respect to an agricultural implement or components thereof, unless otherwise defined or limited, the term "leading" (and the like) indicates a direction of travel of the agricultural implement when viewed in a conventional orientation on flat ground during normal operation (e.g., the forward direction of travel of a work vehicle transporting an implement). Similarly, the term "trailing" (and the like) indicates a direction that is opposite the leading direction. A conventional orientation represents a work vehicle being oriented such that normal operation of the work vehicle can be performed. For example, a conventional orientation may involve having the tracks or wheels of the vehicle or field engaging components of an implement contacting the ground in a manner that allows the work vehicle or implement to function as intended.

A disc-shaped or bowl-shaped seed meter within a planting unit moves seed along a generally circular seed path from a seed pool to an elevated release position. Seed meters having other shapes and seed paths having other shapes are also contemplated. Seed doubles may sometimes be formed on such a seed meter. A seed double is any grouping of multiple seeds, including groupings of three or more seeds, present at a location on the seed meter intended to secure a single seed. These locations generally correspond to apertures formed in a seed disc of the seed meter that are intended to carry one seed at a time during a planting operation. In instances in which a seed double is present at one or more of the locations, the seed doubles are carried along the circular path, potentially resulting in sub-optimal seed delivery (e.g., poor or failed transport for final planting by a seed delivery system), ineffective seed singulation, and seed waste. A seed-double eliminator is used to assist in a more efficient and successful seed singulation by removing any excess seeds from various seed doubles on the seed meter.

Seeds within a seed double may extend farther away from the seed meter than a single seed being carried by the seed meter, providing an avenue for removal of excess seeds while retaining a single seed at the aperture. In addition to other benefits, such flexible members may take advantage of this phenomenon in order to eliminate seed doubles more selectively.

FIG. 1 is a perspective view of an example agricultural seeding machine 10. In the illustrated example the seeding machine 10 is a row crop planter. It will be understood that various other configurations may also be possible and that the various seed double eliminators disclosed herein may be used in a variety of agricultural machinery or other settings. The seeding machine 10 includes a central frame 12 on which a plurality of individual planting units 14 are mounted. The seeding machine 10 is oriented with a fore-aft direction shown by arrow 15 and a transverse direction shown by arrow 17. Each planting unit 14 is coupled to the central frame 12, such as by a parallel linkage (e.g., linkage 16), so that individual planting units 14 can move up and down relative to frame 12. Large storage tanks 13 hold seed that is delivered pneumatically to a mini hopper on each planting unit.

Figure 2:
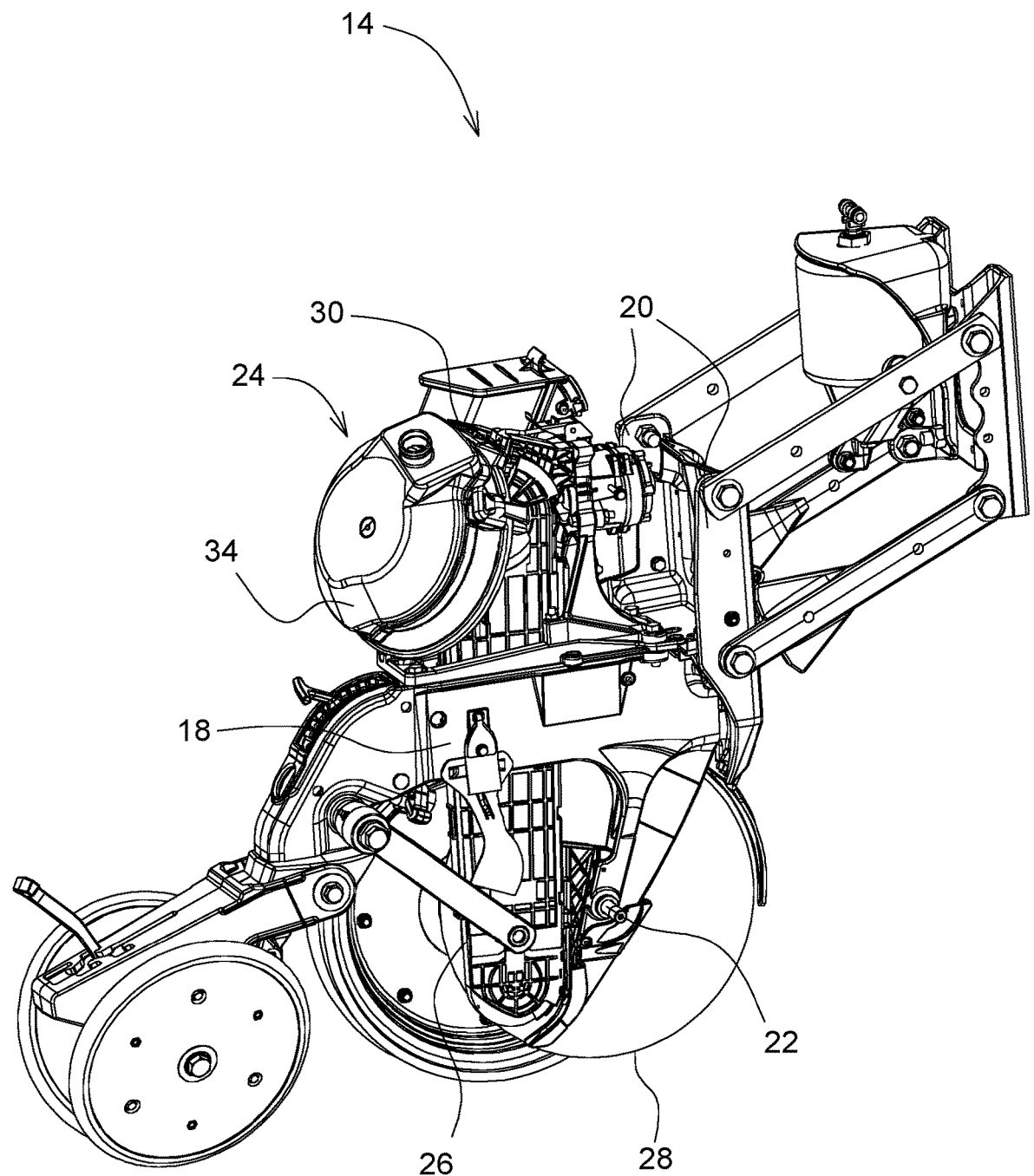
FIG. 2 is a perspective view of a planting unit frame, seed meter, and seed delivery system, according to some implementations of the present disclosure.

FIG. 2 shows an example planting unit 14. Each planting unit 14 can be mounted, in various ways, to the central frame 12. The planting unit 14 is provided merely as an example. Consequently, the scope of the present disclosure encompasses the use or inclusion of the various seed double eliminators described herein with various other seed-handling devices. A frame 18 of the planting unit 14 includes a pair of upstanding arms 20 at the forward end thereof. The arms are coupled to the rearward ends of parallel linkage 16. A shaft 22 is coupled to the frame 18, and furrow opening disks 28, shown in FIG. 1, are attached to the shaft 22 and operate to form an open furrow in the soil beneath the seeding machine. The planting unit 14 deposits seed into the furrow created by the opening disks 28. Closing and packing wheels 32, also shown in FIG. 1, are mounted to the frame 18 and operate to close the furrow over the deposited seed. In some instances, the packing wheels 32 also firm the soil in the closed furrow. In some instances, closing wheels are included that operate to close a furrow after delivery of the seeds. A seed meter 24 and seed delivery system 26 are also attached to the frame 18 of the planting unit 14.

Figure 3:
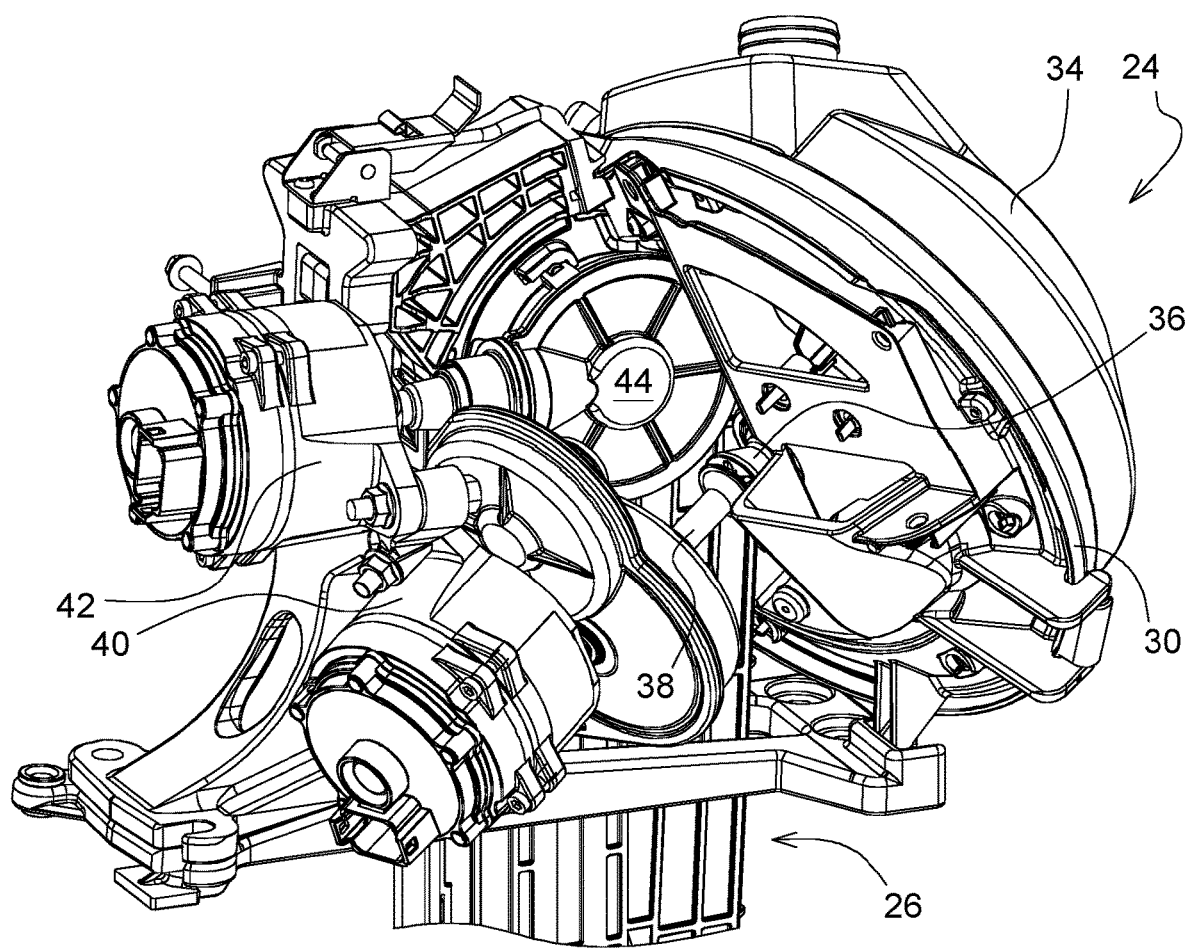
FIG. 3 is a detailed view of the seed meter of FIG. 2, along with the associated delivery system drives.
Figure 4:
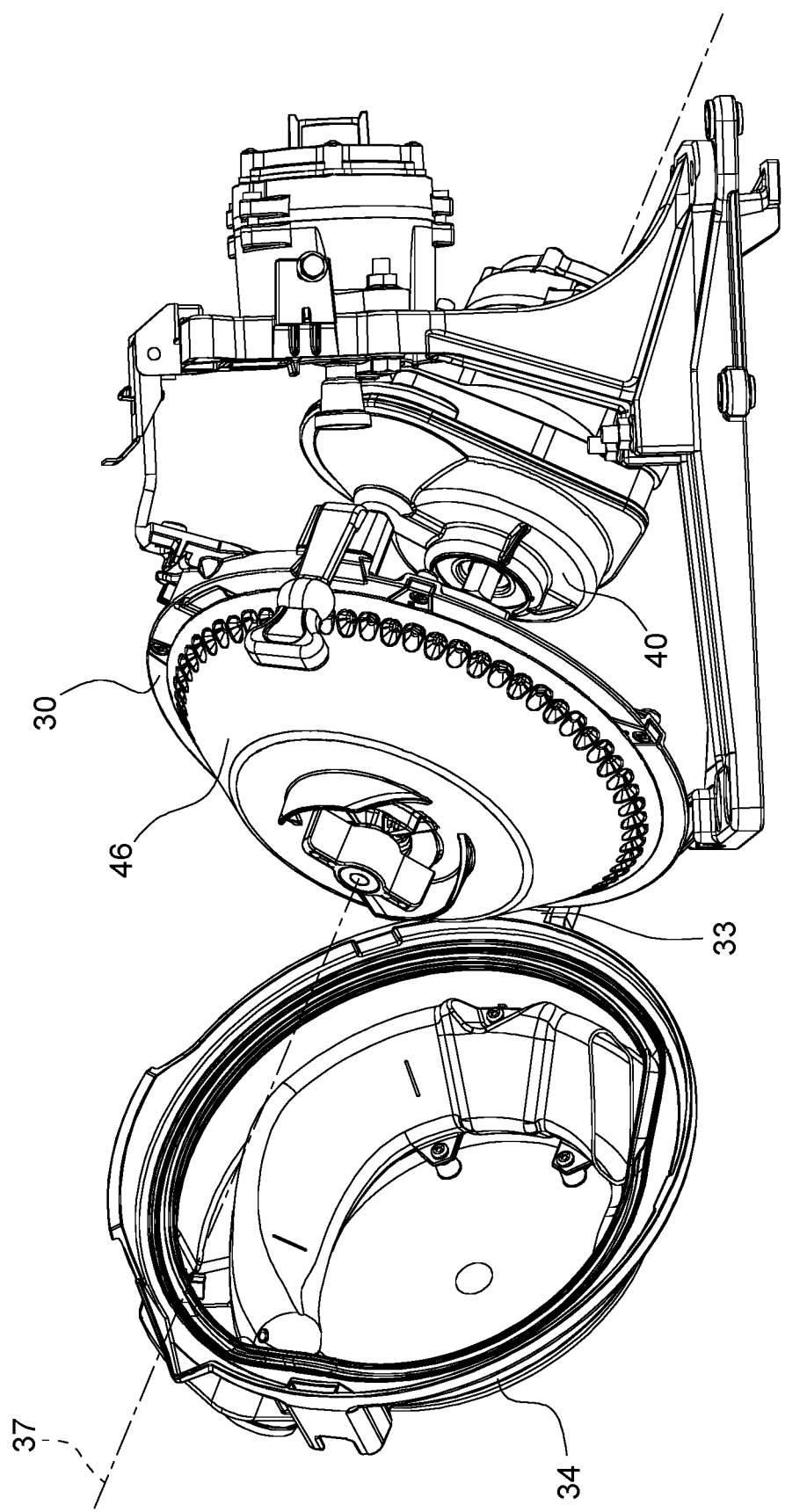
FIG. 4 is a perspective view of the seed meter of FIG. 2 with the cover open illustrating an example seed disc of the seed meter.

Referring to FIGS. 3 and 4, the seed meter 24 includes a housing 30 and a cover 34. The housing 30 and the cover 34 are coupled to one another by a complementary hinge features included on housing 30 and cover 34, respectively, that combine to form a hinge 33. The seed meter 24 also includes an electric motor 40 and a drive spindle 36 carried by the housing 30. The drive spindle 36 is coupled to an output shaft 38 of the electric motor 40. The electric motor 40 is used to operate the seed meter 24. More particularly, the electric motor 40 rotates a seed disc of the seed meter 24 about an axis of rotation 37.

The planting unit 14 also includes an electric motor 42 that drives the delivery system 26. In the illustrated example, an output shaft of the electric motor 42 is connected to the delivery system 26 via a right-angle drive 44. However, in other implementations, other arrangements are used to provide motive power from the electric motor 42 to the delivery system 26. Further, while electric motors have been shown to drive both the seed meter 24 and the seed delivery system 26, it will be appreciated by those skilled in the art that other types of motive devices, such as hydraulic motors or pneumatic motors, can be used. Further, other types of mechanical drive systems may also be used.

Figure 5:
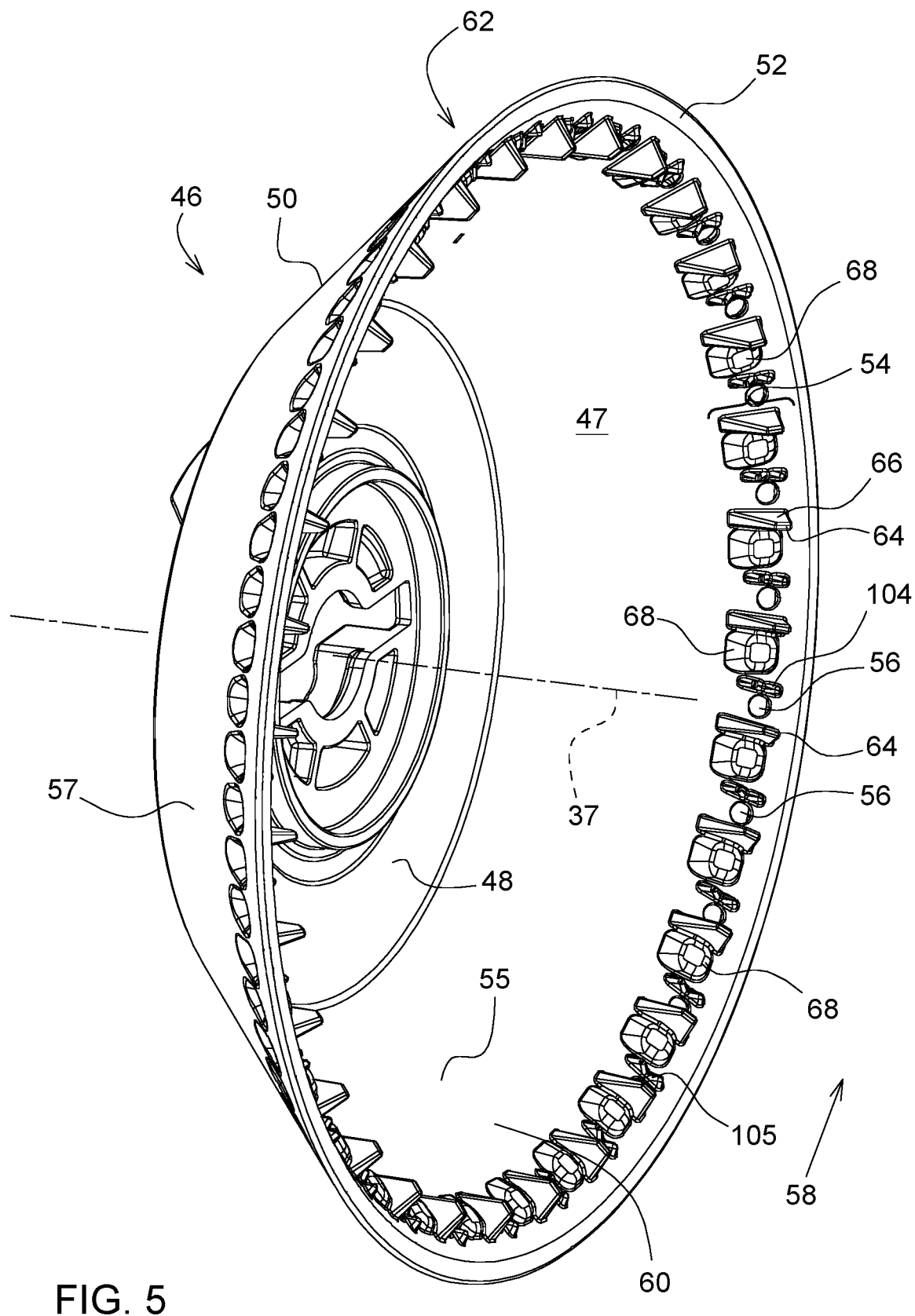
FIG. 5 is an exploded perspective view of the seed disc included in the seed meter of FIG. 2.
Figure 6:
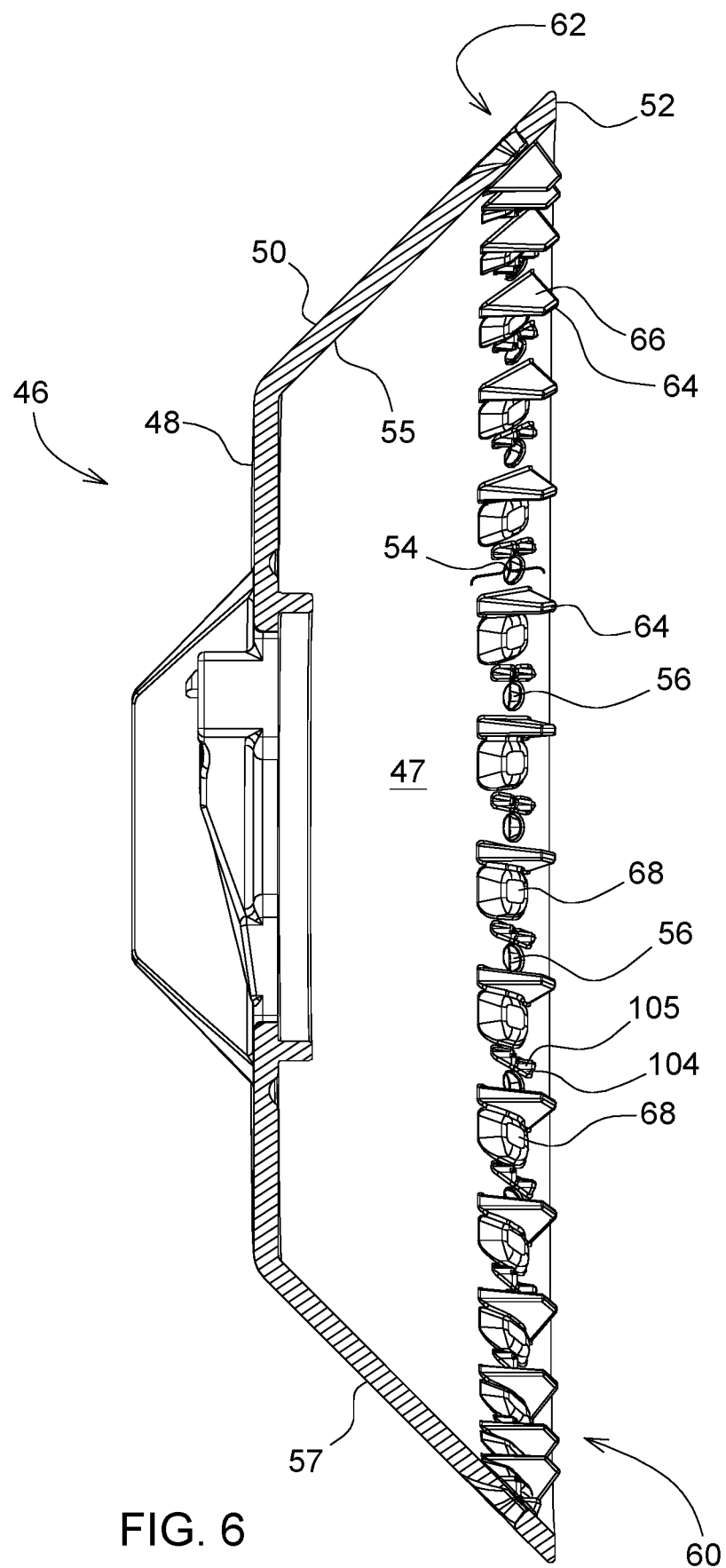
FIG. 6 is cross-sectional view of the seed disc of FIG. 5.

Referring also to FIGS. 5 and 6, a seed disc 46 of seed meter 24 is shown in greater detail. The seed disc 46 operates to selectively retain individual seeds from a seed pool located within the seed meter 24 at selected locations along the seed disc 46 and transport the individual seeds to the delivery system 26. The delivery system 26 transports the seeds to the ground for planting. In the illustrated example, the seed disc 46 is bowl-shaped. However, the scope of the present disclosure is not limited to bowl-shaped seed discs. Rather, the present disclosure encompasses other types of seed discs that operate to transport individual seeds from one location to another. For example, other types of seed discs within the scope of the present disclosure include seed discs that are flat or have a generally flat shape (commonly referred to as seed plates). Thus, although the various seed double eliminators described herein are described in the context of a bowl-shaped seed disc, seed discs having other configurations are included within the scope of the present disclosure.

As explained, the example seed disc 46 has a concaved bowl-shape defining an interior space 47. The seed disc 46 includes a base portion 48 from which a conical side wall 50 extends. The side wall 50 terminates in a peripheral edge (referred to hereinafter as outer edge 52). The side wall 50 includes a rim portion 54 that is adjacent to the outer edge 52. The rim portion 54 is indicated generally by a bracket in FIGS. 5 and 6. In the illustrated example, the rim portion 54 extends along a portion of the side wall 50 from the outer edge 52. An annular array of apertures 56 is located within the rim portion 54. The apertures 56 extend between an inner surface 55 and an outer surface 57 of the side wall 50.

The seed disc 46 is mounted in the housing 30 for rotation about the axis of rotation 37 in the direction of arrow 58, as shown in FIG. 5. In operation, as the seed disc 46 rotates, individual seeds from a seed pool 60 present in a lower portion of the interior space 47 adhere to the apertures 56 along the inner surface 55 of side wall 50. As the seed disc 46 rotates, the individual seeds are sequentially carried upwards to a release position 62 located at an upper portion of seed disc 46. A series of raised features or projections (referred to hereinafter as paddles 64) extend from the inner surface 55. In some implementations, a paddle 64 is located adjacent to each aperture 56. In the context of the direction of rotation 58, a paddle 64 is located behind each aperture 56. Each paddle 64, accordingly, forms a confronting surface 66 behind the associated aperture 56 in the direction of rotation 58 to push a seed adhered to the aperture 56 into delivery system 26 as described below. In some instances, the seed disc 46, as installed in housing 30, is oriented at an angle from vertical, as illustrated, for example, in FIG. 7.

In some implementations, the seed disc 46 includes a raised feature 68 that is positioned between a paddles 64 and a second type of paddle 104. The paddle 104 includes a V-shaped notch 105. The paddles 104 operate to prevent seed from being collected or becoming lodged at the locations of the paddles 104. As discussed in more detail below, the paddles 64 assist in guiding seeds into a seed transport apparatus of the seed delivery system 26. In operation, the raised feature 68 sometimes serves to orient individual seeds in a seed double for improved removal by a seed double eliminator.

In some implementations, the seed disc 46 is a one piece or unitary component. In other implementations, the seed meter 46 is constructed of multiple pieces. Further, in some implementations, a seed disc within the scope of the present disclosure may differ in various ways from the example seed disc 46 depicted in the various figures herein. It will be understood, accordingly, that the various seed double eliminators described herein are usable with a seed disc, such as seed disc 46, or with various other types of seed transport devices.

As noted above, the seed pool 60 is formed in the interior space 47 at the bottom of seed disc 46. A vacuum is applied at the outer surface 57 of side wall 50, causing individual seeds to be adhered to the various apertures 56 as the apertures 56 travel through the seed pool 60. As the seed disc 46 rotates in the direction of arrow 58, seed adheres at the apertures 56. As the seed disc 46 continues to rotate, the adhered seed is moved upwards to the release position 62 at the upper portion of seed disc 46. In some implementations, the release position 62 is located slightly past the top or 12 o'clock position along a circular path of travel of the seed defined by rotation of the seed disc 46 such that the seed is moving somewhat downward at the release position 62.

Figure 7:
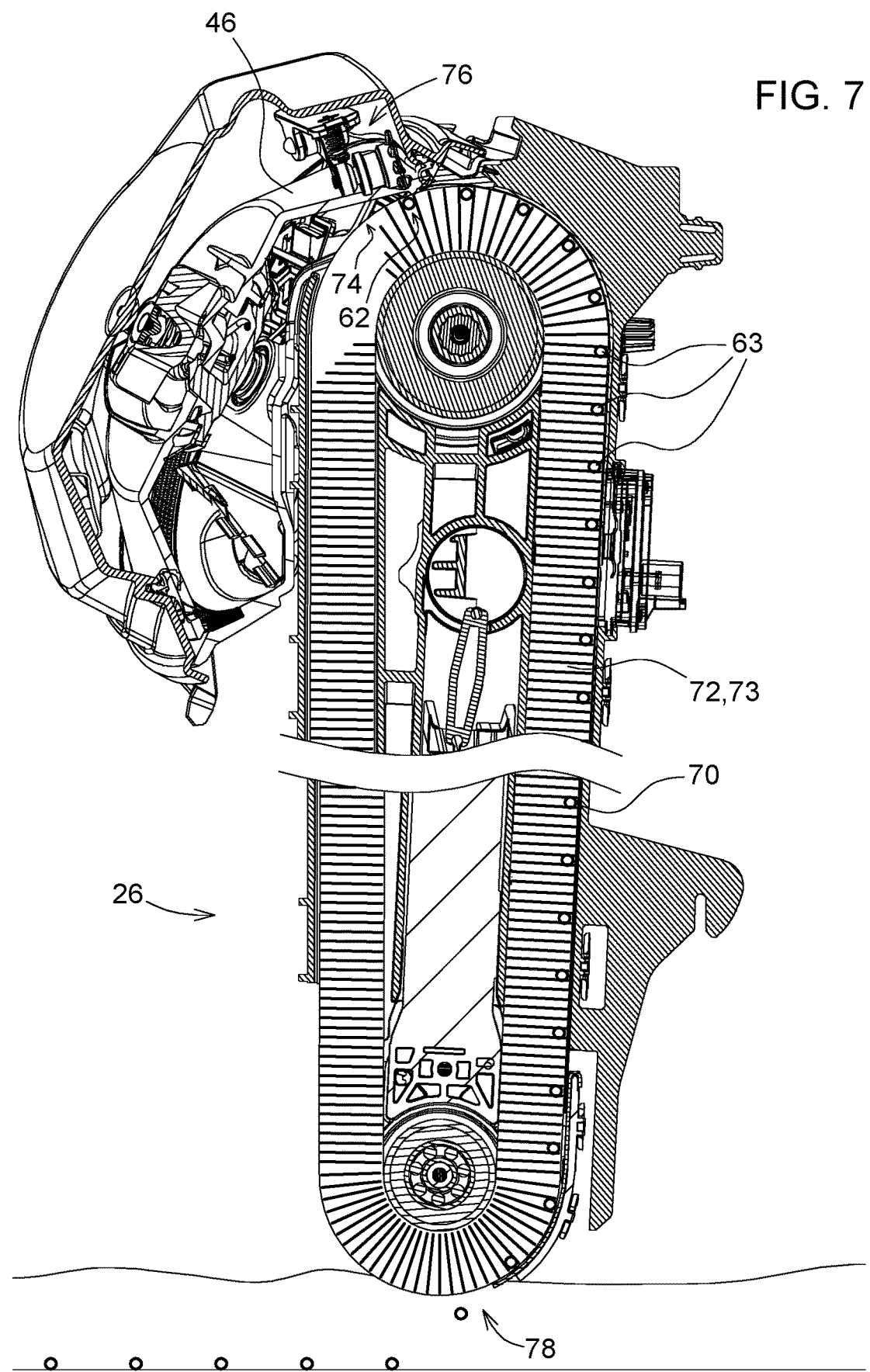
FIG. 7 is a partial cross-sectional view of the example seed meter and seed delivery of FIG. 2 showing details of the seed meter and seed delivery system.

As shown in FIG. 7, the seed delivery system 26 is positioned adjacent to the inner wall and beneath the upper portion of seed disc 46 at the release position 62 to take seed 63 from the seed disc 46. It will be understood that other orientations of the seed 46 (or other components) are possible and within the scope of the present disclosure.

With continued reference to FIG. 7, the delivery system 26 includes a housing 70 partially enclosing a continuous seed transport apparatus 72. In the illustrated example the continuous seed transport apparatus 72 is a brush belt that includes a plurality of bristles 73. In other implementations, the seed transport apparatus 72 is an endless flighted belt or another device operable to transfer seed 63 from the seed disc 46 to the ground continuously.

The seed transport apparatus 72 detaches the seed 63 from the seed disc 46 and transports the seed 63 to the ground. In the context of FIG. 7, the seed transport apparatus 72 generally travels in a clockwise direction within the housing 70. An upper opening 74 is formed in the housing 70 in order to allow the seed 63 to enter the housing 70 from the seed disc 46. The bristles 73 extend through the opening 74 in order to receive the seed 63 from seed disc 46. As also noted above, it will be understood that other configurations are within the scope of the present disclosure. For example, in some instances, the delivery system 26 may be oriented horizontally or at an angle otherwise deviating from vertical, and the opening 75 may be generally viewed as an inlet opening to delivery system 26.

In some instances, an ejector 76 rides on the outer surface 57 of seed disc 46, with projections from a star wheel on the ejector 76 extending, sequentially, into the apertures 56 in order to force seed 63 away from or out of the apertures 56 so that the seed can be received by the seed transport apparatus 72. Thus, the ejector 76 is located adjacent to the outer surface 57 of the seed disc 46 at the location of the release point 62. In some instances, the ejector 76 is biased against the outer surface 57 of the seed disc 46, such as with a spring, and, in response to the rotation of the seed disc 46, the star wheel of the ejector 76 "walks" along seed disc 46 such that successive projections of the star wheel sequentially eject or fully separate the seeds 63 from successive apertures 56 at release position 62. These ejected seeds 63 are captured by the seed transport apparatus 72 (such as within the plurality of bristles 73 of the seed transport apparatus 72) and are carried to a seed ejection point 78.

Figure 8:
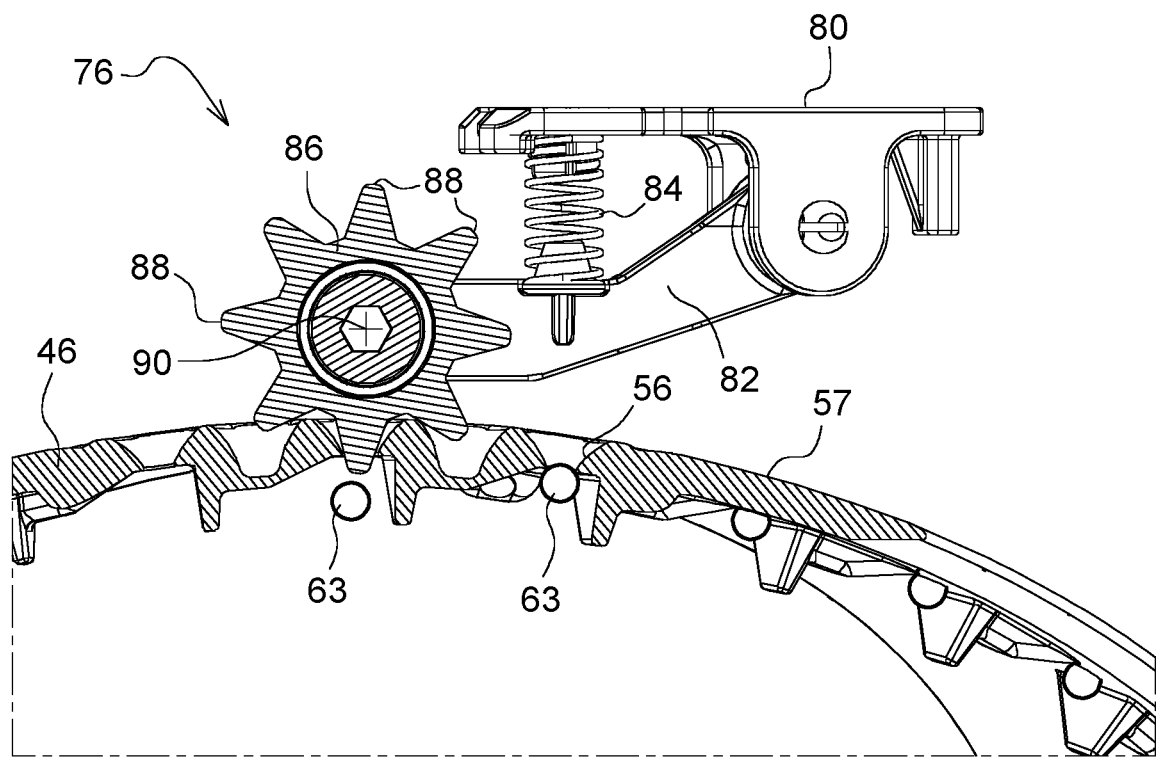
FIG. 8 is a partial cross-sectional view of an ejector disposed adjacent to an exterior surface of seed meter with a delivery system brush belt omitted.
Figure 9:
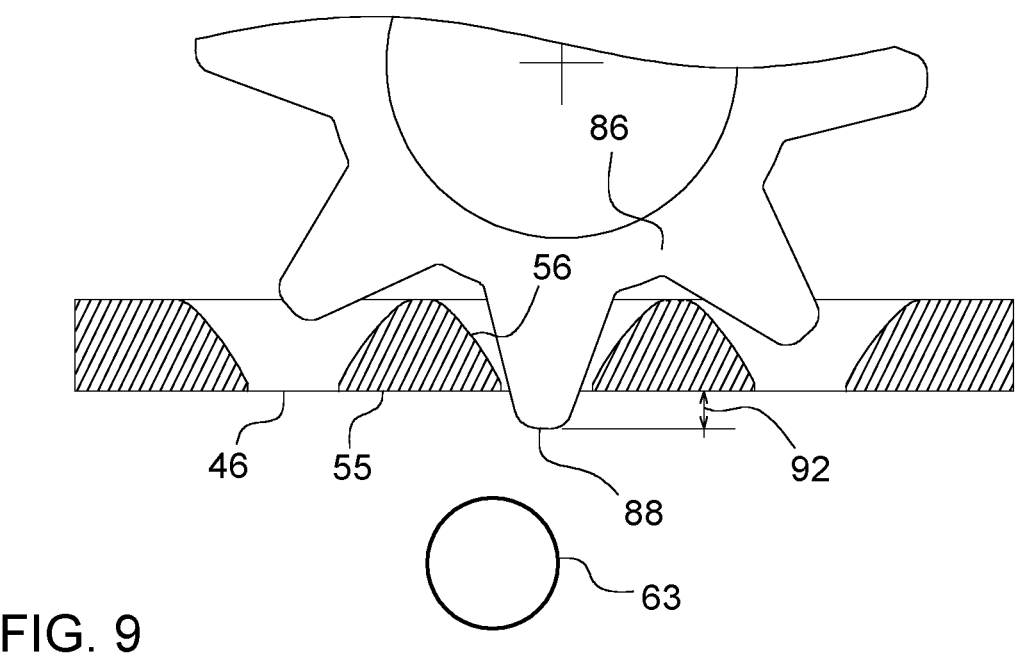
FIG. 9 is a detail view of a wheel of the ejector of FIG. 8 illustrating engagement between a protrusion of the wheel of the ejector and an adjacent seed disc.

FIG. 8 shows a detailed portion of the seed meter 24 showing interaction between the seed disc 46 and the ejector 76. The seed transport apparatus 72 is omitted for clarity. The ejector 76 includes a base 80, a pivot arm 82 pivotably mounted to the base 80, and biasing component 84 (e.g., a spring) that biases the pivot arm 82 towards the outer surface 57 of the seed disc 46. The ejector 76 also include a star wheel 86 rotatably coupled to the pivot arm 82. The star wheel 86 include radially extending protrusions 88 that extend into the apertures 56 formed in the seed disc 46 as the star wheel 86 rotates about an axis 90 as the seed disc 46 rotates. As shown in FIG. 9, the protrusion 88 of the star wheel 86 extends into and through the aperture 56 so as to release the seed 63 from the aperture 56. The protrusion 88 extends beyond the inner surface 55 by a distance 92 that ensures separation of the seed 63 from the seed disc 46. In some implementations, the distance 92 is within a range of approximately 2.0 millimeters (mm) (0.08 inches (in.)) to 5.0 mm (0.20 in.). Further, in some implementations, a size of the protrusions 88 (e.g., a width of the protrusions 88) is selected so that insertion of the protrusions 88 into the apertures 56 occludes the apertures 56 to an extent so as to cease or reduce the applied vacuum to cause the seed 63 to separate from the seed meter 46. For example, in some instances, the protrusions 88 occlude an open area defined by the apertures 56 by between approximately 75% to 100%. The occlusion of the apertures 56 reduces the applied vacuum, which reduces a holding force between the seed and the seed disc 46. In some instances, the applied vacuum force is reduced to approximately zero. In addition to a reduction in applied vacuum, an amount of time of that the vacuum is reduced also assists in releasing seeds from the apertures 56 at the release position 62.

As noted above, seed disc 46 is intended to carry seeds individually and sequentially between the seed pool 60 and the release position 62 (e.g., to carry a single seed 63 between each pair of paddles 64, secured by vacuum applied through the associated aperture 56). In various instances, however, multiple seeds 63 from the seed pool 60 become lodged between a pair of paddles 64 or otherwise adhered to a single aperture 56. As noted above, this condition is referred to as a "seed double" (although, in various instances, more than two seeds may be included). The presence of such seed doubles detrimentally affects the efficiency and efficacy of a planting operation, such as by planting one or more undesired seeds at a particular location in the ground. Seed doubles also result in waste of seed.

The following portion of the description describes different seed double eliminators that operate to release one or more excess seeds from an aperture to ensure a single seed is present at the apertures formed in a seed disc by the time the seed reaches a delivery system of a seed meter.

Figure 10:
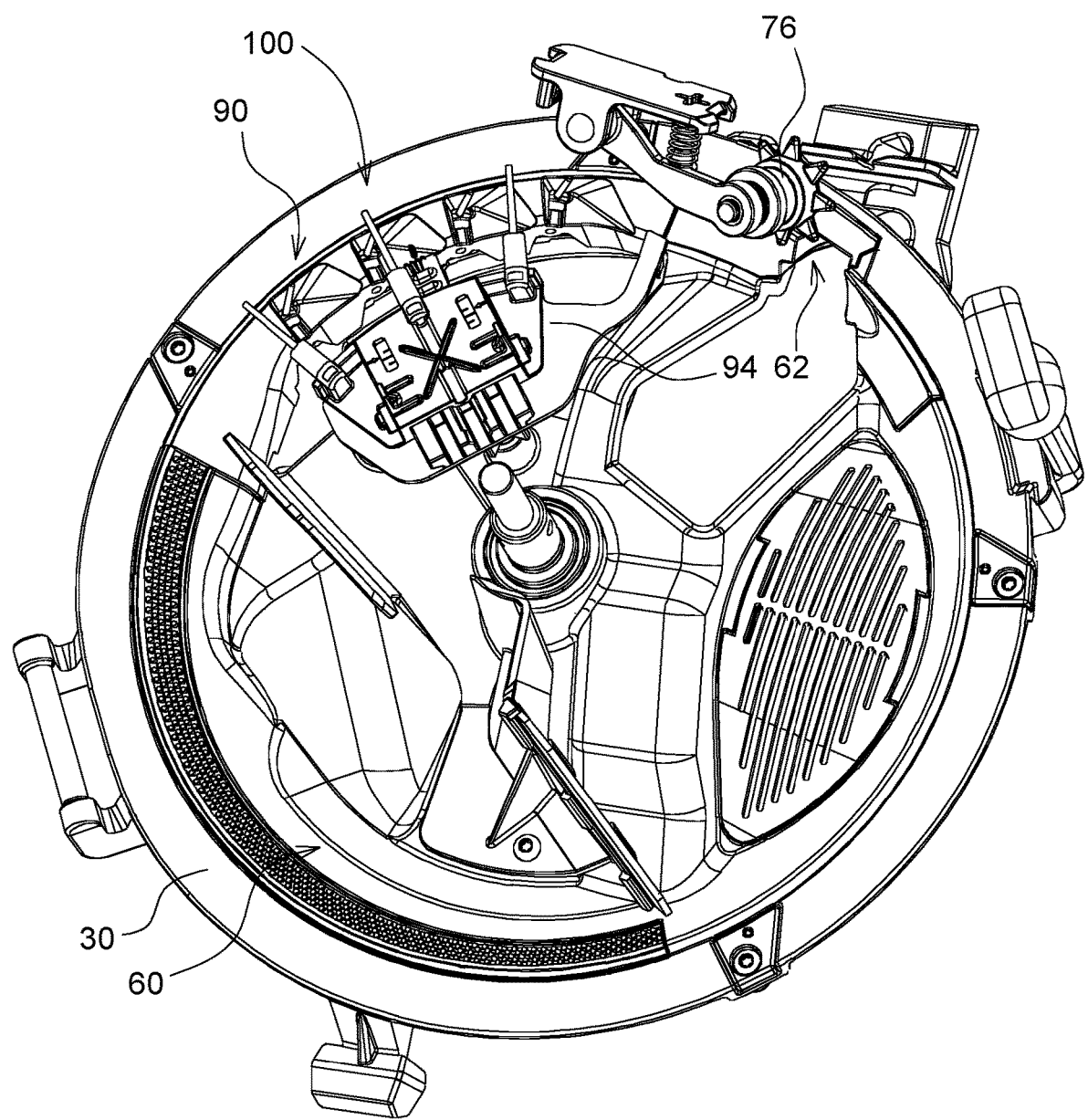
FIG. 10 is a perspective view of the seed meter of FIG. 2 showing internal components thereof, including an example seed double eliminator.

FIG. 10 is a perspective view of the housing 30 of the seed meter 24 with the seed disc 46 omitted to show a first type of seed double eliminator 100. The seed-double eliminators 100 are arranged along a side 102 of the housing 30 and adjacent to the inner surface 55 of the seed disc 46.

Figure 11:
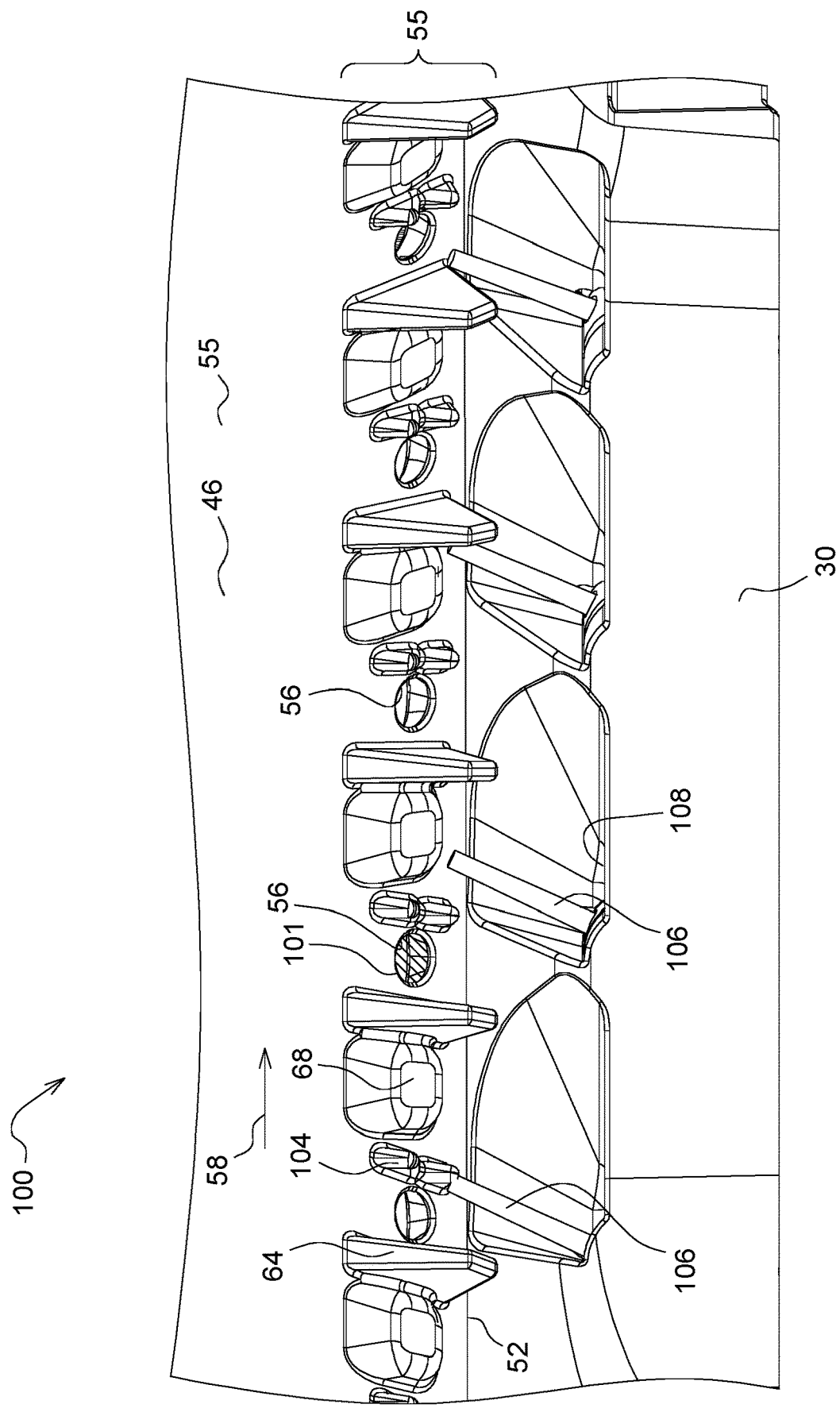
FIG. 11 is a detail view of a seed disc and an example seed double eliminator disposed adjacent to the seed disc, according to some implementations of the present disclosure.
Figure 12:
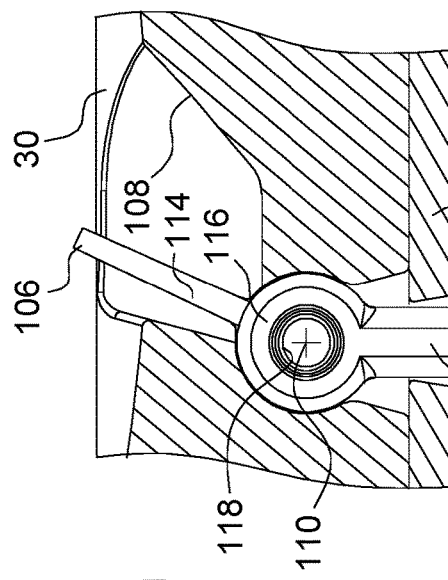
FIGS. 12 through 17 are cross-sectional views of the seed double eliminator of FIG. 11 illustrating a tine of the seed double eliminator adjusted to different angular orientations.
Figure 13:
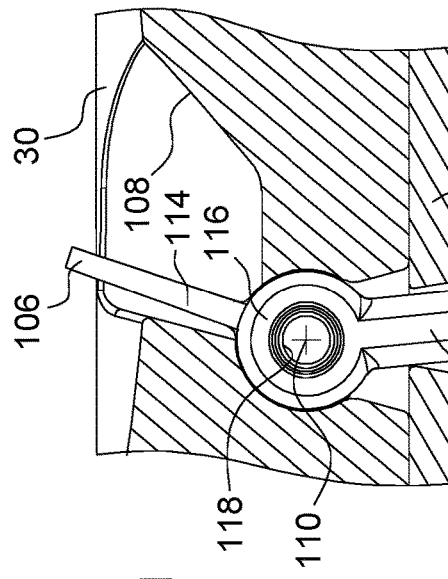
Figure 14:
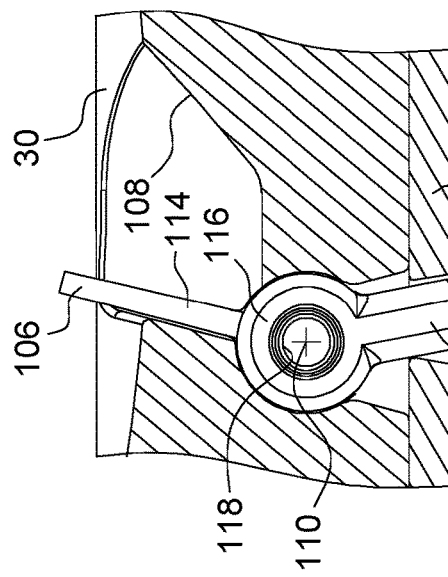
Figure 15:
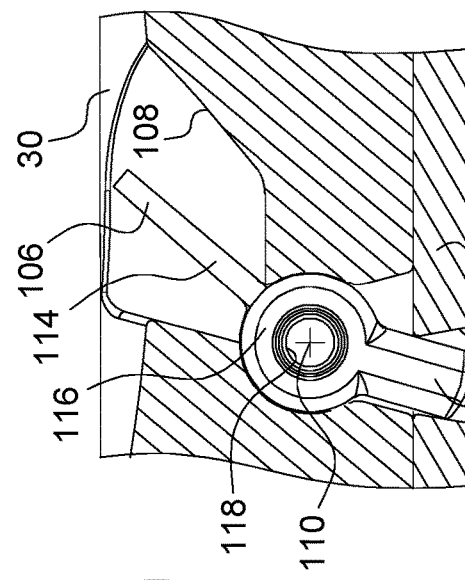
Figure 16:
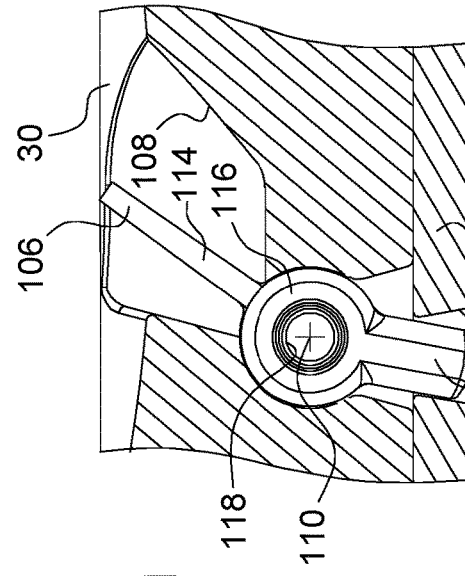
Figure 17:
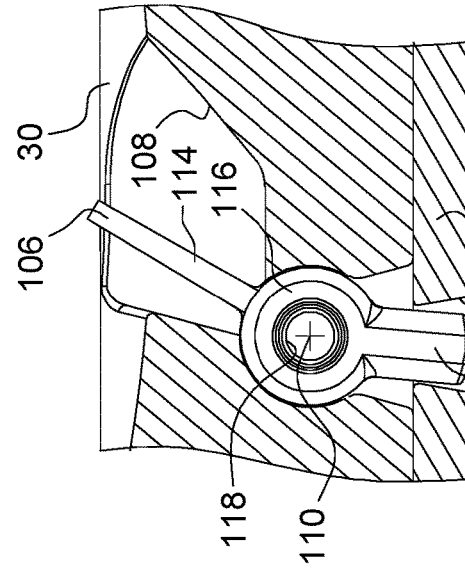

FIG. 11 is detail view of a portion of the seed disc 46 and a portion of the housing 30 of the seed meter 24. As explained earlier, the seed disc 46 includes a plurality of apertures 56 formed along the rim portion 54. Each aperture 56 defines an opening area 101 (indicated by the cross-hatching), defining an area of an opening of the apertures 56, such as where the aperture 56 intersects the inner surface 55. A first paddle 64, a second paddle 104, and a raised feature 68 are disposed between adjacent apertures 56. The first paddles 64 and second paddles 104 and the raised features 68 extend inwardly from the inner surface 55 of the seed disc 46. Arranged adjacent to the outer edge 52 is a plurality of adjustable tines 106. Each tine 106 extends towards the rim portion 54 along the inner surface 55 of the seed disc 46. The tines 106 operate to remove excess seeds from seed doubles so that a single seed is retained at an aperture 56.

As the seed disc 46 rotates in the direction of rotation 58, the tines 106 engage the seed or seeds that are retained at the location of each aperture 56. The tines 106 disrupt a position of or otherwise unsettle the seed or seeds, and, if a seed double is located at a particular aperture 56, the disruption caused by the tines 106 is sufficient to cause any excess seed (e.g., any seed in excess of one seed) to be dislodged. The released seed separates from the location of the aperture 56 and returns to the seed pool 60, described earlier. In this way, seeds are conserved, and a single seed is retained at each aperture 56 for transfer to the delivery system 26 and subsequent transportation to the ground.

The tines 106 are retained in cavities 108 formed in the housing 30 or in a body received into the housing 30. The tines 106 are pivotable within the cavities 108 to alter an angular orientation of the tines 106, which affect an amount by which the tines 106 engage the seed located at the apertures 56. In the illustrated example, four tines 106 are shown. However, in other instances, additional or fewer tines 106 are provided.

Figure 18:
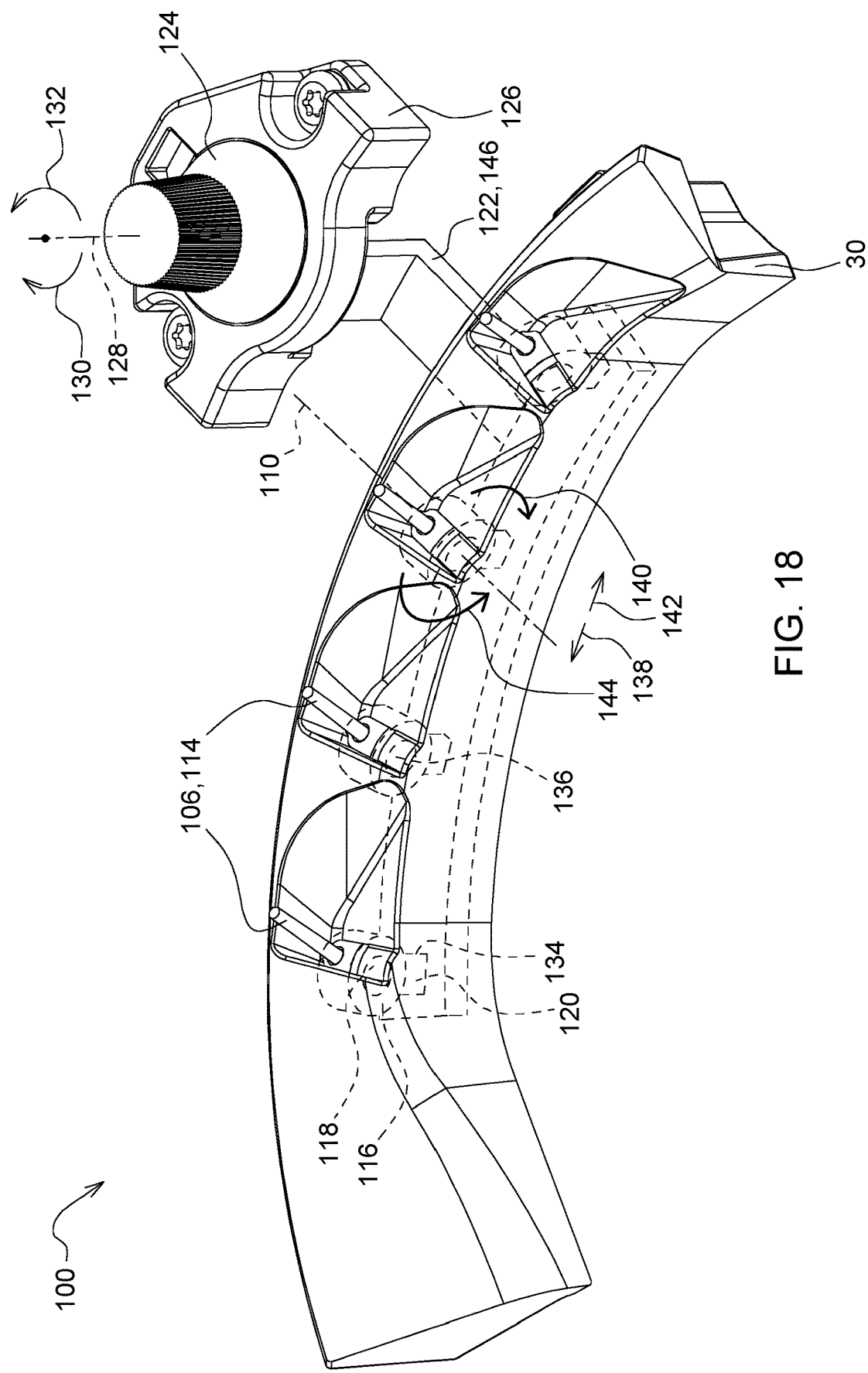
FIG. 18 is a perspective view of the seed double eliminator of FIG. 11 showing the engagement between a plurality of tines and a frame whose position is adjustable in response to operation of a position selector.

FIGS. 12 through 17 show a tine 106 adjusted to different angular orientations by pivoting the tines 106 about a pivot axis 110. The tines 106 are movable over a range of positions. Particularly, FIGS. 12 through 18 show the tine 106 at a 0° position (FIG. 12) and at a 25° position (FIG. 18). In the illustrated example, the tines 106 are movable over an angular range of approximately 25°. In some implementations, the angular range may exceed 25° (e.g., adjustable over a 30° range or greater); in other implementations, the angular range may be less than 25°. In some implementations, the tines 106 are moveable individually. In some implementations, the tines 106 are movable together synchronously. Thus, in some implementations, the tines 106 are movable together such that each tine 106 has the same angular orientation as the other tines 106. In some instances, the tines are movable in 1°, 5°, or 10 increments. In other implementations, the tines 106 are movable in any selected increment. In other implementations, the tines 106 are moved in unison in one or more groups. In some implementations, the tines 106 for a single group move together in response to alterations to orientation. In other implementations, the tines 106 are arranged in two or more groups, and the tines 114 of each group are adjustable independently in unison.

FIG. 18 is a perspective view of the seed double eliminator 100. In the illustrated example, the double seed eliminator 100 includes four tines 106 having an angular orientation that is adjustable. As explained earlier, in other implementations, additional or fewer tines 106 may be included. As shown, each tine 106 includes an elongated portion 114 and a body portion 116 defining an aperture 118 and a protrusion 120 extending from the body portion 116. In some implementations, the elongated portion 114, body portion 116, and the protrusion 120 form a unitary component. In other implementations, the elongated portion 114 is a separate component that is attached to the body portion 116. In some implementations, the protrusion 120 is an integral part of the body portion 116. In other implementations, the protrusion 120 is attached to the body portion 116.

The seed double eliminator 100 also includes a frame 122 and a selector 124 mounted to a housing 126 and coupled to the frame 312. In the illustrated example, the frame 122 has a curved shape and resides in a slot 152 (shown in FIGS. 19 and 20) formed in the housing 30 that is arc-shaped. In other implementations, the frame 122 and the slot 152 can have other shapes. In this example, the selector 124 is in the form of a dial that is rotated about an axis 128 to alter a position of the frame 122 relative to housing 30 in the direction of arrows 130 and 132. The frame 122 includes openings 134 into which the protrusions 120 are received.

The tines 106 are retained in the cavities 108 formed in the housing 30. The tines 106 are mounted on shafts 136 provided in the cavities 108. The shafts 136 and are received into the apertures 118. The tines 106 are pivotable on the shafts 136 in response to movement of the frame 122. In operation, as the selector 124 is rotated, for example, in a first rotational direction corresponding to arrow 130, the frame 122 moves in the direction of arrow 138, for example. Movement of the frame 122 in the direction of arrow 138, in response, imparts a moment to the tines 106 via interaction between the frame 122 and the protrusions 120, causing the tines 106 to pivot on the respective shafts 136 about the pivot axis 110 in a third rotational direction corresponding to arrow 140. As a result, a rotational orientation of the tines 106 is altered. Similarly, rotation of the selector 124 in a second rotational direction corresponding to arrow 132, opposite the first rotational direction, causes the frame 122 to move in the direction of arrow 142, causing the tines 106 to pivot in a fourth rotational direction corresponding to arrow 144. Altering a position of the tines 106 in this way alters an amount by which the tines 106 interact with the seed or seeds at the apertures 56 and, in some instances, an amount by which the tines 106 extend across the apertures 56. A degree to which the tines 106 engage the seeds and, in some instances, obstruct the apertures 56 can cause excess seeds (e.g., any number of seeds exceeding a single seed at an aperture) to become dislodged, thereby singulating seeds at the apertures 56.

Figure 19:
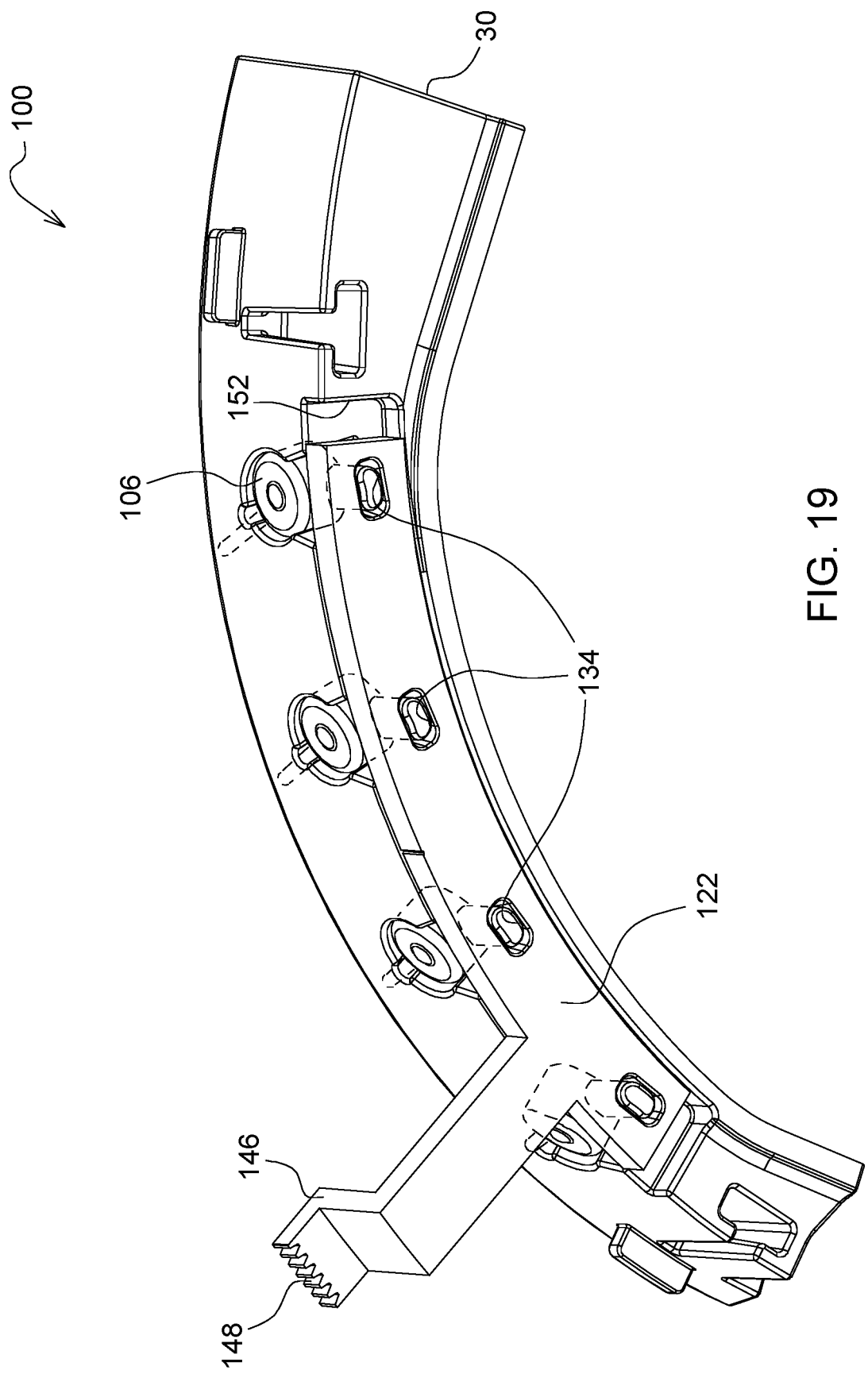
FIGS. 19 and 20 are perspective views showing aspects of the seed double eliminator of FIG. 11.
Figure 20:
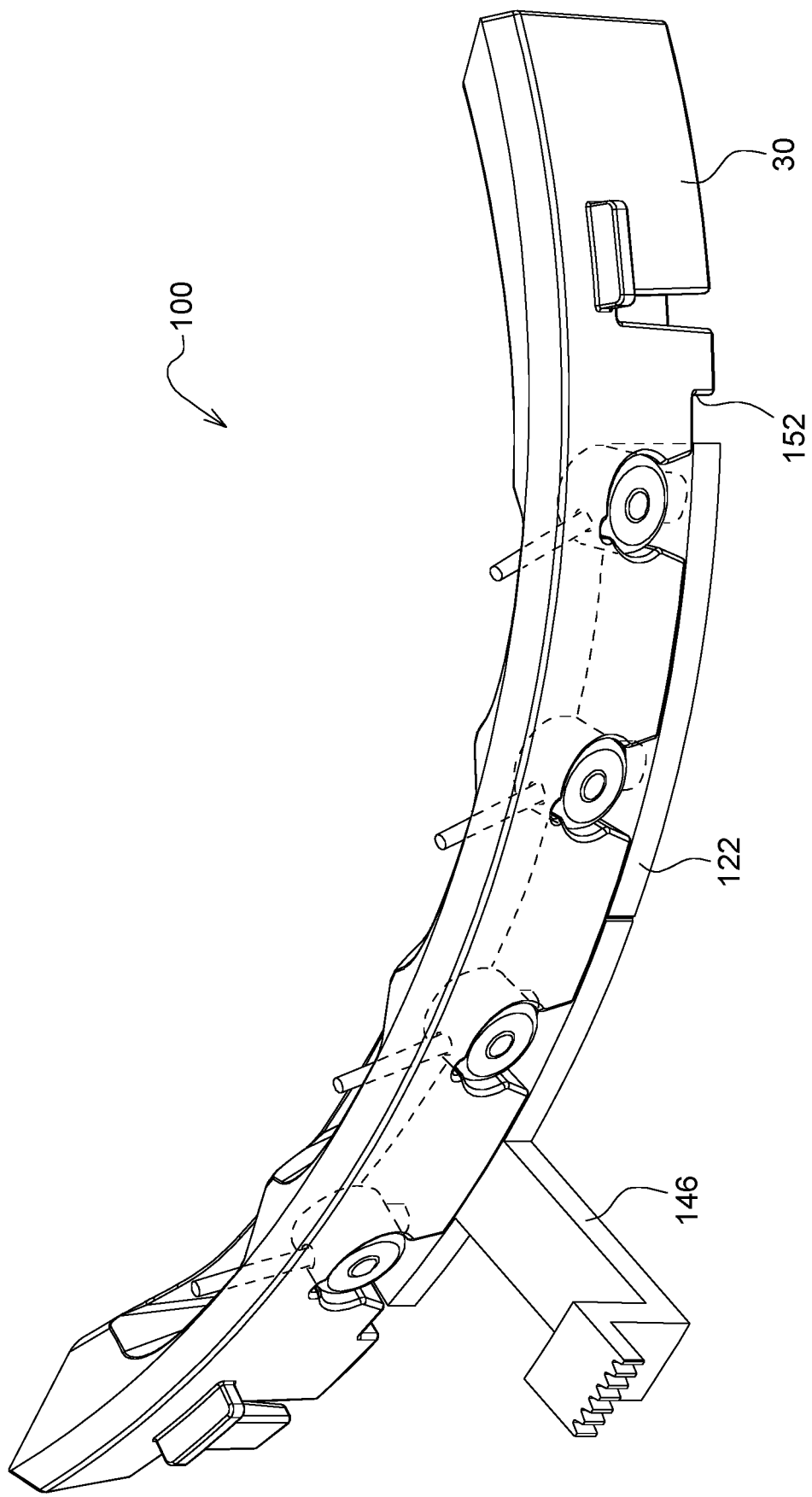

FIGS. 19 and 20 are perspective views of the double seed eliminator 100 with the selector 124 and housing 126 omitted. The frame 122 includes an arm 146 having a geared surface 148 (e.g., gear teeth) that interacts with a mating gear 150 included on the rotatable selector 124, shown in FIG. 21. The gear 150 intermeshes with the geared surface 148 to alter a position of the frame 122 and, thus, a rotational orientation of the tines 106.

Figure 21:
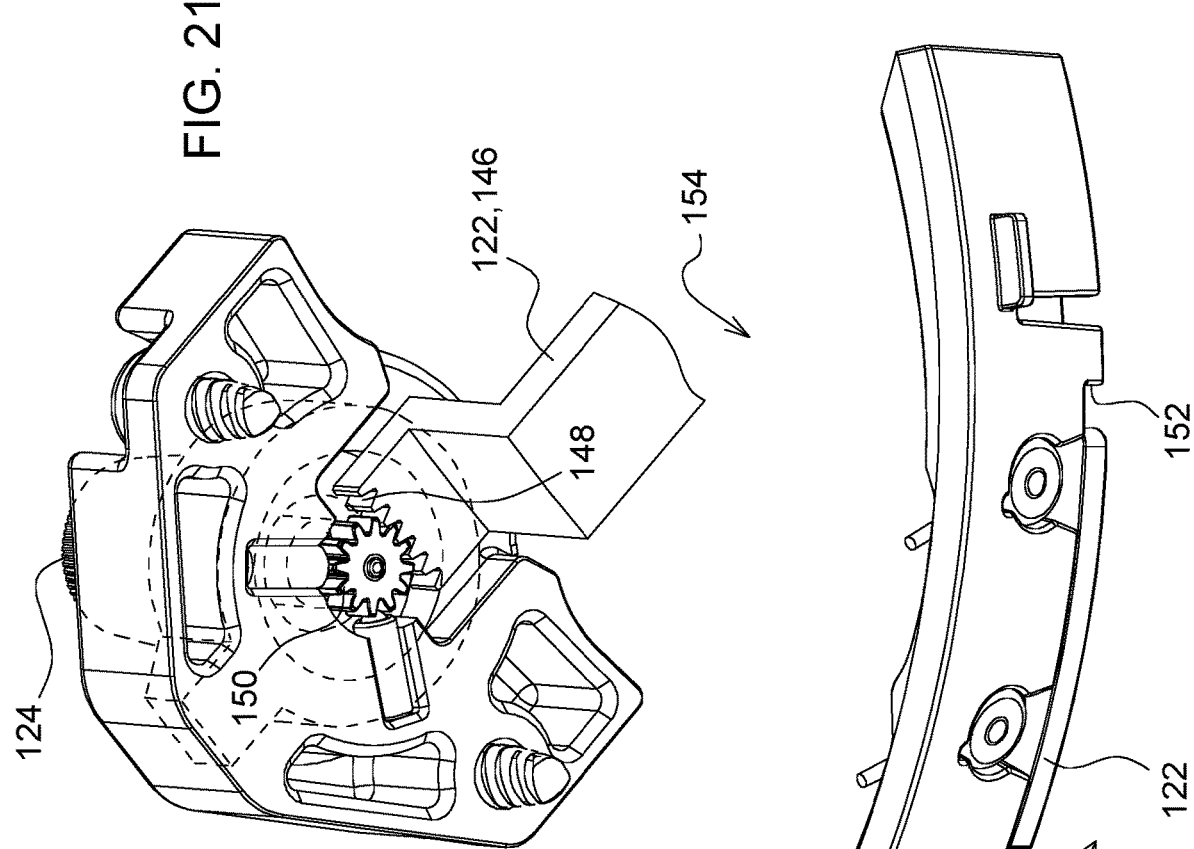
FIG. 21 is a detail view of a selector of the seed double eliminator of FIG. 11.

FIG. 21 is a detail view of an interface between the gear 150 of the selector 124 and the geared surface 148 of the arm 146 of the frame 122. Rotation of the selector 124 causes translational movement of the frame 122 to alter a rotational orientation of the tine assemblies 304, as explained earlier. As shown, the frame 122 is received within a slot 152 formed in the housing 30. The frame 122 is slideable within the slot 152 in response to actuation of the selector 124. As explained earlier, in some implementations, a path traveled by the frame 122 within the slot 152 is arc-shaped. That is, actuation of the selector 124 (e.g., rotation of the selector 124 in the context of implementation shown in FIGS. 19 through 21) causes the frame 122 to slide along the arc within the arc-shaped slot 152. In other implementations, the frame 122 slides along a linear path in response to operation of the selector 124. Thus, in some implementations, the slot 152 has a linear shape.

Figure 22:
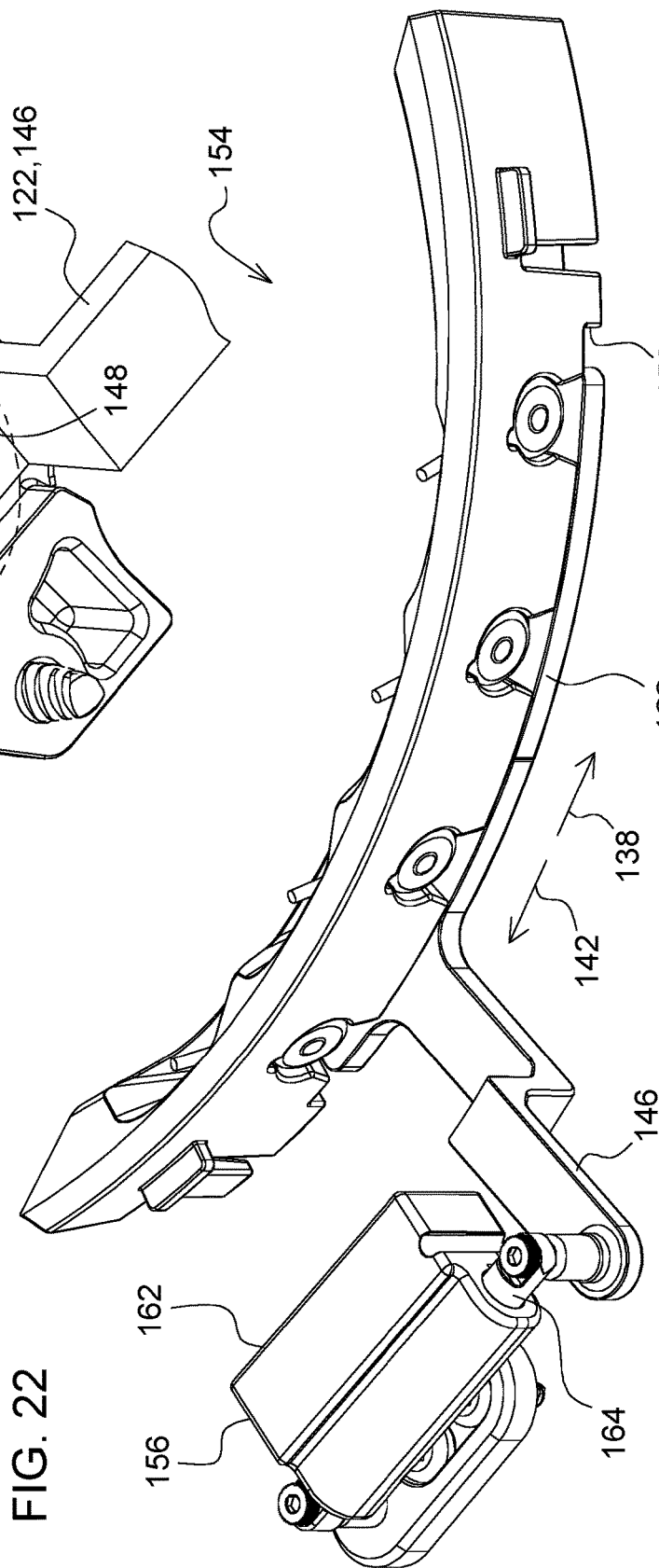
FIG. 22 is a perspective view of another example seed-double eliminator of FIG. 11 in which movement of a frame is altered by an actuator.

FIG. 22 is a perspective view of another example seed double eliminator 154 in which movement of the frame 122 is altered using an actuator 156. The actuator 156 is operable, such as in response to input received from a user, to displace the frame 122 within the slot 152. In some implementations, the actuator 156 is an electric actuator. However, the actuator includes other types of actuators, such as hydraulic and pneumatic actuators. In some implementations, actuation of the actuator 156 is directed via an input device, e.g., a button, dial, keyboard, slide, etc., that is available, for example, in a cab of a vehicle, on an implement carrying the 24, or from a remote location.

In the illustrated example, the actuator 156 includes a body 162 and a moveable arm 164 that is extendable and retractable from the body 162. The arm 164 is coupled to the arm 146 of the frame 122, such as via a pinned connection. Extension of the arm 164 in the direction of arrow 166 cause movement of the frame 122 within the slot 152 in the general direction of arrow 138. As explained above, the frame 122 move along an arc-shaped path within the slot 152 due to the arc shape defined by the slot 152. In other implementations, the frame 122 may move along a straight or linear path in response to actuation of the actuator 156. In response to movement of the frame 122, an angular orientation of the tines 106 is altered in a first rotational direction by pivoting of the tines 106 on the shafts 136. Retraction of the arm 164 in the direction of arrow 142 causes the frame 122 to move in the general direction of arrow 142, which, as explained may be a curved path or linear path as may be defined by the slot 152. In response to retraction of the arm 164, the angular orientation of the tines 106 is altered in a second rotational direction, opposite the first rotational direction, by pivoting of the tines 106 on the shafts 136.

Figure 23:
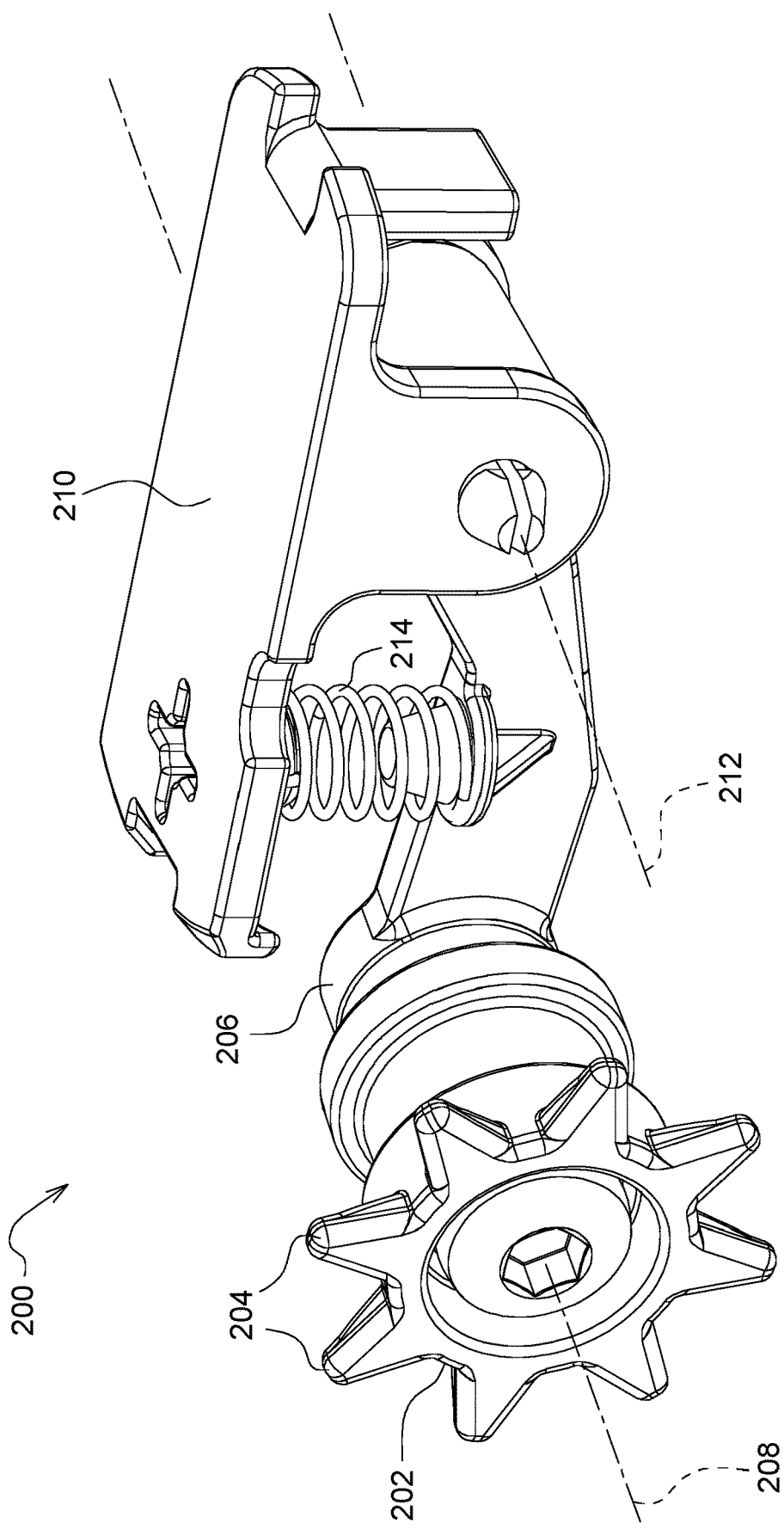
FIGS. 23 and 24 are oblique views of another example seed double eliminator, according to some implementations of the present disclosure.
Figure 24:
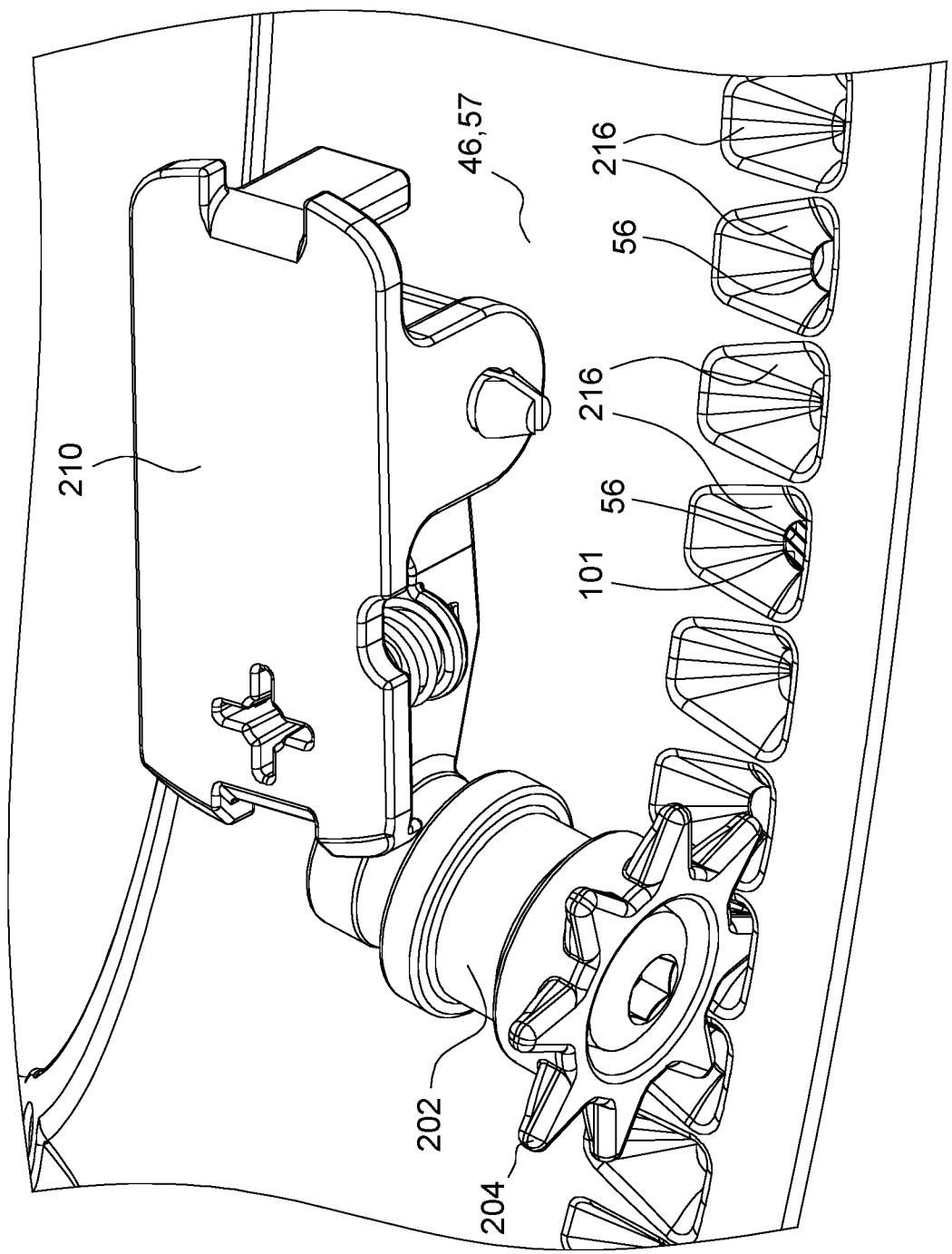
Figure 25:
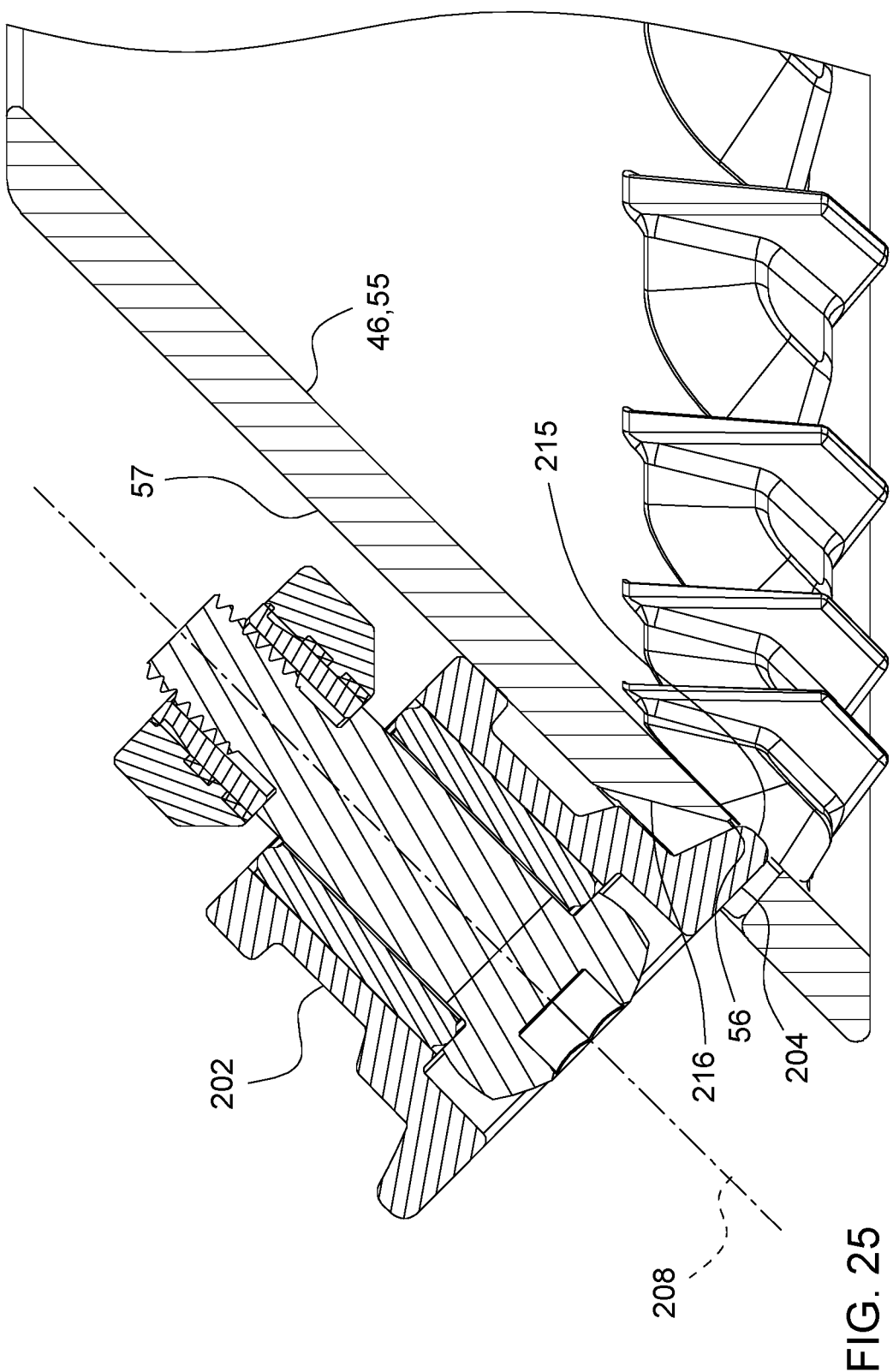
FIG. 25 is a cross-sectional view of the seed double eliminator of FIGS. 23 and 24.

FIGS. 23 through 25 show another example seed-double eliminator 200. The seed-double eliminator 200 includes a rotatable wheel 202 disposed adjacent to the outer surface 57 of the seed disc 46. In some implementations, the wheel 202 is passively operated in response to rotation of the seed disc 46. In some implementations, the wheel 202 includes a plurality of protrusions 204 disposed radially about a center of the wheel 202. In some implementations, the wheel 202 is formed from a rigid material, such as a rigid polymer (e.g., plastic), a metal, or a composite material. The wheel rotates on an arm 206 about an axis 208. The arm 206 is pivotably mounted to a base 210 about an axis 212. In some implementations, the axis 208 and the axis 212 are not parallel. This configuration allows the wheel 202 to ride along a contour of the outer surface 57 of the seed disc 46 as the seed disc 46 rotates. A spring 214 is provided between the base 210 and the arm 206 to bias the wheel 202 towards the seed disc 46 and away from the base 210.

As the seed disc 46 is rotated, recesses 216 formed in the outer surface 57 of the seed disc 46 engage with the protrusions 204 of the wheel 202 to cause the wheel 202 to rotate. Some of the recesses 216 correspond to the raised features 68 and other correspond to the apertures 56. As the wheel 202 rotates, the protrusions 204 extend into the apertures 56 and beyond the inner surface 55. As a protrusion 204 extends into the aperture 56 (as shown in FIG. 25), seed retained at the aperture 56 is slightly disturbed. The protrusion 204 also affects a vacuum applied to the seed through the aperture 56. As a result, of the disturbance caused by the protrusion 204, any excess seed provided at an aperture 56 is dislodged and removed from the aperture 56, leaving a single seed at the aperture 56. Therefore, operation of the excess seed eliminator 800 operates to singulate seeds at each aperture 822.

Figure 45:
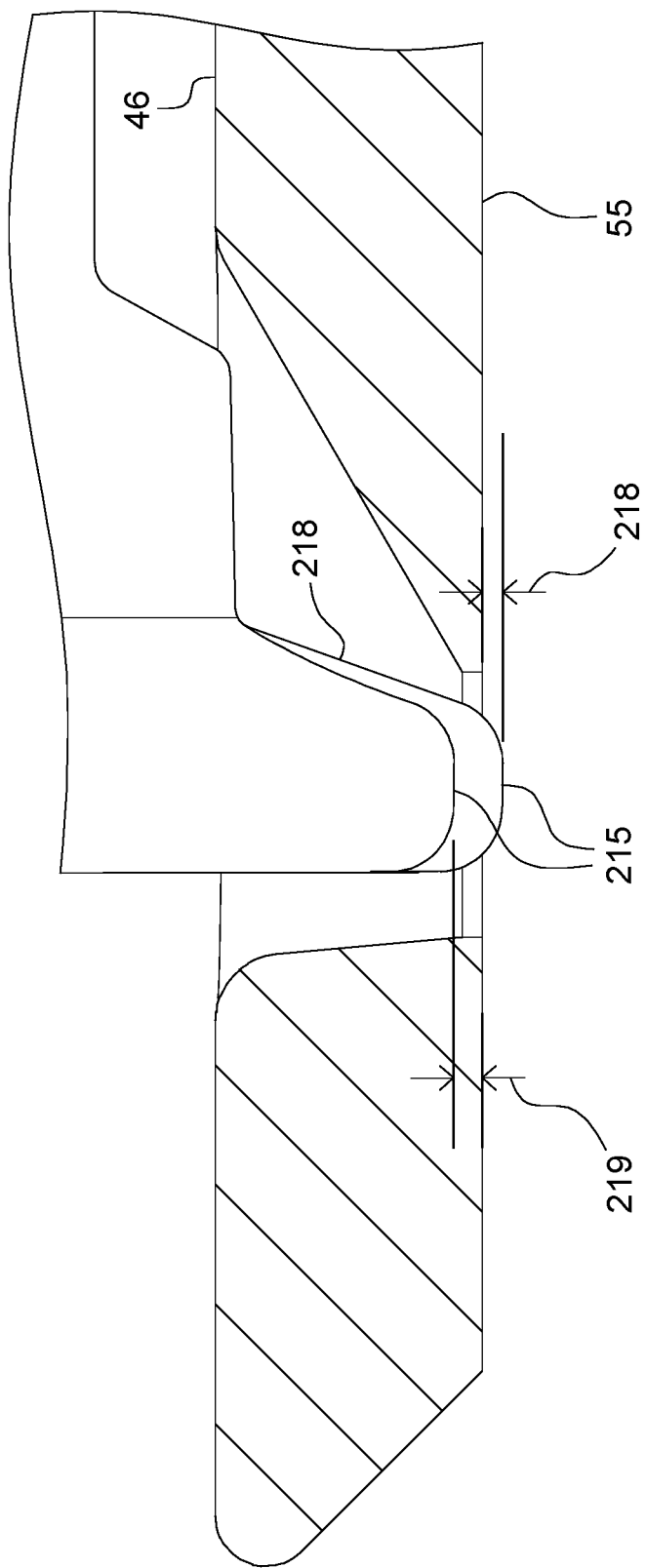
FIG. 45 is a detail view of a portion of the seed double eliminator shown in FIG. 25.

In some implementations, the protrusions 204 extend beyond and is, thus, located inboard of the surface 55 by a distance 218. In other implementations, the protrusion 204 is located outboard of the surface 55. As illustrated in FIG. 45, in some instances, an end 215 of the protrusion 204 is positioned inboard of the surface 55 by a distance 218 when the protrusion 204 is aligned with the aperture 56. In some instances, the distance 218 may be up to 1.0 mm (0.04 in.) when the protrusion 204 is aligned with the aperture 56. In other instances, the end 215 of the protrusion 204 is located outboard of the surface by a distance 219. In some instances, the distance 219 may be up to 0.5 mm (0.02 in.). In some instances, the end 215 of the protrusion 204 is flush with the surface 15 when the protrusion 204 is aligned with the aperture 56. Thus, a position of the end 215 of the protrusion can be within a range 1.0 mm (0.04 in.) outboard of the surface 55 to 0.5 mm (0.02 in.) inboard of the surface 55. As a result, an amount by which the protrusions 204 of the seed-double eliminator 200 extends beyond the inner surface 55 of the seed disc 46 is up to a factor of ten less than the amount by which the protrusions 88 of the ejector 76 extend beyond the inner surface 55 of the seed disc 46.

In some implementations, the protrusions 204 do not extend beyond the surface 55. Rather, as explained earlier, the end 215 of the protrusions 204 may be flush with the surface 55 or be outboard of the surface 55 when the protrusions 204 are aligned with an aperture 56. In such instances, the protrusions 204 disrupt the applied vacuum force to release excess seeds while reducing or eliminating an amount of direct contact between the protrusions 204 and the seeds located at the apertures 56. Thus, in such instances, although the protrusions 204 do not extend inwardly beyond the surface 55, the protrusions 204 may contact a portion of a seed extending outwardly beyond the surface 55, disrupting a position of the seed relative to the aperture 56. In this way, the protrusions 204 operate to unsettle or disrupt the seed doubles existing at an aperture 56 to release excess seeds while retaining a single seed at the aperture 56. Additionally, the protrusions 204 occlude the open area of the apertures by between approximately 25% and 75%.

Figure 46:
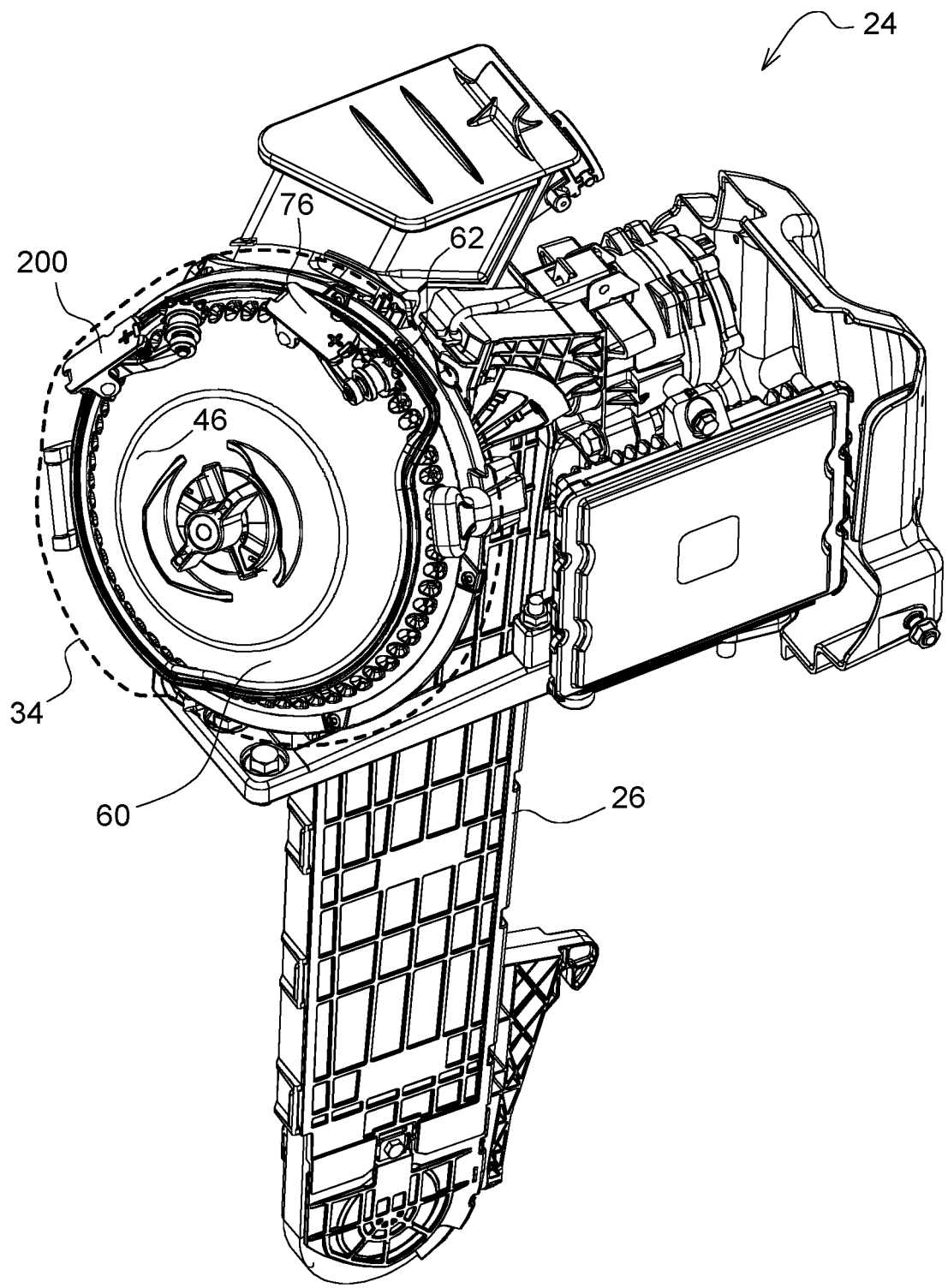
FIG. 46 is an oblique view of a portion of the seed meter of FIG. 2.

Further, the seed double eliminator 200 is located along the seed disc 46 at a location between the seed pool 60 and the release point 62. FIG. 46 is an oblique view of a portion of the seed meter 24. As shown in FIG. 46, the seed double eliminator 200 is located between the seed pool 60 and the release point 62, where the ejector 76 is located, along a seed path (i.e., a path followed by the seed from the seed pool 60 to the release point 62). The seed double eliminator 200 works to singulate seeds at the apertures 56 as the seed disc 46 rotates and prior to the seeds reaching the ejector 76 where the seeds are separated from the seed disc 46 at the release position 62. Consequently, the seed double eliminator 200 is located upstream of the release point 62. Thus, the seed double eliminator 200 differs from the ejector 76, described above, in the function, the location along the seed disc 46, and the amount of penetration of the respective protrusions beyond the inner surface 55 of the seed disc 46. Particularly, the seed double eliminator 200 functions to unsettle seeds located at an aperture sufficiently to release excess seed (e.g., seeds in excess of a single seed at the apertures 56) while retaining a single seed at the aperture as opposed to removing all seeds from an aperture 56 and depositing the seed into the seed transport apparatus 72 of the delivery system 26, as performed by the ejector 76. The seed-double eliminator 200 is located upstream of the delivery system 26 and is, therefore, not intended to displace seed onto the seed transport apparatus 72 for conducting seed to the ground. Additionally, the protrusions 88 of the ejector 76 extend a larger distance beyond the inner surface 55 of the seed disc 46 to ensure separation of any seed located at an aperture 56 and, in some instances, obstruct a larger portion of the opening area of the apertures 56 to reduce an applied vacuum sufficiently to ensure separation of any seed at the apertures 56. The protrusions 204 of the seed-double eliminator 200, on the other hand, extend beyond the inner surface 55 of the seed disc 46 and obstruct a portion of the opening area of the apertures 56 merely to unsettle any seed present thereat to ensure separation of any excess seed and retain a single seed at the apertures 56. Consequently, unlike the ejector 76, the seed-double eliminator 200 operates to conserve seed, reduce costs, and improve the efficiency of a planting operation.

Figure 47:
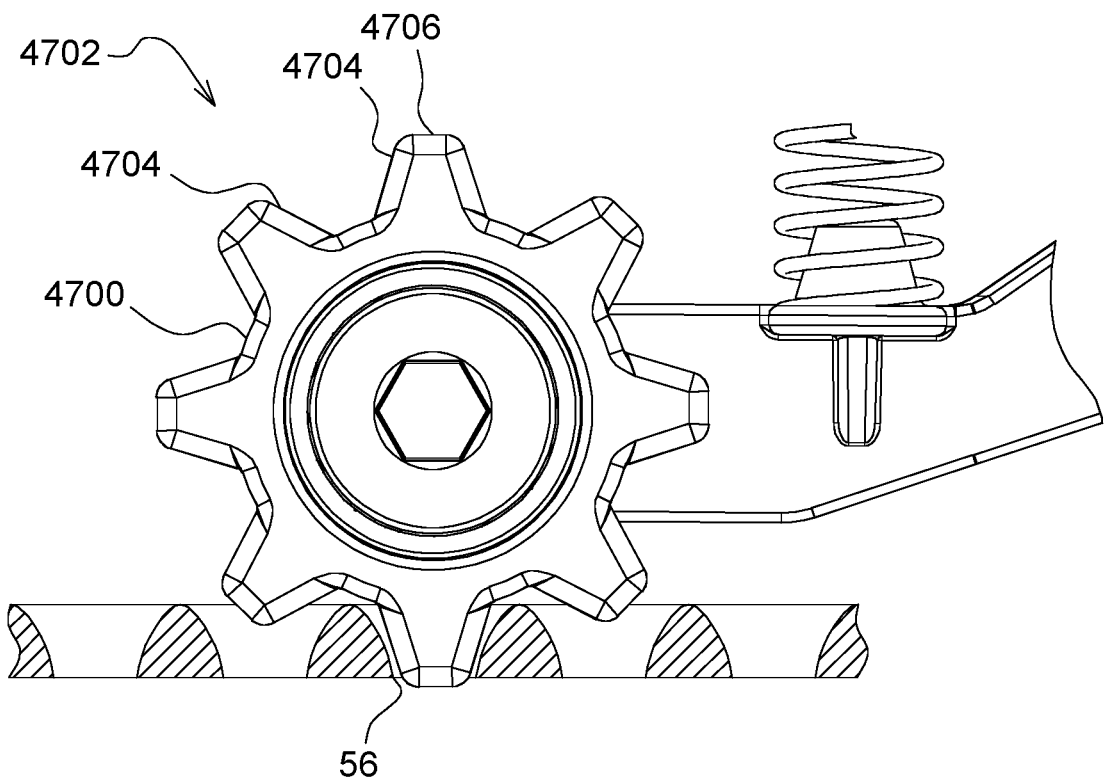
FIG. 47 is a side view of an example seed double eliminator having a wheel with protrusions having flattened ends.
Figure 48:
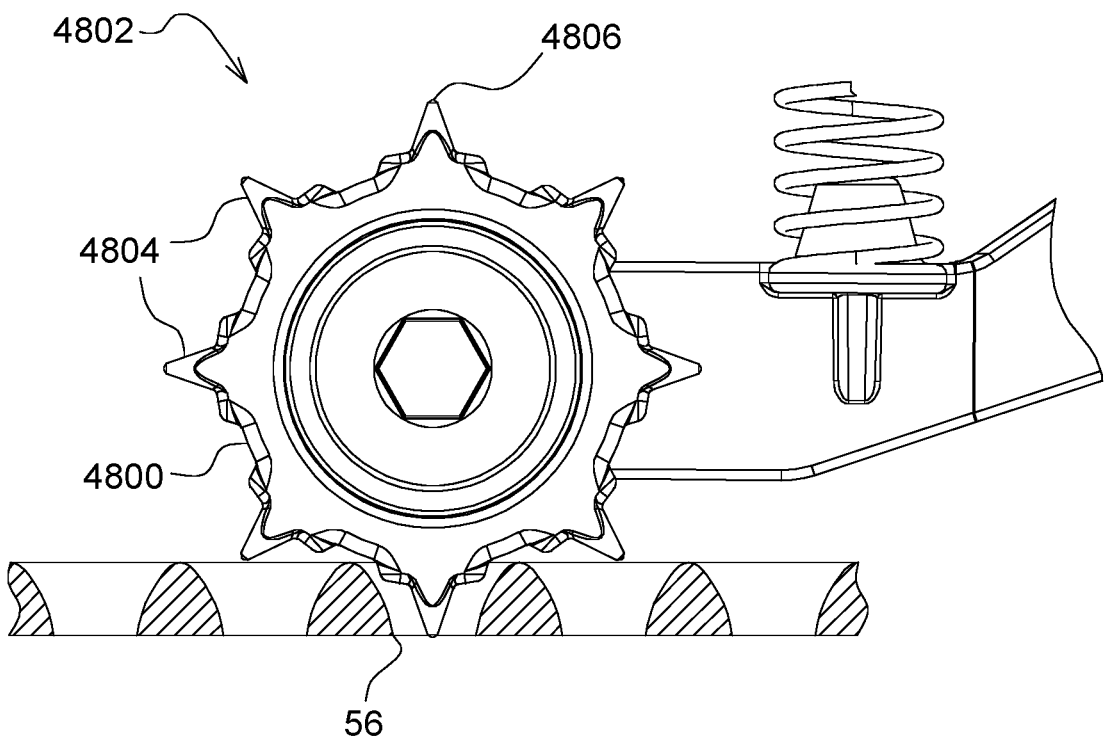
FIG. 48 is a side view of another example seed double eliminator having a wheel with protrusions with a conical shape.

FIGS. 47 and 48 show wheels 4700 and 4800 of seed double eliminators 4702 and 4802, respectively. Each of the wheels 4700 and 4800 include protrusions that are different in shape. The wheel 4700 has protrusions 4704 similar to those of the wheel 202. The protrusions 4704 have a flattened end 4706. In the illustrated example, the protrusion 4702 occupies a majority of the opening area of the aperture 56. As a result, the protrusion 4704 of the illustrated example reduces the vacuum force applied at the aperture 56, which assists in separating excess seeds from the aperture 56. In contrast, the protrusion 4804 of the wheel 4800 have a pointed or conical shape 4806. The protrusion 4804 occupies a lesser amount of the opening area of the aperture 56. Thus, the protrusions 4804 having this shape reduce the applied vacuum force at the apertures 56 to a lesser extent but still operate to unsettle and release excess seeds provided at the aperture 56.

Figure 26:
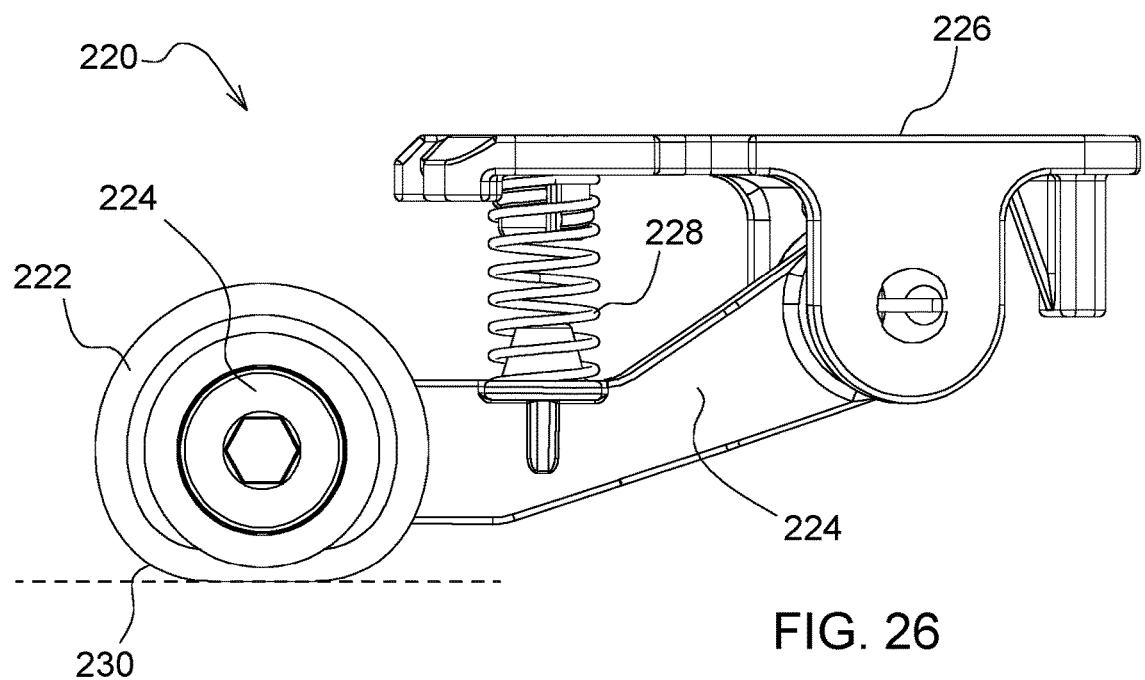
FIG. 26 is a side view of another example seed double eliminator, according to some implementations of the present disclosure.
Figure 27:
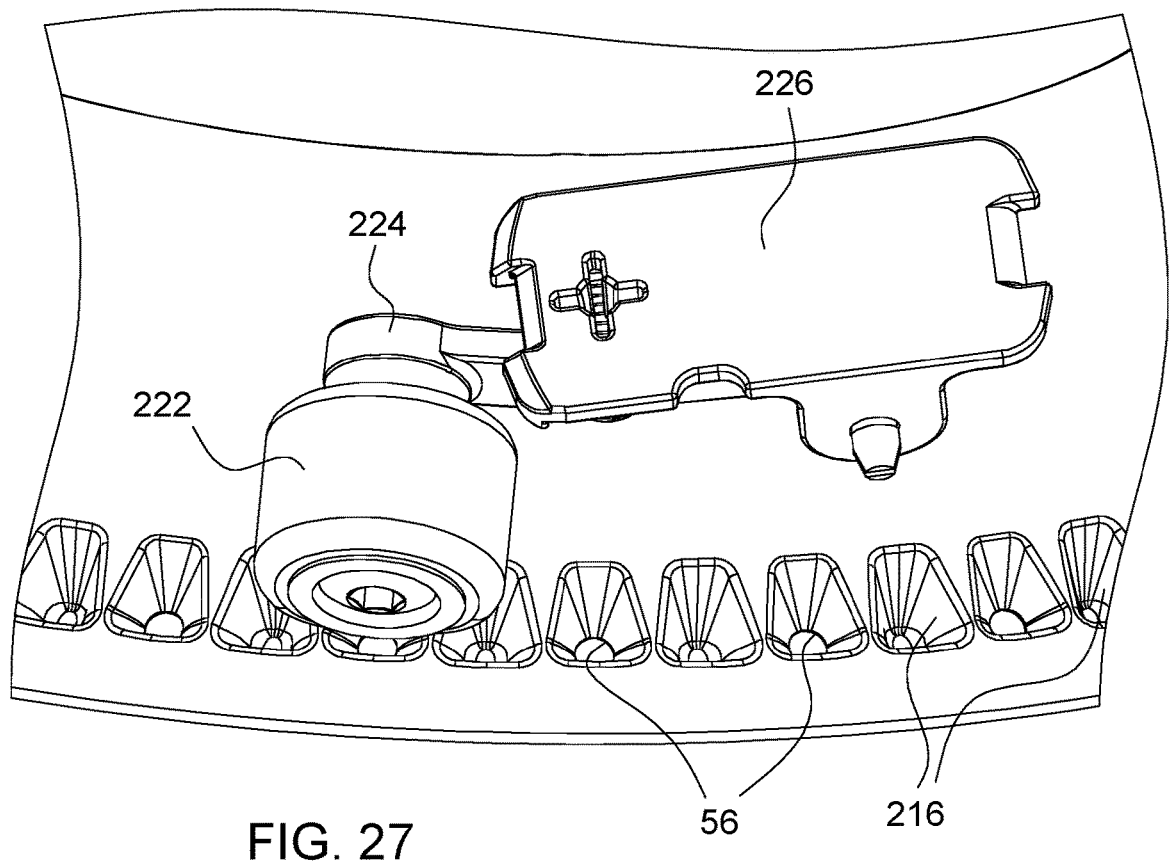
FIG. 27 is an oblique view of the seed double eliminator of FIG. 26.

FIGS. 26 and 27 illustrate another example seed-double eliminator 220. The seed-double eliminator 220 is similar to the seed-double eliminator 200 except that the wheel 202 having the plurality of protrusions 204 is replaced with a deformable wheel 222. In some implementations, the deformable wheel 222 lacks protrusions. In the illustrated the wheel 222 has a smooth surface. In other implementations, the wheel 222 has a textured surface. In some instances, the wheel 222 is formed from a deformable rubber or plastic material. In other instances, the wheel 222 can be formed from any material capable of conforming to a surface. Similar to the seed double eliminator 200, the seed double eliminator 220 includes the wheel 222, an arm 224, and a base 226. The wheel 222 is pivotably mounted to the arm 224, and the arm 224 is pivotably mounted to the base 226. A spring 228 is disposed between the arm 224 and the base 226 to apply a biasing force that urges the arm 224 and wheel 222 away from the base 226. In the illustrated example, the spring 228 is a coil spring. In other implementations, the spring 228 can be other types of springs or components operable to urge the arm 224 to pivot away from the base 226.

A surface 230 of the wheel 222 is deformable, and, as the wheel 222 rotates along the outer surface 57 of the seed disc 46, the surface 230 conforms to a topography or shape of the outer surface 57, particularly in response to the biasing force provided by the spring 228. In some implementations, as the surface 230 of the wheel 222 deforms, a portion of the wheel 222 extends into the recesses 216 formed in the outer surface 57 of the seed disc 46 and partially occludes or covers the apertures 56, thereby reducing the applied vacuum force applied through the apertures 56. As a result of the reduced vacuum force, excess seeds are released from the apertures 56 while retaining sufficient vacuum force to retain one of the seeds at the apertures 56. Consequently, seed singulation is accomplished.

FIGS. 28 through 34 illustrate a rotary seed double eliminator 300. The seed double eliminator 300 includes a rotatable wheel 302 that is positioned adjacent both to the inner surface and the rim portion 54 of the seed disc 46. In the illustrated example, the wheel 302 is rotatably coupled to a housing 304 disposed within the housing 30 via a shaft 305. In some instances, the shaft 305 is a fastener (e.g., a bolt), a pin, or another component on which the wheel 302 can rotate. In some implementations, the shaft 305 rotates relative to the housing 304 via a bearing 307.

In some implementations, the housing 304 forms part of the housing 30. In other implementations, the housing 304 is a separate component secured to or otherwise provided in the housing 30. The wheel 302 is rotatable about an axis 306. In some instances, the axis 306 is perpendicular to an axis of rotation of the seed disc 46, represented by line 308.

Figure 28:
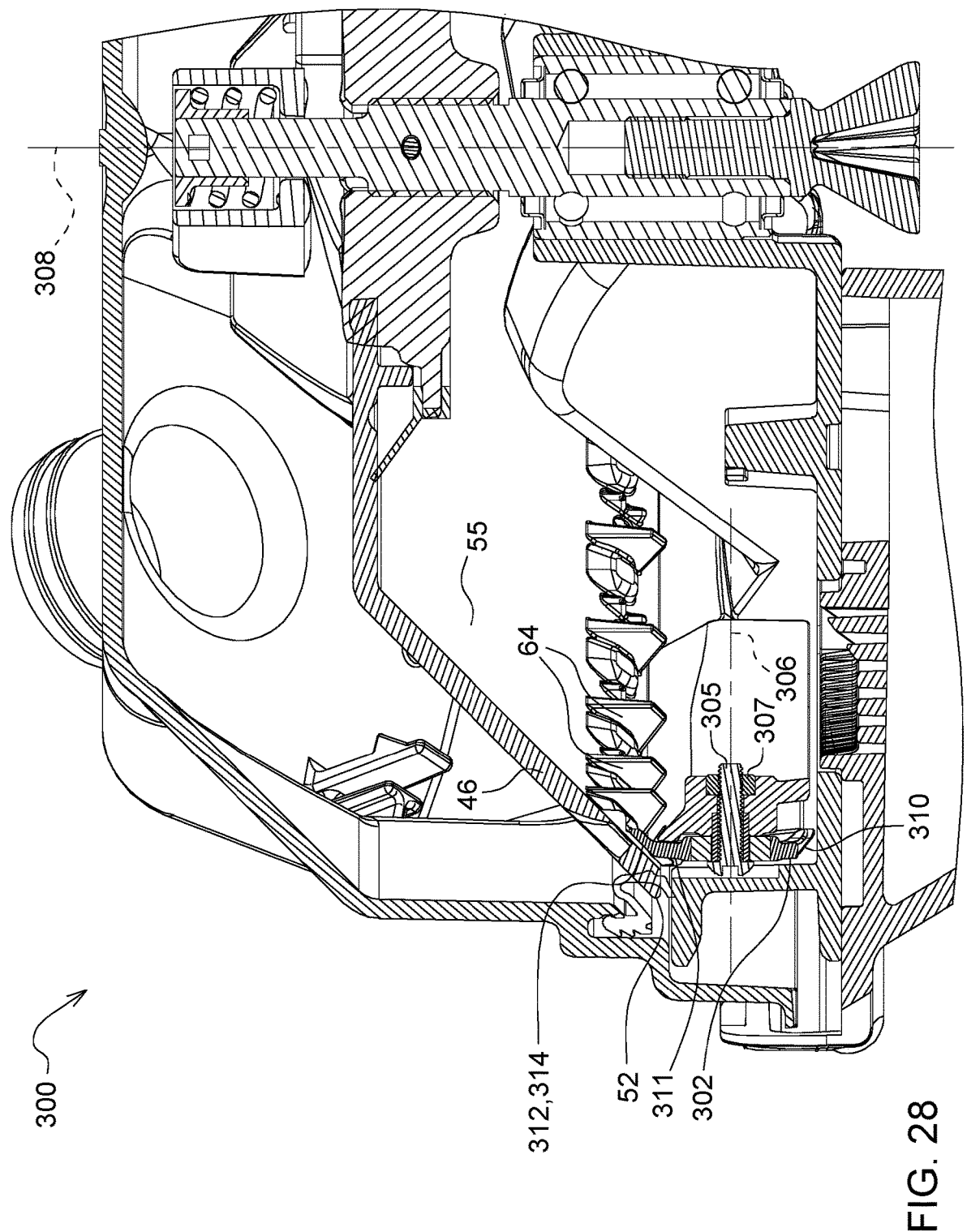
FIG. 28 is a cross-sectional view of another example seed double eliminator, according to some implementations of the present disclosure.
Figure 29:
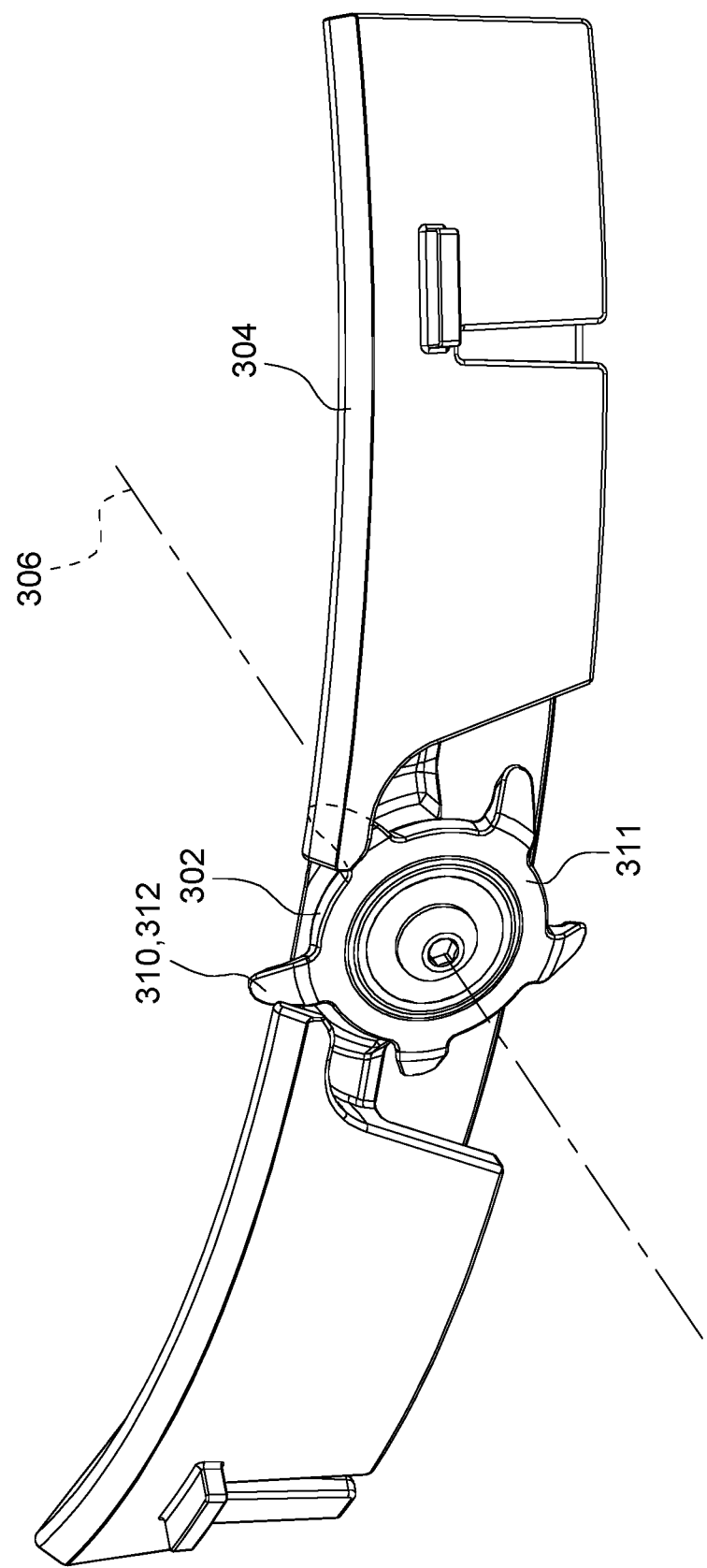
FIG. 29 is a perspective view of the seed double eliminator of FIG. 28.
Figure 30:
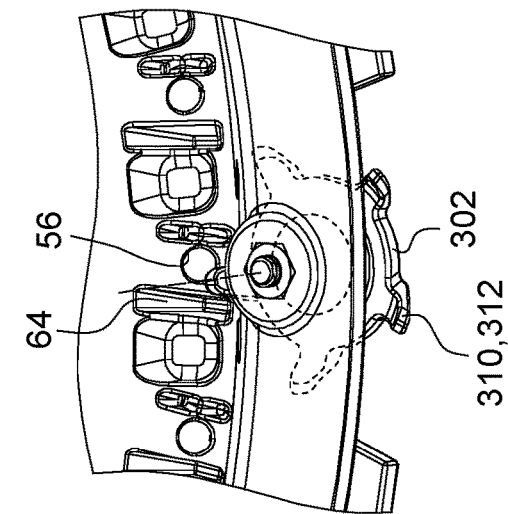
FIGS. 30 through 34 are perspective view of the seed double eliminator of FIG. 28, illustrating how a wheel moves in response to rotation of a seed disc and how a protrusion of the wheel obstructs an aperture formed in the seed disc.
Figure 31:
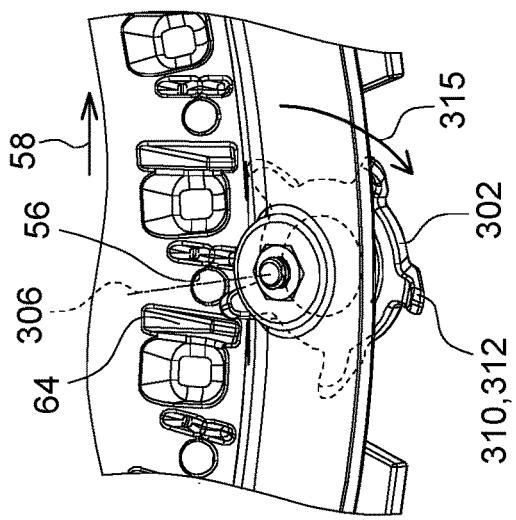
Figure 33:
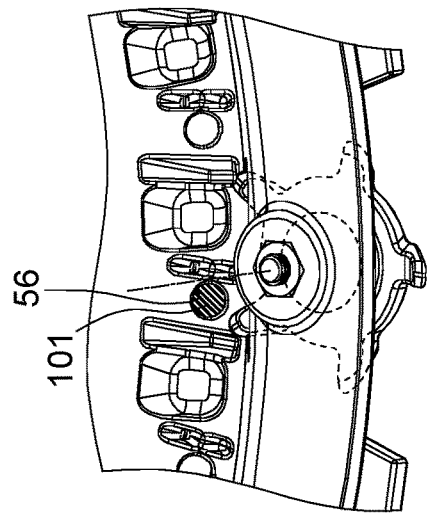
Figure 32:
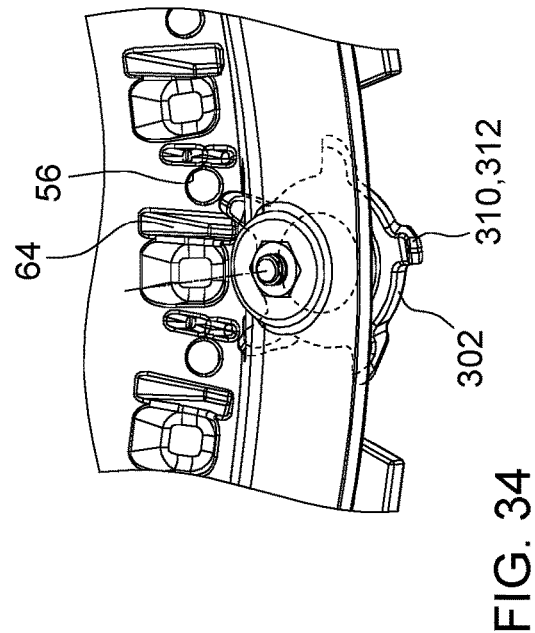
Figure 34:
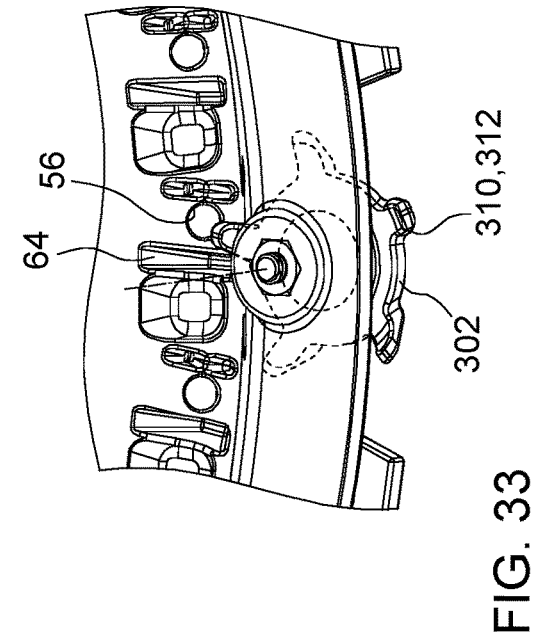

The wheel 302 includes a plurality of protrusions 310 having a bent shape. In some implementations, the protrusions 310 are radially extending from a peripheral edge of a hub portion 311 of the wheel 302. A distal end portion 312 of the protrusions 310 is angled relative to a plane that is perpendicular to the axis 306. As shown in FIG. 28, the distal end portion 312 is angled towards the axis of rotation (line 308) of the seed disc 46. In some implementations, the distal end portion 312 encompasses an entirety of the protrusion 310. In some implementations, the distal end portion 312 encompasses less than an entirety of the protrusion 310. In some implementations, a surface 314 of the distal end portion 312 lies parallel to but offset from an adjacent portion of the inner surface 55 of the seed disc 46 when the protrusions 310 are located adjacent to the inner surface 55, as shown in FIG. 28.

As the seed disc 46 rotates in the direction of rotation 58, as shown in the series of images shown in FIGS. 30 through 34, the protrusions 310 of the wheel 302 interact with the paddles 64 of the seed disc 46 to cause the wheel 302 to rotate in the direction of arrow 315. Thus, the wheel 302 passively rotates in response to rotation of the seed disc 46. This engagement causes the distal end portions 312 of the protrusions 310 to engage and disturb a seed or seeds retained on the seed disc 46 at the apertures 56. In some implementations, in addition to physically disturbing the seed, the protrusions 310 sweep across a portion of the opening area 101 of the apertures 56, obstructing a portion of the apertures 56 and causing a disruption to the applied vacuum force. This disruption unsettles the seed or seeds that are present at the apertures 56. As a result, seeds in excess of a single seed are released and fall away from the aperture 56, leaving a single seed retained at the aperture 56.

FIGS. 35 through 38 illustrate another example rotatable seed double eliminator 400. The seed-double eliminator 400 includes a wheel 402 disposed adjacent to the inner surface 55 of the seed disc 46. The wheel 402 is rotatable about an axis 404 and includes a plurality of radially extending protrusions 405. The wheel 402 is located on a carriage 406 that is slidably coupled to a base 408. The carriage 406 is movable along a surface 410 of the base 408 in the direction of arrows 412 and 414 in response to actuation of a position selector 416. In some instances, the axis 404 is perpendicular to the surface 410. In some implementations, the axis 404 forms an oblique angle relative to the inner surface 55. Further, in some implementations, the axis 404 is disposed at an oblique angle relative to the axis of rotation of the seed disc 46, represented by line 415. The position selector 416 includes a dial portion 418 and a shaft 420. The shaft 420 includes a threaded portion 422 and a groove 424. In some implementations, the wheel 402 is rotatable on a shaft 407 extending from or through the carriage 406 and on a bearing 409 received onto an end 411 of the carriage 406.

In the illustrated example, the base 408 is fixed relative to the seed disc 46 and includes an end wall 418 a side wall 426 that define a cavity 428. An opening 429 is formed at an end of the cavity 428 opposite the end wall 418. The end wall 418 includes an opening 430 through which the shaft 420 of the position selector 416 extends. The threaded portion 422 includes threads 432 that engages mating threads 434 formed in the carriage 406. In some implementation, the carriage 406 includes a carriage body 436 and an insert 438 disposed in a cavity 440 formed in the carriage body 436. In some implementations, the carriage body 436 is formed from a polymeric material. In some implementations, the insert 438 is formed from a metal, and the threaded portion 422 of the position selector 416 is formed form a metal. In other implementations, one or both of the insert 438 and the threaded portion 422 is formed from a polymeric material. In some implementations, the insert 438 is omitted and the mating threads 434 are formed on an interior surface of the carriage body 432. Other materials are also contemplated.

The seed double eliminator 400 also includes a washer 442 disposed between a dial portion 418 of the position selector 416 and the end wall 418 and a retainer 444 disposed adjacent to the end wall 418 on a side opposite the washer 442. The retainer 444 retains the position selector 416 in position relative to the base 408. In the illustrated example, the retainer 444 includes a threaded bore 446 that receives a set screw 448. A portion of the set screw 448 is received within the groove 424 to maintain the position of the position selector 416 relative to the base 408. The side wall 418 includes an opening 450 through which the set screw 448 is receivable into the retainer 444 and adjustable therein.

Figure 38:
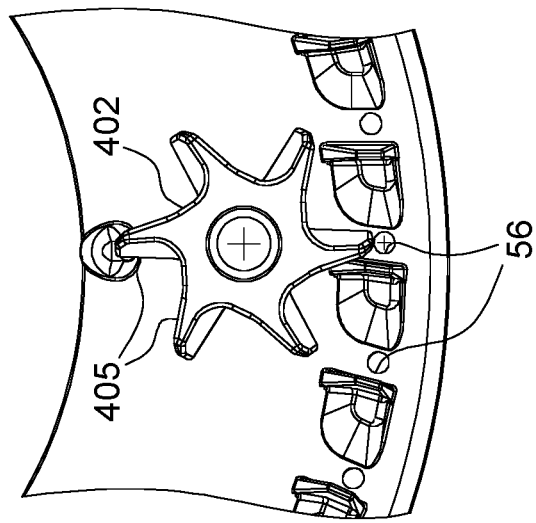
FIGS. 36 through 38 are side views of a wheel of the seed double eliminator of FIG. 35 illustrating how a protrusion of the wheel obstructs an aperture formed in a seed disc as the wheel rotates about an axis.
Figure 37:
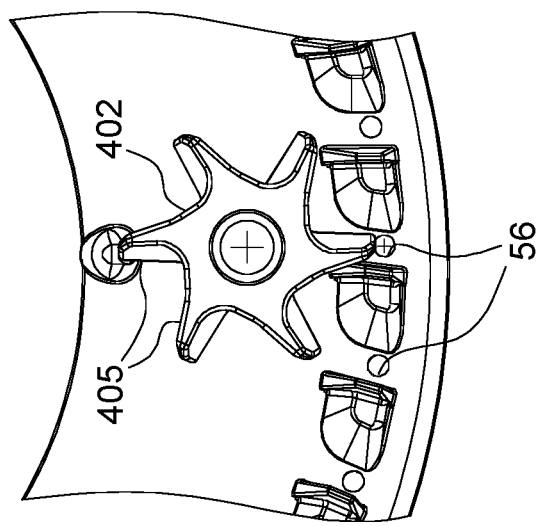
Figure 36:
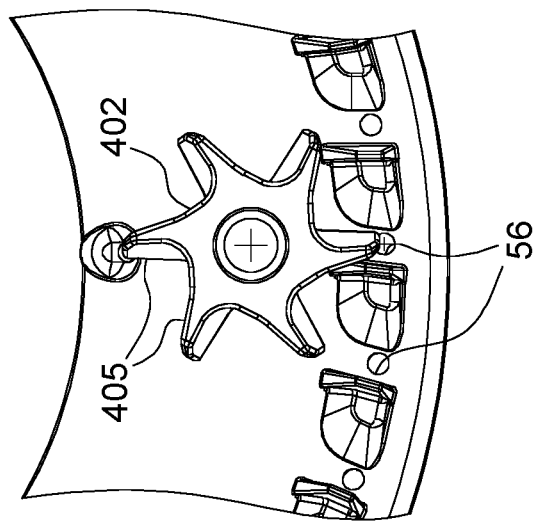

In operation, as the position selector 416 is rotated in a first rotational direction, the threads 432 and mating threads 434 interact to cause the carriage 406 to move in the direction of arrow 412. The carriage 406 is movable in the direction of arrow 414 in response to rotation of the position selector 416 in a second rotational direction, opposite the first rotational direction. A user can actuate the position selector 416 by rotating the position selector 416 via the dial portion 418. Movement of the carriage 406 along the surface 410 in response to actuation of the position selector 416 includes moving the carriage 406 into and out of the cavity 438. FIGS. 36 through 38 illustrate how an amount by which the protrusions 405 covers the opening area of the apertures 56 changes in response to operation of the position selector 416. As shown in FIG. 36 through 38, as the carriage 406 is moved in the direction of arrow 412, an amount of the opening area of the apertures 56 swept by the protrusions 405 of the wheel 402 increases. As a result, an amount of engagement and disruption of any seeds located at the aperture 56 increases. As the carriage 406 is moved in the direction of arrow 414, an amount of the opening area of the aperture 56 swept and obstructed by the protrusions 405 of the wheel 402 decreases, resulting in a reduced amount of engagement and disruption to any seeds located at the aperture 56. Consequently, an amount of the opening area of the apertures 56 swept and obstructed by the protrusions 405 of the wheel 402 is adjustable, such as in response to a size or type of seed being transported by the seed disc 46. Thus, an amount by which the protrusion 405 of the wheel 402 unsettles the one or more seeds located at the aperture 56 is adjustable using the position selector 416. As a result of the disruption by the protrusions 405, any excess seed at an aperture 56 is released, leaving a single seed at the apertures 56. As shown in FIG. 35, in some implementations, one or more of the apertures 56 has a tapered shape, with an opening size at the outer surface 57 larger than an opening size at the inner surface 56.

In other implementations, the position selector 416 is an actuator, such as a linear actuator or a rotary actuator. Other actuators are contemplated. In some instances, the actuator is an electrical actuator. In other instances, the actuator is power by another type of power source, such as a hydraulic or pneumatic power source. For example, where the position selector 416 includes an electrical linear actuator, extension of the linear actuator (i.e., movement in a first linear direction) causes movement of the carriage 406 along the surface 410 in the direction of arrow 412, and retraction of the linear actuator (i.e., movement in a second linear direction, opposite the first linear direction) causes movement of the carriage 406 along the surface 410 in the direction of arrow 414.

In some implementations, the wheel 402 also includes a conical or tapered surface 452. The tapered surface 452 is disposed adjacent to the inner surface 55 of the seed disc 46. In some instances, an angular displacement of the axis 404 from a perpendicular orientation relative to the inner surface 55 corresponds to an angle of the conical surface 452 relative to a plane perpendicular to the axis 404. Orienting the wheel 402 relative to the inner surface 55, as shown in FIG. 35, provides for a portion of the tapered surface closest to the inner surface 55 remining parallel to the inner surface 55 as the carriage 406 is moved along the surface 410 in response to actuation of the position selector 416 and as the wheel 402 rotates relative to the inner surface 55.

In some implementations, the wheel 402 is passively rotated in response to rotation of the seed disc 46. The paddles 64 of the seed disc 46, described earlier, engages with the protrusions 405 of the wheel 402 to rotate the wheel 402 as the seed disc 46 is rotated.

Figure 39:
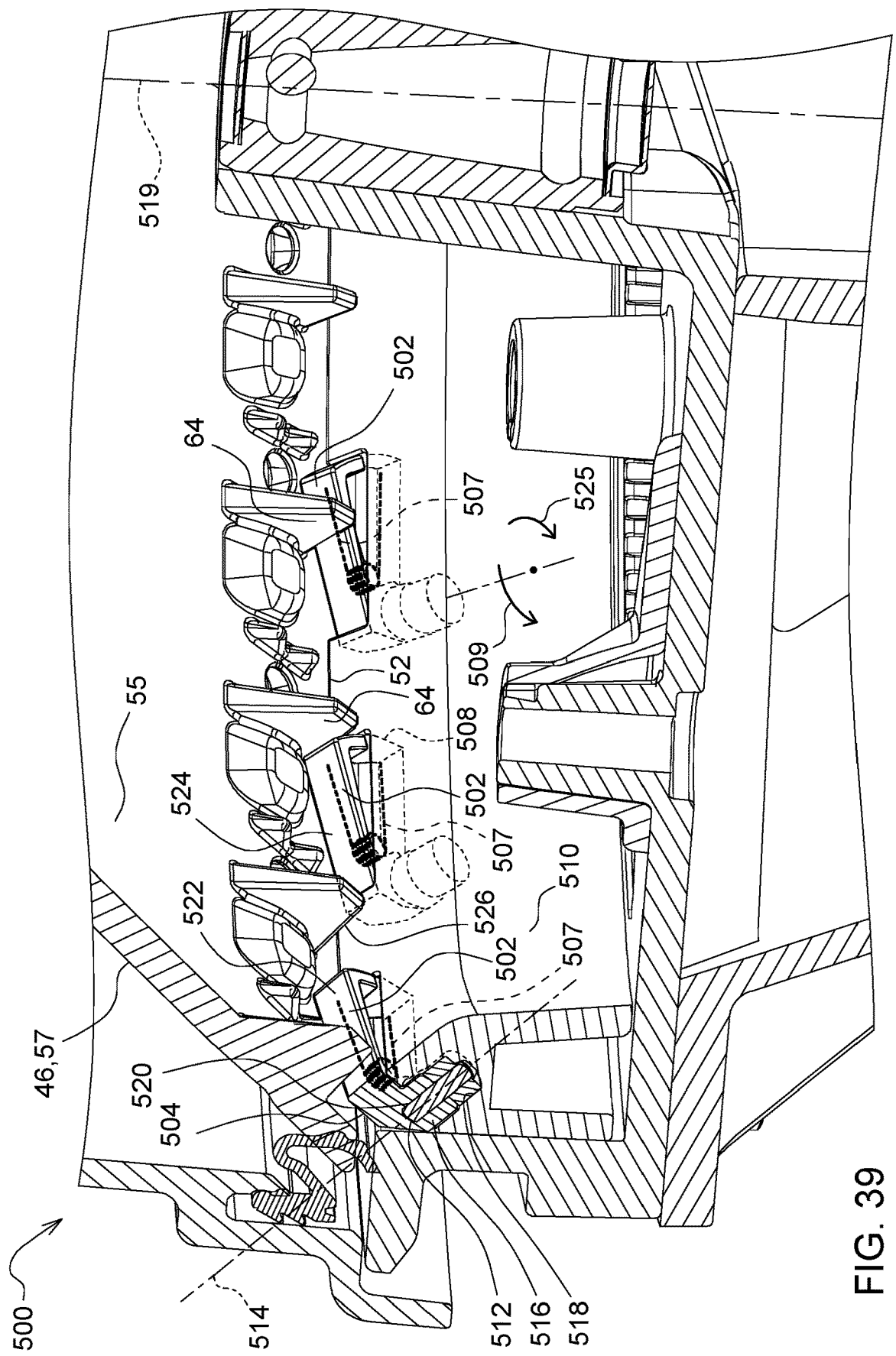
FIG. 39 is a partial cross-sectional view of another seed double eliminator, according to some implementations of the present disclosure.
Figure 40:
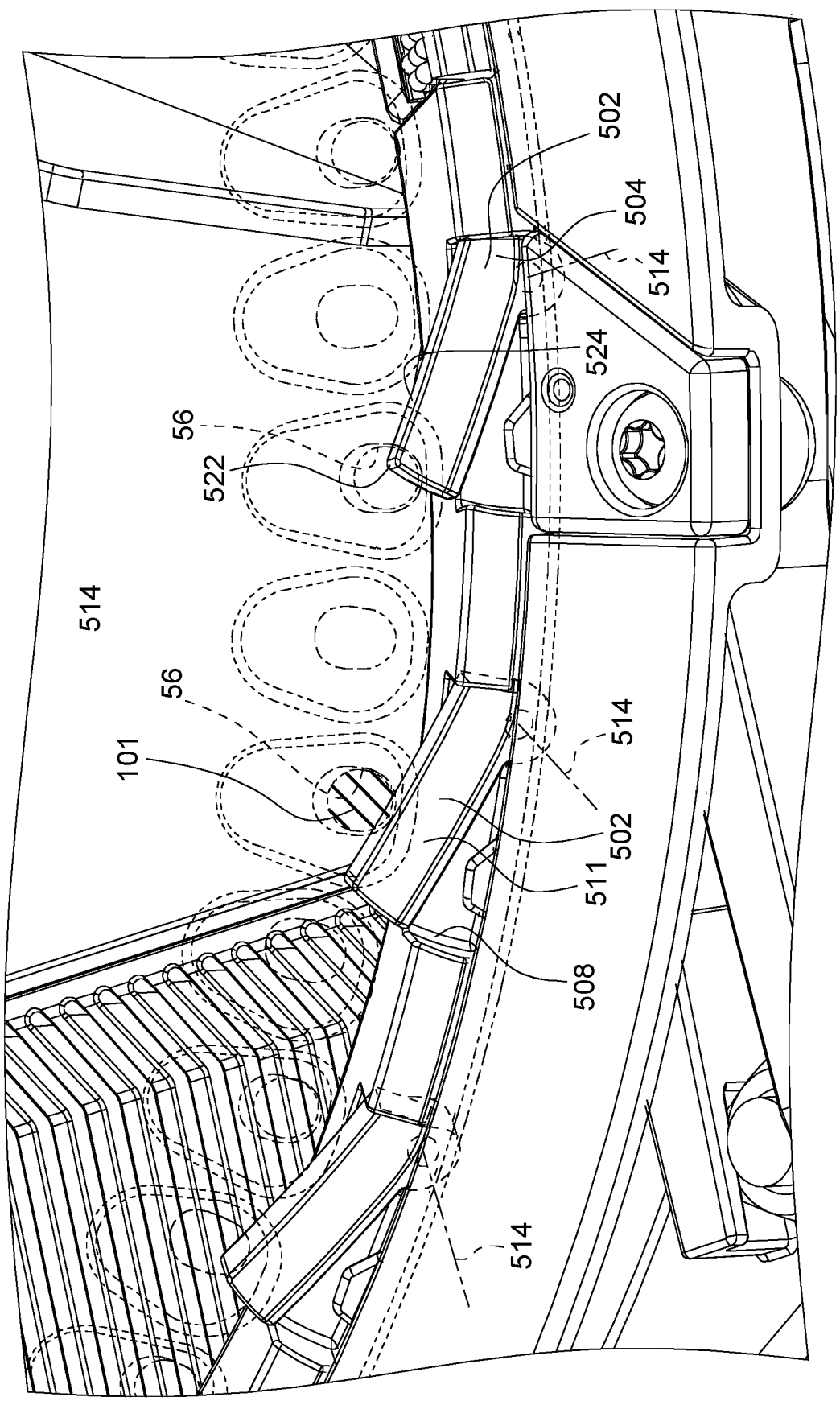
FIG. 40 is a detail view of a portion of the seed double eliminator of FIG. 39 illustrating how a lever obstructs a portion of an aperture of a seed disc.
Figure 42:
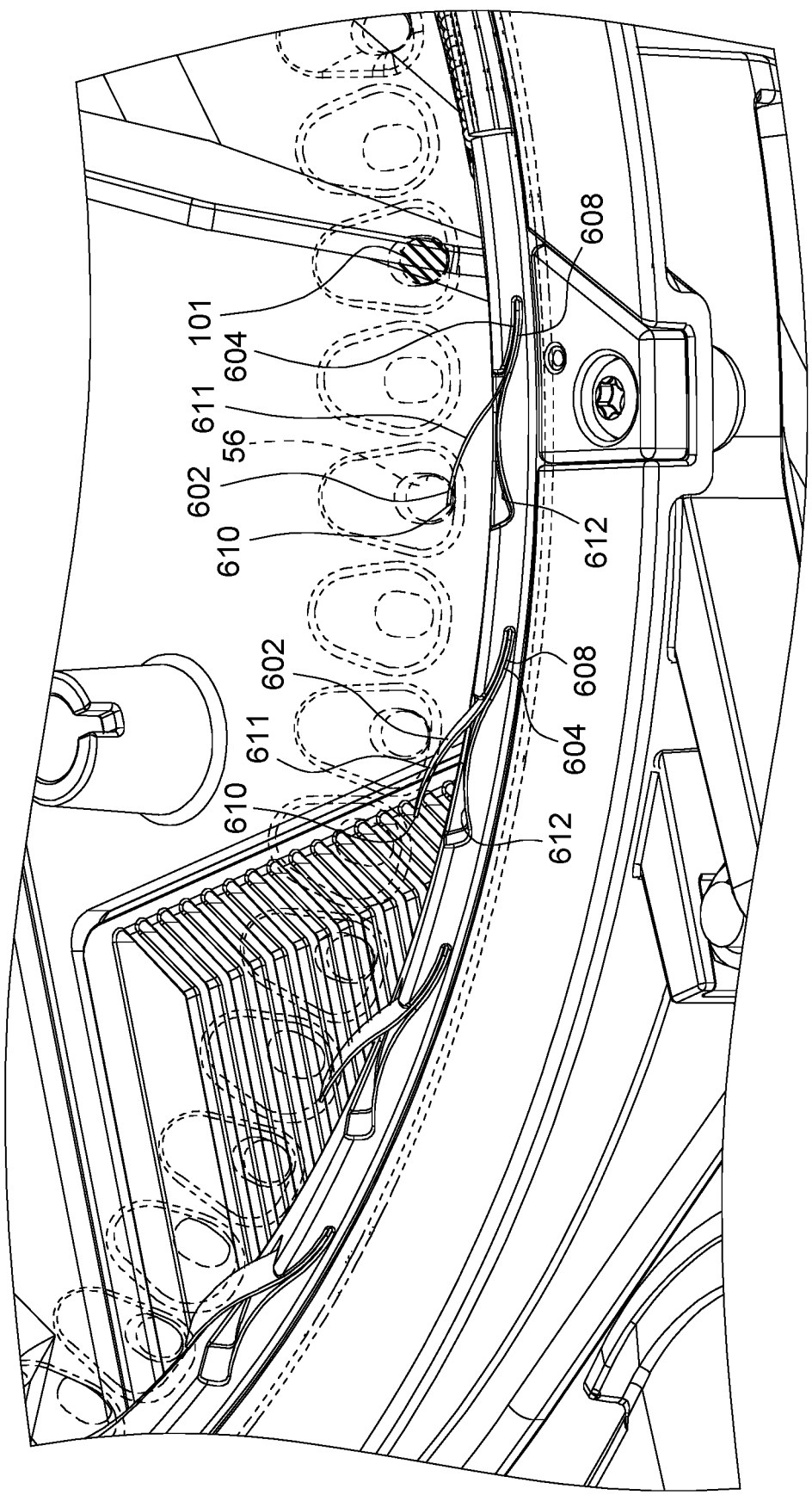
FIG. 42 is a detail view of the seed double eliminator of FIG. 41 illustrating how a spring strip obstructs a portion of an aperture formed in a seed disc.

FIGS. 39 and 42 illustrate another example seed double eliminator 500. The seed double eliminator 500 includes a plurality of levers 502. Although four levers 502 are illustrated, other implementations can include additional or fewer levers 502, including a single lever 502. The levers 502 are located adjacent to the inner surface 55 of the seed disc 46 and are pivotable about a first end 504 of the lever 502.

The levers 502 are provided in recess 508 formed in a housing 510 located adjacent to the inner surface 55 of the seed disc 46. In some implementations, the housing 510 extends circumferentially along a portion of the inner surface 55. The levers 502 are pivotable, at the first end 504, on a shaft 512 about respective axes 514. In some implementations, the axes 514 are radially arranged relative to the axis of rotation of the seed disc 46, represented by line 519. A portion 516 of the first end 504 is received into a bore 518 formed in the housing 510. The shaft 512 extends through at least a portion of the bore 518 and is received into a receptable 520 formed in the first end 504 of the levers 502. The levers 502 are pivotable between an extended position in which a second end 522 of the levers 502 extend beyond the recess 508 and a retracted position in which the second end 522 of the levers 502 are received into the recess 508. The levers 502 are spring-loaded and biased in a first rotational direction 509 about the axes 514 towards the extended position. In the extended position, the second end 522 extend towards the apertures 56 formed in the seed disc 46. In some implementations, the levers 502 are biased with a spring 507, such as a coil spring or a torsion spring. However, other types of biasing components can be used to bias the lever 502.

The levers 502 are oriented such that an end surface 511 of the levers 56, disposed adjacent to the inner surface 55, are tangential to, parallel to, or are otherwise conforming to the inner surface 55 of the seed disc 46. Further, in some implementations (for example, as shown in FIG. 39), the axes 514 are perpendicular to the inner surface 55 of the seed disc 46. The levers 502 also include a bearing surface 524. The bearing surface 524 is engaged by an end 526 of the paddles 64. When the paddles 64 begin to engage the bearing surface 524 at or proximate to the first end 504, the levers 502 begin to pivot in a second rotational direction 525, opposite the first rotational direction 509, about the axes 514 towards the retracted position and away from the apertures 56. As the paddles 64 continue to slide along the bearing surface 524, the levers 502 continue to pivot about the axes 514 in the second rotational direction 525 towards the retracted position. Thus, an amount of pivoting of the levers 502 increases as the paddles 64 move an increased distance along the bearing surfaces 524. The levers 502 reach the retracted position when the paddles 64 reach the second end 522 of the levers 502. As the paddles 64 move past the second ends 522 of the levers 502, a biasing force supplied by the biasing component rapidly moves the levers 502 back to the extended position, where the second ends 522 of the levers 502 contact and unsettle a seed or seeds located at the apertures 56 formed in the seed disc 46. Further, in some implementations, when the second end 522 has returned to the extended position, the second end 522 obstructs an amount of the opening area 101 of the apertures 56, thereby affecting the vacuum forced applied at the apertures 56. As a result, excess seeds located at the apertures 56 are released, leaving a single seed resident at the apertures 56.

By including a plurality of levers 502, if one lever 502 fails separate any excess seeds at an aperture 56, engagement by the remaining levers 502 increases the likelihood that the excess seeds will be removed as the seed disc 46 continues to rotate. This benefit applies to other seed double eliminators described herein in which a plurality of the seed-engaging features are provided. However, as explained earlier, in some implementations, a single lever 502 may be included.

Figure 41:
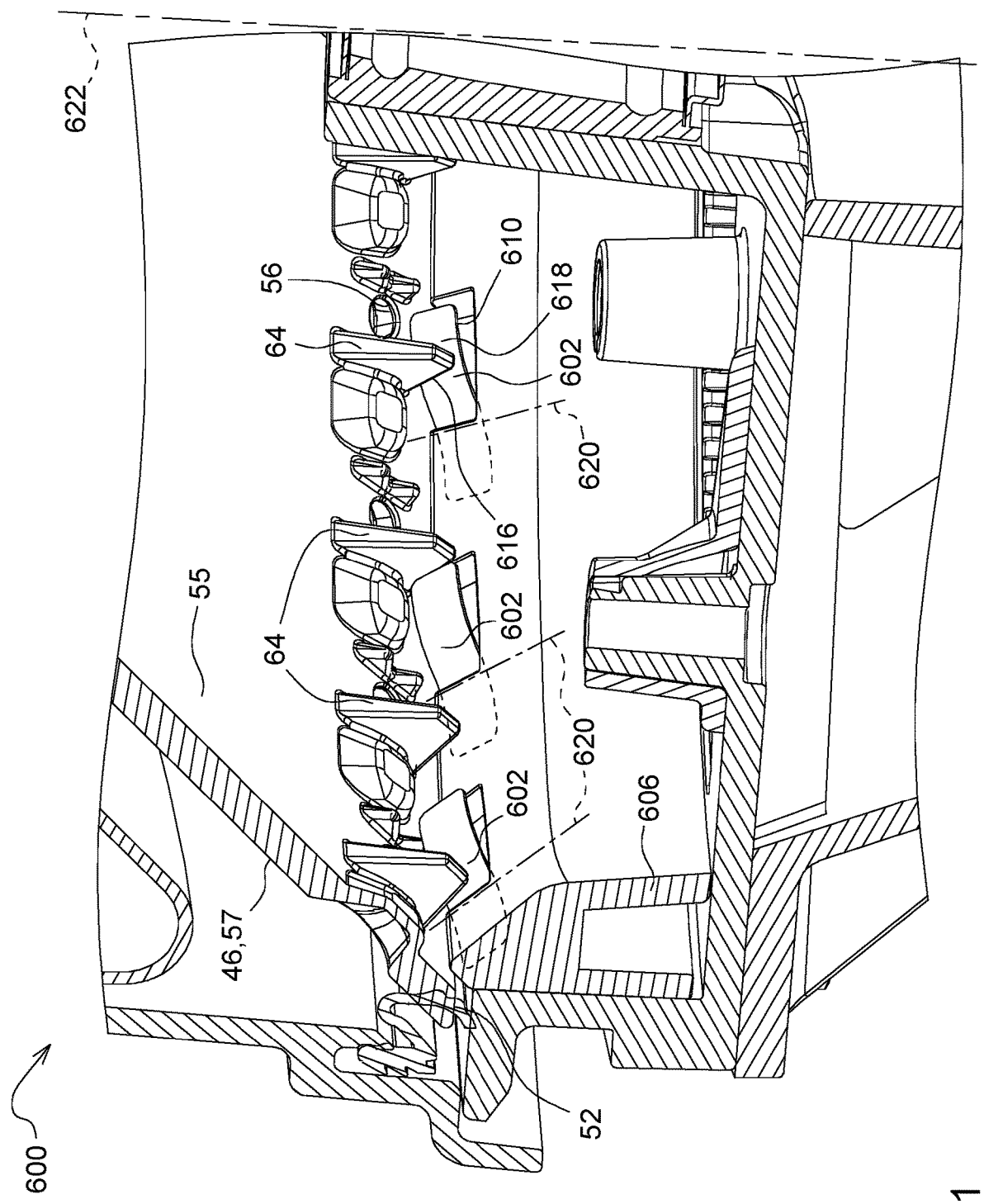
FIG. 41 is a detail view of another example seed double eliminator, according to some implementations of the present disclosure.

FIGS. 41 and 42 show another example excess seed eliminator 600 that includes a plurality of spring strips 602. Although three spring strips 602 are illustrated, other implementations can include additional or spring strips 602, including a single spring strip 602. The spring strips 602 form springs that are elastically deformable in response to engagement by the seed disc 46 and that spring back to an initial position after engagement between the seed disc 46 and the spring strips 602 ends.

A first end 604 of the spring strips 602 is secured in a housing 606 positioned adjacent to the inner surface 55 of the seed disc 46 and extend in a cantilevered fashion. In some implementations, the housing 606 extends circumferentially along a portion of the inner surface Slots 608 are formed in the housing 606, and the first end 604 of the spring strips 602 are received into a respective one of the slots 608 with a second end 610 provided on a freely extending portion 611. The housing 606 also forms recesses 612 that extend from the slots 608. The recesses 612 receive the freely extending portion 611 of the spring strips 602 when the spring strips 602 are deflected towards the housing 606 during operation of the seed disc 46. In some implementations, the recesses 612 conform to a deflected shape of the spring strips 602. The spring strips 602 are disposed adjacent to the inner surface 55 of the seed disc 46 and are biased into an extended position such that the second end 610 of the spring strips 602 is positioned adjacent to the apertures 56. In some implementations, the spring strips 602 have an "S" shape and, in some instances, have a flattened "S" shape. However, in other implementations, the spring strips 602 have other shapes, such as a straight or planar shape.

As the seed disc 46 rotates, the paddles 64 of the seed disc 46 engage and deflect the spring strips 602 towards the housing 606 such that the freely extending portion 611 of the spring strips 602 are received into the corresponding recesses 612 formed in the housing 606. Particularly, an end 616 of the paddles 64 engages and slides along a bearing surface 618 of the spring strips 602, causing elastic deformation of the spring strips 602 that deflects the spring strips 602 towards the housing 606 and causes freely extending portion 611 of the of the spring strips 602 to be received into the corresponding recesses 612. Deflection of the spring strips 602 moves the freely extending portion 611 away from the apertures 56 and in a direction towards the outer edge 52 of the seed disc 46. The deflection of the freely extending portion 611 can include rotation of at least a portion of the spring strip 602 about an axis 620. In some implementations, the axis 620 is perpendicular to the inner surface 55 of the seed disc 46. In some implementations, the axis 620 defines an oblique angle with the axis of rotation of the seed disc 46, represented by line 622. Further, an amount of deflection of the spring strips 602 increases as the paddles 64 move along the bearing surface 618 towards the second end 610. A maximum amount of deflection occurs when the paddles 64 reach the second end 610 and just prior to the paddles 64 sliding off of the spring strips 602 at the second end 610. When the paddles 64 move past the spring strips 602, in response to an internal biasing force generated by the elastic deformation, the spring strips 602 spring back and return to the extended position. Extension of the spring strips 602 to the extended position causes the spring strips 602 (e.g., the second end 610 of the spring strips 602) to contact and unsettle one or more seeds located at an aperture 56 formed in the seed disc 46. In some instances, in the extended position, the spring strips 602 may partially obstruct the apertures 56, affecting a vacuum force applied therethrough. For example, the freely extending portion 611 of the spring strips 602 may sweep across a portion of the opening area 111 of the apertures 56, thereby obstructing the apertures 56. As a result, an excess seed or seeds located at an aperture 56 are released, leaving a single seed located at the aperture 56.

Figure 43:
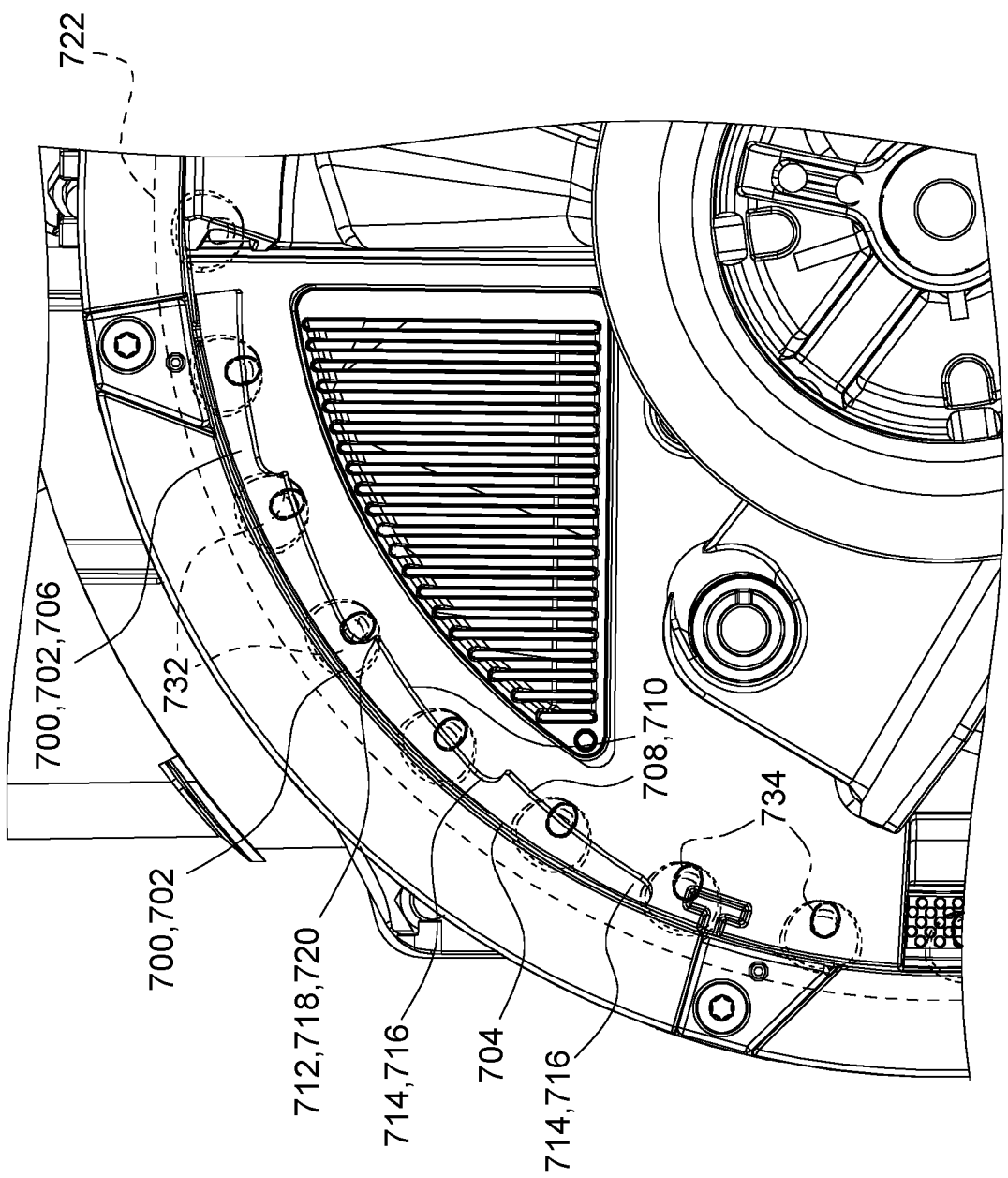
FIG. 43 is a top view of another example seed double eliminator, according to some implementations of the present disclosure.
Figure 44:
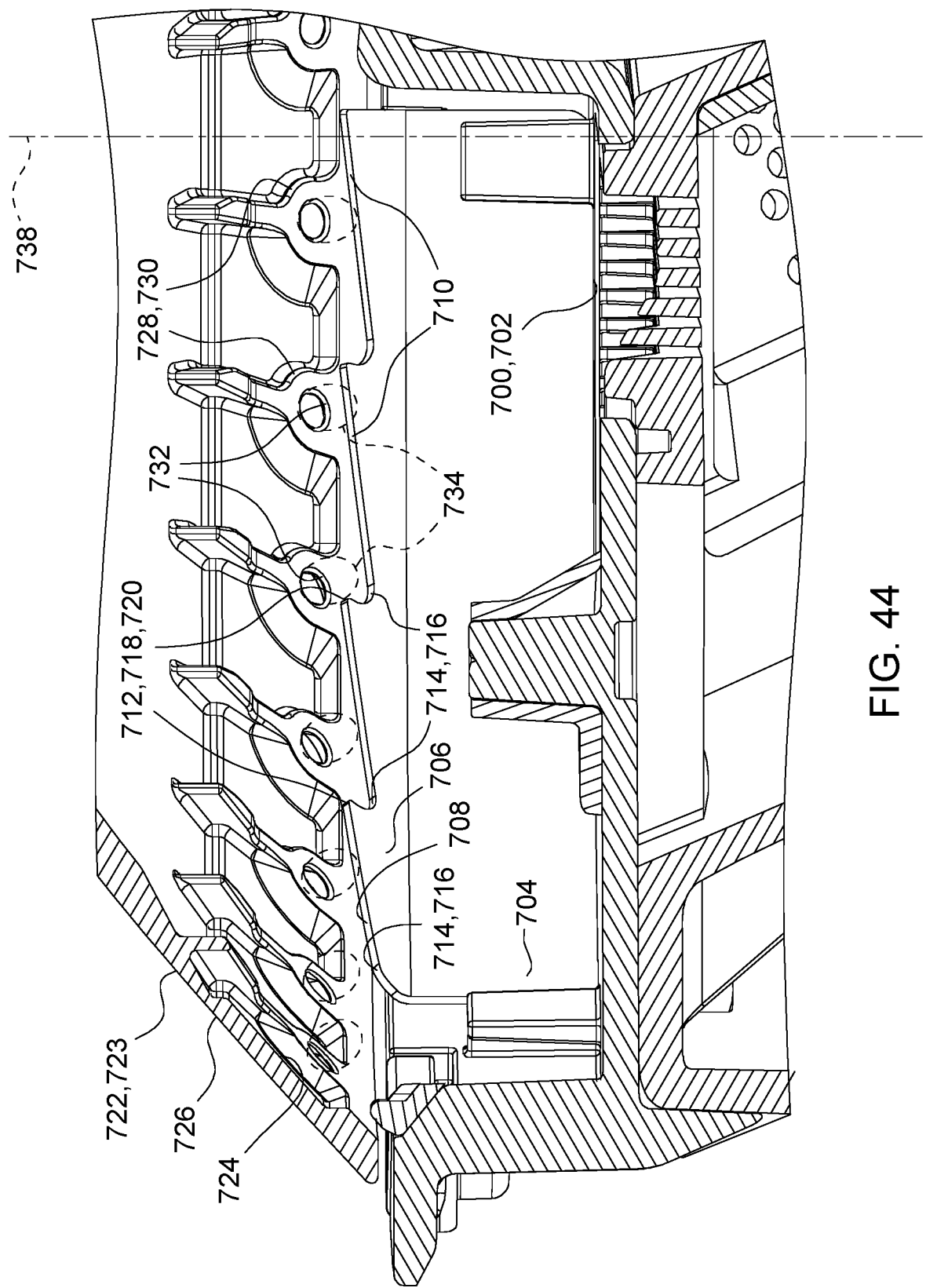
FIG. 44 is a side view of the seed double eliminator of FIG. 43.

FIGS. 43 and 44 are oblique views of another example excess seed eliminator 700. The excess seed eliminator 700 includes a body 702 having a circumferential portion 704 and a conical portion 706 extending from the circumferential portion 704. The conical portion 706 includes an edge 708 having a sawtooth shaped profile. The edge 708 includes plurality of sloped or slanted portions 710 defining a series of peaks 712 located at a trailing end 718 of the slanted portions 710. Although a four slanted portions 710 are illustrated, in other implementations, additional or fewer slanted portion 710 may be used, including a single slanted portion 710. The slanted portions 710 include a leading end 714 at a first end 716 and the trailing end 718 at a second end 720, opposite the first end 716. In implementations where the edge 708 includes a series of slanted portions 710, the trailing end 718 of one slanted portion 710 is adjacent to and displaced from the leading end 714 of an adjacent slanted portion 710.

The excess seed eliminator 700 is stationary relative to a seed disc 722 and is mounted, for example, to a housing of a seed meter, which may be similar to the housing 30 of seed meter 24. The seed disc 722 is rotatable relative to the seed double eliminator 700. The seed disc 722 is generally similar to seed disc 46 but may vary in some ways. For example, in some implementations, the seed disc 722 omits paddles similar to paddles 64, paddles similar to paddles 104, and raised features similar to raised features 68. The seed disc 722 includes a tapered portion 723 that defines an inner surface 724 and an outer surface 726. Raised portions 728 extend from the inner surface 724. The raised portions 728 define surfaces 730 that are offset from the inner surface 724, and an aperture 732 (similar to apertures 56) extends through each raised portion 728. The raised portions 728 hold seed 734 retained at the apertures 732 at an offset from the inner surface 724, positioning the seed 734 to be engaged by the edge 708 and, particularly, the slanted portions 710 of the edge 708. The conical portion 706 of the seed double eliminator 700 extends into an interior space 736 (similar to interior space 47) of the seed disc 722 and is located adjacent to and offset from the inner surface 724. Particularly, in some implementations, the conical portion 706 is or defines a surface that is parallel to the inner surface 724 of the seed disc 722.

The slanted portions 710 are angled relative to a plane disposed perpendicular to the axis of rotation 738 of the seed disc 722. The slanted portions 710 are arranged such that, as the seed disc 722 rotates about the axis of rotation 738, the leading end 714 (or a portion of the slanted portion 710 adjacent thereto) engages the seed 734 at the apertures 732, and, as the seed disc 722 continues to rotate, an amount of disruption or dislocation of the seed 732 caused by the slanted portions 710 increases due to the angled nature of the slanted portions 710. In some implementations, a maximum amount of disruption of the seeds 734 located at the apertures 732 occurs when the peaks 712 at the trailing end 718 of the slanted portions 710 reaches the apertures 732. In some implementations, a slanted edge extends across more than one aperture simultaneously. For example, as shown in FIG. 44, the slanted edge 710 has a length such that the slanted edge 710 extends across two apertures at the same time for a portion of a rotation of the seed disc 722. This disruption upsets any excess seed in a seed double located at the aperture 732. This disruption dislodges the excess seed, causing the excess seed to be released from the apertures 732, leaving a single seed retained at the aperture 732. The released seed, for example, falls back into the seed pool residing in the interior space 736 defined by the seed disc 722. The seed double eliminator 700 having a series of slanted portions 710 provides for the ability to engage any excess seeds at a particular aperture 732 more than once to ensure separation of the excess seeds so as to provide a single seed at the aperture 732.

Without in any way limiting the scope, interpretation, or application of the claims appearing below, a technical effect of one or more of the example implementations disclosed herein is to conserve seed and reduce costs associated with a planting operation. Another technical effect of one or more of the example implementations disclosed herein is to improve the efficiency of a planting operation.

Additional examples are also provided. A first example includes the following:

A seed eliminator for an agricultural planter having a seed disc includes a base, an arm pivotably coupled to the base and pivotable about a first axis, and a rotatable wheel rotatably coupled to the arm. The arm is biased in a direction away from the base. The wheel is rotatable about a second axis and includes an exterior surface configured to unsettle a seed maintained at a location along a seed disc to remove the seed from the location.

The seed double eliminator may also include a biasing component that biases the arm away from the base.

The biasing component may be a spring.

The exterior surface of the wheel may include a plurality of protrusions radially arranged on the wheel.

The exterior surface may be deformable so as to conform, at least partially, to an abutting surface.

An agricultural planter includes a seed disc rotatable about a first axis. The seed disc includes a plurality of apertures formed along a perimeter thereof, and the apertures are configured to retain seed at the apertures adjacent to a first surface of the seed disc. The agricultural planter also includes a seed delivery system that includes a seed transport apparatus located adjacent to the first surface of the seed disc. The seed transport apparatus is movable along a continuous path to receive seed from the seed disc and transport the seed to an ejection point. The agricultural planter also includes a seed double eliminator disposed adjacent to a second surface opposite the first surface at a position that is upstream of a seed release location where seed retained at the apertures is released from the seed disc and captured by the seed transport apparatus of the transport assembly for conveyance to the ejection point. The seed double eliminator includes a base and an arm pivotably coupled to the base and pivotable about a second axis. The arm biased in a direction toward the seed disc. The seed double eliminator also includes a rotatable wheel rotatably coupled to the arm. The wheel is rotatable about a third axis and includes an exterior surface that engages the second surface of the seed disc and unsettles a seed retained at the apertures such that the seed is released from the seed disc.

The wheel may be rotatable in response to rotation of the seed disc.

The exterior surface of the wheel may include a plurality of radially extending protrusions. At least a portion of the protrusions may be received into the apertures to unsettle the seed retained at the apertures.

Interaction between surfaces of the seed disc defining the apertures may impart a force to the plurality of protrusions to cause the wheel to rotate about the third axis.

The surfaces defining the apertures may be conically shaped.

A biasing component may bias the arm away from the base.

The exterior surface of the wheel may include a plurality of protrusions radially arranged on the wheel.

The exterior surface may be deformable so as to conform, at least partially, to the second surface of the seed disc.

The exterior surface of the wheel may include a plurality of radially extending protrusions, and a portion of the protrusions may extend through the apertures and inwardly beyond the first surface of the seed disc.

An end of at least one of the plurality of protrusions may extend beyond the first surface of the seed disc by an amount within a range of 0.25 mm (0.01 in.) to 0.5 mm (0.02 in.).

The third axis may extend in a direction oblique to the first axis.

A method of eliminating one seed of a seed double provided at a location along a seed disc includes disposing a wheel adjacent to an exterior surface of a rotatable seed disc at a location upstream of a seed release location where seed retained by the seed disc is released from the seed disc and captured by a seed transport apparatus of a transport assembly disposed adjacent to an inner surface of the seed disc for conveyance to an ejection point. The seed disc includes a plurality of apertures formed along a perimeter of the seed disc. The method also includes engaging the wheel with the exterior surface of the seed disc; rotating the wheel in response to a rotation of the seed disc; and unsettling a seed retained at one of the plurality of apertures of the seed disc by obstructing at least a portion of one of the apertures of the plurality of apertures with an exterior surface of the wheel.

The method may also include biasing the wheel towards the seed disc.

The exterior surface of the wheel may include a plurality of radially extending protrusions that are received, at least partially, into the plurality of apertures.

Unsettling a seed retained at one of the plurality of apertures of the seed disc by obstructing at least a portion of one of the apertures of the plurality of apertures with an exterior surface of the wheel may include penetrating one of the plurality of apertures with a protrusion of the wheel to cause the protrusion to extend beyond the inner surface of the seed disc by an amount within a range of 0.25 mm (0.01 in.) to 0.5 mm (0.02 in.).

A second example includes the following:

A seeding system for an agricultural planter that is operable to singulate seeds at one or more locations on a seed disc includes a seed disc rotatable about a first axis. The seed disc includes a rim portion, an inner surface, an outer surface opposite the inner surface, a plurality of apertures formed on the inner surface along the rim portion, and a plurality of paddles. Each aperture of the plurality of apertures defines an opening area, and the plurality of paddles is distributed among the plurality of apertures. The seeding system also includes a seed double eliminator disposed at a location along the rim portion of the seed disc and adjacent to the inner surface of the seed disc. The seed double eliminator is rotatable about a second axis in response to rotation of the seed disc. The seed double eliminator includes a wheel that includes a plurality of protrusions that sweep across at least a portion of the opening area of the plurality of apertures as the wheel rotates about the second axis.

The plurality of protrusions may be radially extending protrusions.

The wheel may include a hub portion defining a peripheral edge, and the plurality of protrusions may extend from the peripheral edge.

At least one of the plurality of protrusions may have a bent shape.

The bent shape may include a distal end portion that is angled inwardly towards the first axis.

The distal tip may be parallel with a portion of the interior surface.

The plurality of paddles may extend from the inner surface of the seed disc.

The plurality of paddles may engage with the plurality of protrusions of the wheel to pivot the wheel about the second axis.

The first axis may be perpendicular to the second axis.

The plurality of protrusions may be configured to unsettle seed positioned at the plurality of protrusions as the plurality of protrusions sweep past the opening area as the wheel rotates about the second axis to cause a seed of a seed double to separate from the seed disc.

A seed double eliminator for an agricultural planter having a seed disc includes a wheel rotatable about an axis. The wheel includes a plurality of protrusions extending radially from the axis, and each protrusion has a bent shape. The wheel is configured to be disposed adjacent to an interior surface of a seed disc and rotate in response to rotation of the seed disc and the protrusions configured to unsettle a seed retained at a location along the seed disc and release the unsettled seed from the seed disc.

The bent shape of the protrusion may include a distal end portion that defines an angle that is oblique to the axis.

A housing may be configured to be positioned adjacent to a rim portion of the seed disc, and the wheel may be configured to be positioned between the housing and the seed disc.

The axis may be configured to extend perpendicularly to an axis of rotation of the seed disc.

The wheel may be rotatable in response to a force applied to the protrusions.

A method of eliminating excess seed carried by a seed disc of a seeding system includes disposing a seed double eliminator adjacent to a rim portion of a rotatable seed disc that is rotatable about a first axis. The seed double eliminator is rotatable about a second axis and includes a plurality of protrusions. The rotatable seed disc includes a plurality of apertures and a plurality of paddles. The plurality of apertures and the plurality of paddles have an alternating arrangement. The method also includes rotating the seed disc about the first axis; engaging the plurality of paddles of the seed disc with the plurality of protrusions of the seed double eliminator to rotate the seed double eliminator about the second axis; and sweeping the plurality of protrusions past the plurality of apertures to unsettle seed located at the plurality of apertures and release a seed of a seed double at at least one of the apertures.

The plurality of protrusions may include a bent shape.

The bent shape may include a distal tip portion that has defines an oblique angle relative to second axis such that the distal tip is parallel with an inner surface of the seed disc when the distal tip portion is adjacent to the inner surface.

Each of the plurality of apertures may include an opening area. Sweeping the plurality of protrusions past the plurality of apertures to unsettle seed located at the plurality of apertures and release a seed of a seed double at at least one of the apertures may include sweeping across, with the plurality of protrusions, at least a portion of an opening area as the seed double eliminator rotates about the second axis.

The first axis and the second axis may be arranged perpendicular to each other.

A third example includes the following:

A seed double eliminator to release excess seed from a seed meter includes a base having a surface; a carriage movable along the surface; and a wheel coupled to the carriage and rotatable relative thereto about a first axis. The wheel includes a plurality of protrusions configured to unsettle and release a seed of a seed double from a seed meter. The seed double eliminator also includes a position selector operable engaged with the carriage to move the carriage along the surface of the base to selected position.

The wheel may include a tapered surface.

The tapered surface may be configured to be disposed adjacent to an inner surface of a seed meter such that a portion of the tapered surface disposed closest to the inner surface is parallel to the inner surface. The portion of the tapered surface may remain parallel with the inner surface when the carriage moves along the surface in response to operation of the position selector.

The position selector may include an actuator, and actuation of the actuator in a first direction may cause the carriage to move in a second direction along the surface.

Actuation of the actuator in a third direction may cause the carriage to move in a fourth direction along the surface, opposite the second direction.

The axis may be perpendicular to the surface of the base.

The position selector may include a first threaded surface. The carriage may include a second threaded surface that matingly engages the first threaded surface such that rotation of the position selector causes translational movement of the carriage along the surface.

A seeding system for an agricultural planter operable to singulate seeds at one or more locations on a seed meter includes a seed meter rotatable about a first axis. The seed meter includes an inner surface, an outer surface opposite the inner surface, a plurality of apertures extending between the inner surface and the outer surface, and a seed double eliminator disposed adjacent to the inner surface of the seed meter. The seed double eliminator includes a base that includes a surface; a carriage movable along the surface; a position selector operably coupled to the carriage; and a wheel rotatably coupled to the carriage. The carriage is movable along the surface in response to operation of the position selector. The wheel is rotatable about a second axis. The wheel includes a plurality of protrusions, and the wheel is rotatable in response to rotation of the seed meter. The wheel is movable relative to the inner surface in response to movement of the carriage along the surface.

The seed meter may include a peripheral portion, and the plurality of apertures may be formed in the peripheral portion.

The wheel may include a tapered surface disposed adjacent to the inner surface, and a portion of the tapered surface that is disposed closest to the inner surface may be parallel with the inner surface.

The second axis may be oblique to the inner surface.

Each of the apertures of the plurality of apertures may define an opening area, and movement of the wheel relative to the inner surface in response to operation of the position selector may alter an amount of the opening area swept by the plurality of protrusions.

Movement of the carriage in a first direction along the inner surface in response to operation of the position selector may cause the plurality of protrusions to sweep across an increased amount of the opening area of the apertures, and movement of the carriage in a second direction along the inner surface, opposite the first direction, in response to operation of the position selector may cause the plurality of protrusions to sweep across a decreased amount of the opening area of the apertures.

The plurality of protrusions may sweep across at least a portion of the opening area of the apertures when the wheel rotates about the second axis to unsettle and separate a seed of a seed double located at an aperture of the plurality of apertures.

The position selector may be an actuator. A first mode of operation of the actuator may cause the carriage to move along the surface in a first direction, and a second mode of operation of the actuator may cause the carriage to move along the surface in a second direction, opposite the first direction.

The seed meter may include a plurality of paddles formed on the inner surface, and the plurality of paddles may engage the plurality of protrusions to cause the wheel to rotate about the second axis in response to rotation of the seed meter about the first axis.

The plurality of paddles and the plurality of apertures may have an alternating arrangement.

The first axis may be disposed at an oblique angle relative to first axis.

A method of eliminating excess seed carried by a seed meter of a seeding system includes providing a seed double eliminator adjacent to an inner surface of a seed meter rotatable about a first axis. The seed double eliminator includes a base comprising a surface, a carriage movable along the surface, and a wheel that includes a plurality of protrusions. The wheel is coupled to and rotatable relative to the carriage about a second axis in response to rotation of the seed meter. The method also includes rotating the seed meter about the first axis; engaging the plurality of protrusions of the wheel with a plurality of paddles of the seed meter to cause rotation of the wheel; sweeping the plurality of protrusions past a plurality of apertures formed in the seed meter in response to rotation of the wheel; and engaging seed at the plurality of apertures with the plurality of protrusions to unsettle seed located at the plurality of apertures and release a seed of a seed double at at least one of the apertures.

The method may also include altering a position of the carriage relative to the surface of the base to alter an amount by which the plurality of protrusions sweep across the plurality of apertures.

A fourth example includes the following:

A seeding system includes a seed disc rotatable about a first axis. The seed disc includes an inner surface, an outer surface opposite the inner surface, and a plurality of apertures extending between the inner surface and the outer surface. Each aperture defines an opening area. The seeding system also includes a seed double eliminator that includes a movable lever disposed adjacent to the inner surface of the seed disc. The moveable lever includes a first end and a second end. The moveable lever is pivotable at the first end about a second axis and biased in a first rotational direction about the second axis towards the plurality of apertures. The second end of the moveable lever is movable past at least a portion of the opening area of the apertures.

The seed disc may include a plurality of paddles that engage the movable lever. The plurality of paddles may engage the movable lever to cause the movable lever to pivot in a second rotational direction about the second axis, away from the plurality of apertures, as a paddle of the plurality of paddle moves across the movable lever. The movable lever may pivot about the second axis in the first rotational direction, opposite the first rotational direction, towards the plurality of apertures when the paddle of the plurality of paddles ceases engagement with the movable lever.

The plurality of apertures and the plurality of paddles may have an alternating arrangement.

The moveable lever may include a bearing surface extending from the first end to the second end, and the plurality of paddles may slide along the bearing surface to cause the moveable lever to pivot in the second rotational direction.

An amount of rotation of the moveable lever about the second axis in the second rotational direction may increase as the plurality of paddles moves across the bearing surface of the movable lever.

A housing may be disposed adjacent a peripheral edge of the seed disc, and the moveable lever may be pivotably attached to the housing.

The seed double eliminator may include a plurality of movable levers and a plurality of second axes. Each moveable lever of the plurality of moveable levers may be pivotable about a respective one of the second axes, and the second axes may be radially arranged relative to the first axis.

The second axis may be perpendicularly oriented relative to the inner surface.

The seed double eliminator may include a spring, and the spring may bias the moveable lever in the first direction.

A method of eliminating excess seed carried by a seed disc of a seeding system includes providing a seed double eliminator adjacent to an inner surface of a seed disc rotatable about a first axis. The seed double eliminator includes a lever having a first end and a second end. The lever is pivotable at the first end about a second axis. The method also includes rotating the seed disc about the first axis; engaging the lever with a paddle of the seed disc to pivot the lever away from an initial position in a first direction; and engaging seed at an aperture formed within the seed disc with the lever to release a seed of a seed double at the aperture.

The method may include pivoting the lever in a second direction, opposite the first direction, when the paddles ceases to engage the lever.

Pivoting the lever in a second direction, opposite the first direction, when the paddles ceases to engage the lever may include returning the lever to the initial position.

The method may also include biasing the lever in the second direction toward the aperture.

Biasing the lever in the second direction toward the aperture may include biasing the lever with a spring.

The method may also include sweeping the lever across at least a portion of the opening area of the aperture formed in the seed disc.

The second axis may be perpendicular to the inner surface of the seed disc.

The second axis may extend obliquely relative to the first axis.

Engaging seed at the aperture formed within the seed disc with the lever to release the seed of a seed double at the aperture may include rapidly pivoting the lever in the second direction in response to cessation of engagement with the seed disc to impact at least one of the seed double.

A seed double eliminator to release excess seed from a seed disc includes a lever. The seed double eliminator includes a first end, a second end, and a surface extending between the first end and the second end. The lever is pivotable about an axis at the first end in a first direction and a second direction, opposite the first direction. The lever is biased in the first direction at a first position and configured to be displaced in the second direction in response to engagement with a seed disc and to impact a seed double when the lever is returned the first position to release a seed of the seed double.

The lever further may include a surface configured to be engaged by a portion of the seed disc to cause the lever to rotate an increasing amount in the second direction as the portion of the seed disc slides along the surface.

A fifth example includes the following:

A seeding system includes a seed disc rotatable about a first axis. The seed disc includes an inner surface, an outer surface opposite the inner surface, and a plurality of apertures extending between the inner surface and the outer surface. Each aperture defines an opening area. The seeding system also includes a seed double eliminator that includes a resilient spring strip fixed at a first end. The spring strip is disposed adjacent to the inner surface of the seed disc, and the spring strip is elastically deformable in response to deflection by the seed disc.

The spring strip may be S-shaped.

The seed disc may also include a plurality of paddles formed on the inner surface. Contact between plurality of paddles and the spring strip may cause deflection of the spring strip.

The seed disc may include an outer edge, and deflection of the spring strip in response to contact between the plurality of paddles and the spring strip may include deflection of the spring strip towards the outer edge.

The plurality of paddles and the plurality of apertures may have an alternating arrangement.

The spring strip may include a bearing surface, and the plurality of paddles may engage the bearing surface. An amount of deflection of the spring strip in response to engagement between the plurality of paddles and the bearing surface may increase as the plurality of paddles move across the surface as the seed disc rotates.

The spring strip may include a bearing surface. The plurality of paddles may engage the bearing surface. The spring strip may be located at a first position when not engaged with any paddle of the plurality of paddles, and the spring strip may spring back to the initial position when a paddle of the plurality of paddles slides off of the bearing surface.

The elastic deformation of the spring strip in response to deflection by the seed disc may include rotation of a of at least a portion of the spring strip about a second axis.

The second axis may be perpendicular to the inner surface of the seed disc.

The first axis and the second axis may define an oblique angle.

The seed double eliminator may include a housing disposed adjacent to the inner surface of the seed disc. The housing may include a slot, and the first end of the spring strip may be received into the slot.

The housing may include a recess extending from the slot, and the recess may conform to a shape of the spring strip when the spring strip is deflected by the seed disc.

The recess may include a curved surface.

Each of the plurality of apertures may include an opening area, and the spring strip may sweep across at least a portion of the opening area as the seed disc rotates.

A method of eliminating excess seed carried by a seed disc of a seeding system includes providing a seed double eliminator adjacent to an inner surface of a seed disc rotatable about a first axis. The seed double eliminator includes a cantilevered strip that includes a fixed end and a freely extending end. The method also includes rotating the seed disc about the first axis; engaging the cantilevered strip with a paddle of the seed disc to elastically deform the cantilevered strip; and engaging seed at an aperture formed within the seed disc with the cantilevered strip to release a seed of a seed double at the aperture.

Engaging seed at an aperture formed within the seed disc with the cantilevered strip to release a seed of a seed double at the aperture may include springing back the cantilevered strip when the paddles moves past the cantilevered strip and impacting the seed to release the seed of the seed double at the aperture.

Engaging the cantilevered strip with a paddle of the seed disc to elastically deform the cantilevered strip may include contacting a surface of the cantilevered strip extending from the fixed end to the freely extending end with the paddle.

The method may also include elastically deflecting the cantilevered strip with the paddle of seed disc and receiving the deflected cantilevered strip into a recess formed within a housing.

The cantilevered strip may be S-shaped.

The aperture may include an opening area, and the method may also include sweeping across a portion of the opening area with a portion of the cantilevered strip.

A sixth example includes the following:

A seeding system includes a seed disc rotatable about an axis. The seed disc includes an inner surface, an outer surface, a peripheral edge, and a plurality of apertures radially arranged and extending between the inner surface and the outer surface. Each aperture of the plurality of apertures includes an opening area. The seeding system also includes a seed double eliminator disposed adjacent to the inner surface. The seed double eliminator includes a portion that is parallel to an adjacent portion of the seed disc. The portion of the seed double eliminator defines a slanted edge that is oblique relative to the peripheral edge. The portion of the seed double eliminator is positioned such that the portion of the seed double eliminator covers an increasing amount of the opening area of the aperture as the seed disc rotates relative to the seed double eliminator about the axis.

The portion of the seed double eliminator may include a sawtooth shaped profile that includes a plurality of the slanted edges. The plurality of slanted edges may be arranged in series along the inner surface of the seed disc.

A peak may be arranged at an end of each of the plurality of slanted edges.

The portion of the seed double eliminator may extend along at least a portion of the inner surface of the seed disc.

The slanted edge may extend across a more than one aperture of the plurality of apertures.

The seed disc may include a conical portion, and the portion of the seed double eliminator may conform to but be offset from the conical portion of the seed disc.

The seed disc further may include a plurality of raised portions radially arranged along the inner surface, and an aperture of the plurality of apertures may extend through at least one of the plurality of raised portions.

Each raised portion may include a raised surface, and the portion of the seed double eliminator may conform to the raised surface when the portion of the seed double eliminator is located adjacent to the raised surface.

A method of eliminating excess seed carried by a seed disc of a seeding system includes locating a seed double eliminator adjacent to an inner surface of a seed disc that includes a plurality of apertures and is rotatable about an axis of rotation. The seed double eliminator includes an edge that has a sloped portion that defines an oblique angle relative to a plane perpendicular to the axis of rotation of the seed disc. The method also includes rotating the seed disc relative to the seed double eliminator and engaging seed at an aperture formed within the seed disc with the sloped portion of the edge to release a seed of a seed double at the aperture.

Rotating the seed disc relative to the seed double eliminator may include rotating the seed disc about the axis of rotation.

The edge may include a plurality of the sloped edges, and the plurality of sloped edges may be arranged in series along the inner surface of the seed disc.

A peak may be arranged at an end of each of the plurality of sloped edges.

The portion of the seed double eliminator may extend along at least a portion of the inner surface of the seed disc.

The seed double eliminator may include a conical portion, and the edge is formed on the conical portion.

The seed disc may include a plurality of raised portions radially arranged along the inner surface, and an aperture of the plurality of apertures may extend through at least one of the plurality of raised portions.

Each raised portion may include an interior surface, and the conical portion of the seed double eliminator may conform to the interior surface when the portion of the seed double eliminator is located adjacent to the raised portions.

Each of the apertures may define an opening area, and rotating the seed disc relative to the seed double eliminator may include causing the plurality of apertures to pass the edge of the seed double eliminator and progressively cover an increasing amount of the opening area of the apertures with the sloped portion of the edge.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Accordingly, the previously described example implementations do not define or constrain the present disclosure.

Other changes, substitutions, and alterations are also possible without departing from the spirit and scope of the present disclosure.

What is claimed is:

1. A seed double eliminator for a seeding machine having a seed disc, the seed double eliminator comprising:
   a housing comprising:
      a cavity; and
      a shaft formed in the cavity, the shaft defining a pivot axis;
   a tine mounted on the shaft and pivotable about the pivot axis; and
   a selector operably engaged with the tine, the selector movable to alter an angular orientation of the tine about the pivot axis.

2. The seed double eliminator of claim 1, wherein the selector is movable to cause movement of the tine about the pivot axis in discrete amounts.

3. The seed double eliminator of claim 1, wherein the selector is movable to cause movement of the tine over a predetermined range.

4. The seed double eliminator of claim 3, wherein the range is approximately 30° of rotation.

5. The seed double eliminator of claim 1, further comprising a frame extending between the tine and the selector, the frame movable in response to movement of the selector to cause movement of the tine about the pivot axis.

6. The seed double eliminator of claim 5, wherein the tine comprises:
   an elongated portion;
   a body portion; and
   a protrusion extending from the body portion,
   wherein the body portion defines an aperture that receives the shaft,
   wherein the frame comprises an opening, and
   wherein the protrusion is received into the opening of the frame.

7. The seed double eliminator of claim 6, wherein the tine is movable about the pivot axis in response to a moment imparted to the protrusion by the frame.

8. The seed double eliminator of claim 7, wherein the opening defines an edge of the frame, and wherein the edge of the frame imparts the moment to the protrusion to alter the angular orientation of the tine about the pivot axis.

9. The seed double eliminator of claim 5, wherein the selector is rotatable and wherein rotation of the selector causes movement of the frame along a path.

10. The seed double eliminator of claim 9, wherein the selector comprises a first gear, wherein the frame comprises a second gear intermeshed with the first gear, and wherein rotation of the selector causes the first gear to rotate the second gear which, in turn, causes movement of the frame along the path.

11. The seed double eliminator of claim 5, wherein the selector comprises a powered actuator, wherein actuation of the actuator causes movement of the frame along a path.

12. The seed double eliminator of claim 5, wherein the frame is disposed in a channel, and wherein movement of the selector causes the frame to move along a curved path within the channel.

13. An agricultural planter comprising:
   a seeding machine configured to singulate seeds prior to depositing the seeds into the ground, the seeding machine comprising:
      a rotatable seed disc; and
      a seed double eliminator disposed adjacent to an inner surface of the seed disc, the seed double eliminator comprising:
         a housing disposed along a perimeter of the seed meter, the housing comprising:
            a cavity; and
            a shaft extending into the cavity and defining a pivot axis;
         a tine mounted on the shaft and pivotable about the pivot axis; and
         a selector operably engaged with the tine, the selector movable to alter an angular orientation of the tine about the pivot axis.

14. The agricultural planter of claim 13, wherein the seed double eliminator further comprises a frame extending between the tine and the selector, the frame movable in response to movement of the selector to cause movement of the tine about the pivot axis.

15. The agricultural planter of claim 14, wherein the frame is disposed in a channel, and wherein movement of the selector causes the frame to move along a curved path within the channel.

16. The agricultural planter of claim 14, wherein the tine comprises:
   an elongated portion; and
   a body portion that includes a protrusion and defines an apertured that receives the shaft,
   wherein the frame comprises an opening,
   wherein the protrusion is received into the opening of the frame, and
   wherein the tine is movable about the pivot axis in response to a moment imparted to the protrusion by the frame.

17. The agricultural planter of claim 14, wherein the selector is rotatable and wherein rotation of the selector causes movement of the frame along a path.

18. The agricultural planter of claim 14, wherein the selector comprises a powered actuator and wherein actuation of the actuator causes movement of the frame along a path.

19. A method for altering a rotational orientation of a seed double eliminator, the method comprising:
   operating a selector of a seed double eliminator, the seed double eliminator comprising:
      the selector;
      a frame operably engaged with the selector; and
      a tine pivotably movable about a first axis of rotation, the frame operably engaged with the tine to cause the pivotable movement of the tine;
   moving the frame in response to operation of the selector; and
   imparting a moment to the tine by the frame to pivot the tine about the first axis of rotation.

20. The method of claim 19, wherein operating a selector comprises rotating the selector about a second axis of rotation.

21. The method of claim 19, wherein moving the frame in response to operation of the selector comprises moving the frame along a path in response to operation of the selector.

22. The method of claim 19, wherein the selector comprises a powered actuator operably engaged with the frame, wherein operating the selector comprises actuating the actuator, and wherein moving the frame in response to operation of the selector comprises displacing the frame in response to actuation of the actuator.

23. The method of claim 19, wherein the frame comprises an aperture, wherein a protrusion of the tine is received into the aperture, and wherein imparting a moment to the tine by the frame to pivot the tine about the second axis of rotation comprises imparting a force to the protrusion by surface of the frame defining the aperture.

* * * * *